United States Patent
Hamada et al.

(10) Patent No.: US 9,785,867 B2
(45) Date of Patent: Oct. 10, 2017

(54) CHARACTER RECOGNITION DEVICE, IMAGE DISPLAY DEVICE, IMAGE RETRIEVAL DEVICE, CHARACTER RECOGNITION METHOD, AND COMPUTER PROGRAM PRODUCT

(71) Applicants: KABUSHIKI KAISHA TOSHIBA, Minato-ku, Tokyo (JP); TOSHIBA SOLUTIONS CORPORATION, Kawasaki-shi, Kanagawa (JP)

(72) Inventors: Shinichiro Hamada, Kanagawa (JP); Kunio Osada, Tokyo (JP)

(73) Assignees: KABUSHIKI KAISHA TOSHIBA, Tokyo (JP); TOSHIBA SOLUTIONS CORPORATION, Kanagawa (JP)

( * ) Notice: Subject to any disclaimer, the term of this patent is extended or adjusted under 35 U.S.C. 154(b) by 29 days.

(21) Appl. No.: 14/924,974

(22) Filed: Oct. 28, 2015

(65) Prior Publication Data

US 2016/0125275 A1 May 5, 2016

(30) Foreign Application Priority Data

Oct. 31, 2014 (JP) ................................ 2014-223173

(51) Int. Cl.
*G06K 9/68* (2006.01)
*G06F 17/27* (2006.01)
(Continued)

(52) U.S. Cl.
CPC ....... *G06K 9/6842* (2013.01); *G06F 17/2705* (2013.01); *G06F 17/2765* (2013.01);
(Continued)

(58) Field of Classification Search
None
See application file for complete search history.

(56) References Cited

U.S. PATENT DOCUMENTS 8,965,126 B2   2/2015 Yamazoe et al.
9,292,739 B1 * 3/2016 Gray ...................... G06K 9/033
(Continued)

FOREIGN PATENT DOCUMENTS

JP   2008-234308   10/2008
JP   2012-185722    9/2012

OTHER PUBLICATIONS

N. Nathiya and K. Pradeepa, "Optical Character Recognition for scene text detection, mining and recognition," 2013 IEEE International Conference on Computational Intelligence and Computing Research, Enathi, 2013, pp. 1-4.*

(Continued)

*Primary Examiner* — Kim Vu
*Assistant Examiner* — Nathan Bloom
(74) *Attorney, Agent, or Firm* — Amin, Turocy & Watson LLP

(57) ABSTRACT

According to an embodiment, a device includes a detector, first and second recognizers, an estimator, a second recognizer, and an output unit. The detector is configured to detect a visible text area including a visible character from an image. The first recognizer is configured to perform character pattern recognition on the visible text area, and calculate a recognition cost according to a likelihood of a character pattern. The estimator is configured to estimate a partially-hidden text area into which a hidden text area estimated to have a hidden character and the visible text area are integrated. The second recognizer is configured to calculate an integrated cost into which the calculated cost and a linguistic cost corresponding to a linguistic likelihood of a text that fits in the entire partially-hidden text area are integrated. The output unit is configured to output a text selected or ranked based on the integrated cost.

17 Claims, 42 Drawing Sheets

(51) Int. Cl.
   *G06K 9/72* (2006.01)
   *G06K 9/34* (2006.01)
(52) U.S. Cl.
   CPC ......... *G06F 17/2785* (2013.01); *G06K 9/344* (2013.01); *G06K 9/72* (2013.01); *G06K 9/726* (2013.01); *G06K 2209/01* (2013.01)

(56) References Cited

U.S. PATENT DOCUMENTS

| | | | |
|---|---|---|---|
| 2002/0131642 A1* | 9/2002 | Lee | G06K 9/325 |
| | | | 382/220 |
| 2008/0002916 A1* | 1/2008 | Vincent | G06K 9/3258 |
| | | | 382/305 |
| 2010/0303356 A1* | 12/2010 | Fosseide | G06K 9/346 |
| | | | 382/182 |
| 2013/0011067 A1* | 1/2013 | Ben-Horesh et al. | G06K 9/346 |
| | | | 382/189 |
| 2013/0108160 A1* | 5/2013 | Yamazoe | G06K 9/723 |
| | | | 382/177 |
| 2014/0111542 A1* | 4/2014 | Wan | G06F 17/30253 |
| | | | 345/633 |
| 2015/0055857 A1* | 2/2015 | Wang | G06K 9/3258 |
| | | | 382/165 |
| 2015/0116349 A1 | 4/2015 | Hamada et al. | |
| 2016/0026899 A1* | 1/2016 | Wang | G06T 7/11 |
| | | | 382/176 |

OTHER PUBLICATIONS

Q. Qiu, Q. Wu, M. Bishop, R. E. Pino and R. W. Linderman, "A Parallel Neuromorphic Text Recognition System and Its Implementation on a Heterogeneous High-Performance Computing Cluster," in IEEE Transactions on Computers, vol. 62, No. 5, pp. 886-899, May 2013.*

Zhu, Yingying, Cong Yao, and Xiang Bai. "Scene text detection and recognition: Recent advances and future trends." Frontiers of Computer Science 10.1 (2016): 19-36.*

Mehryar Mohri, et al. "Full Expansion of Context-Dependent Networks in Large Vocabulary Speech Recognition", Acoustics, Speech and Signal Processing, 1998, Proceedings of the 1998 IEEE International Conference, vol. 2, IEEE, 1998, 4 pages.

* cited by examiner

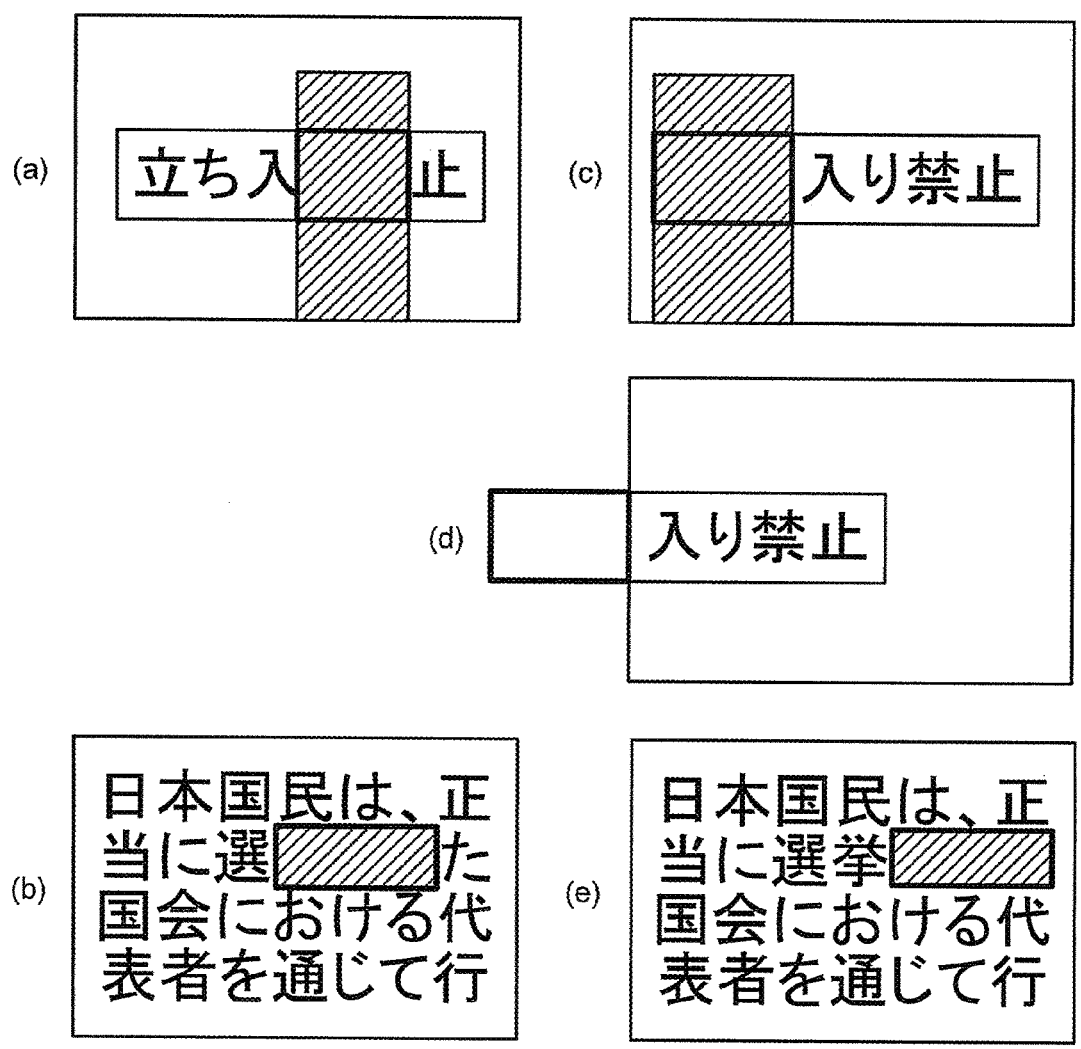

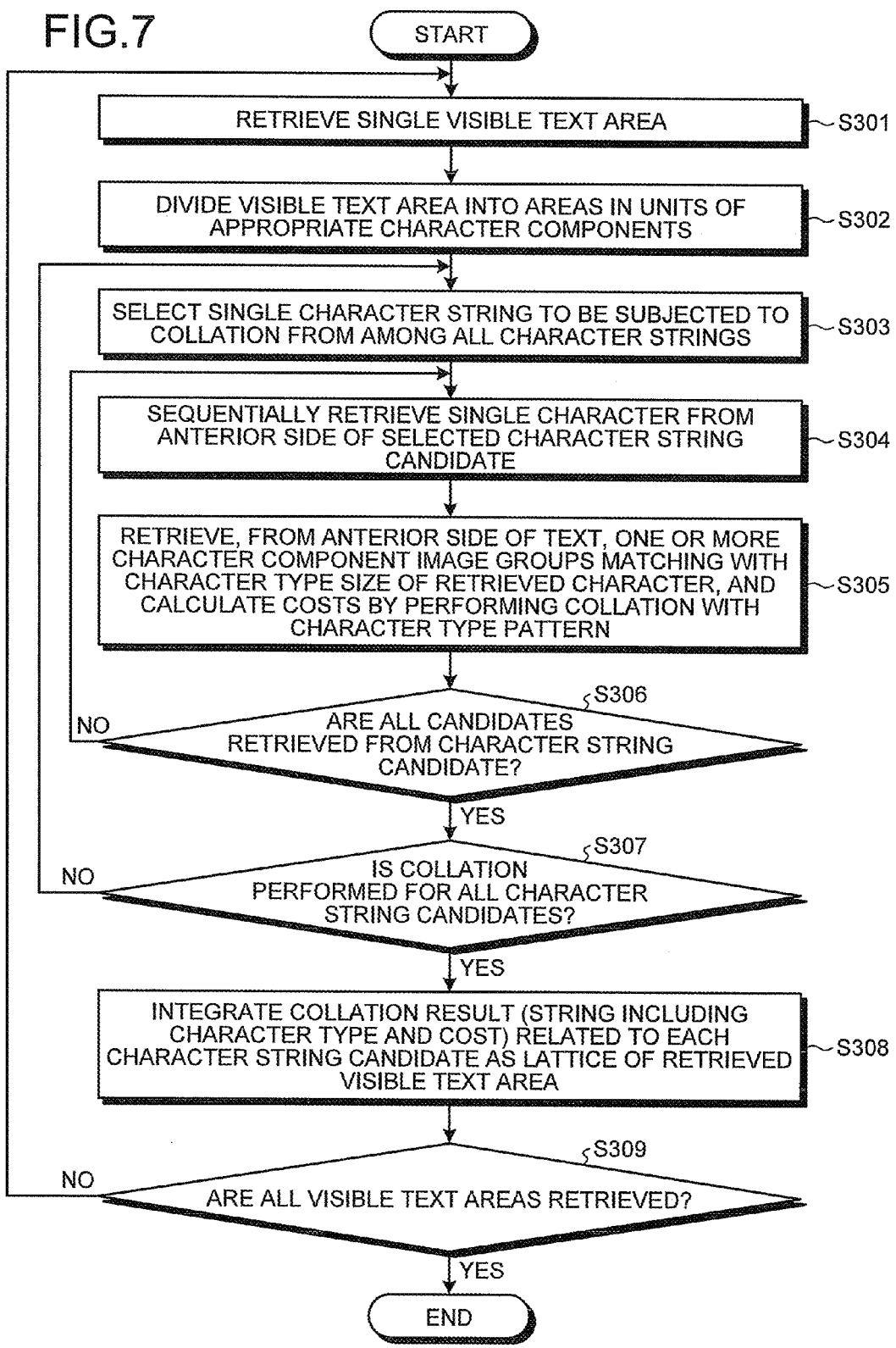

DETECTION OF AREAS THAT EXCEED THRESHOLD VALUE AS PARTIALLY-LOST CHARACTER AREAS

FIG.15
(a)
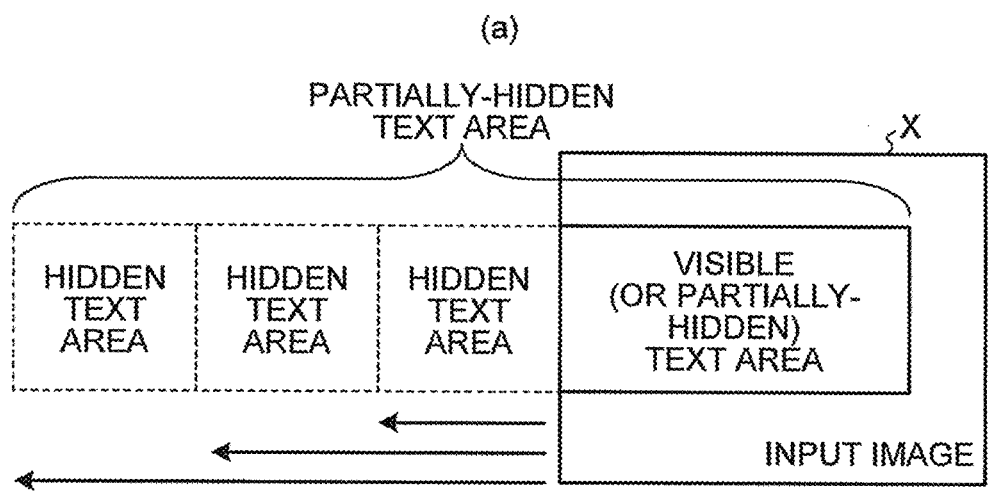
(b)
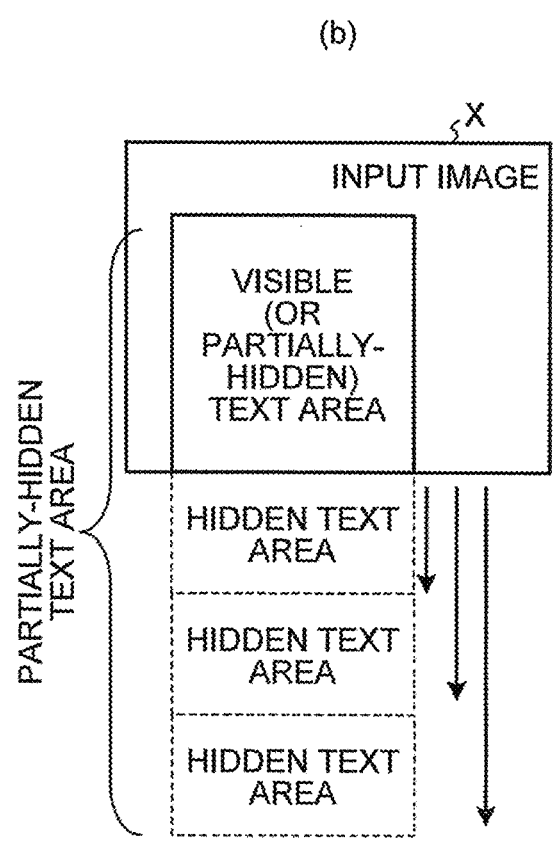

FIG. 17
(a)
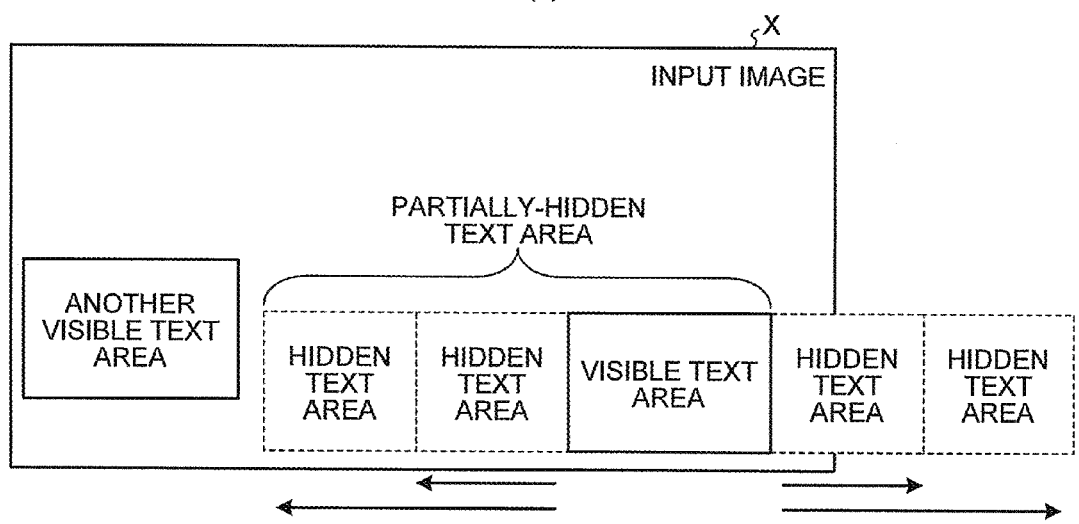
(b)
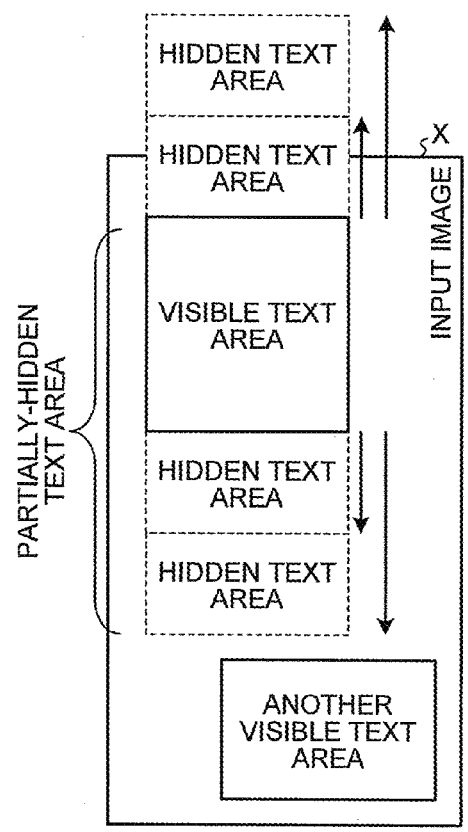

FIG.43
(a)
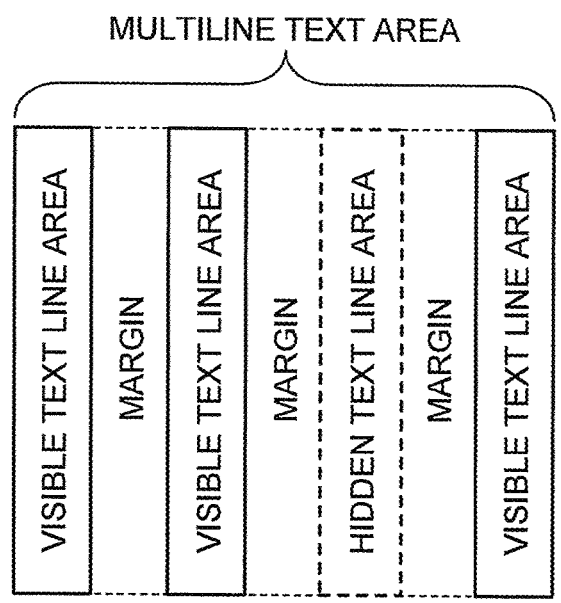
(b)
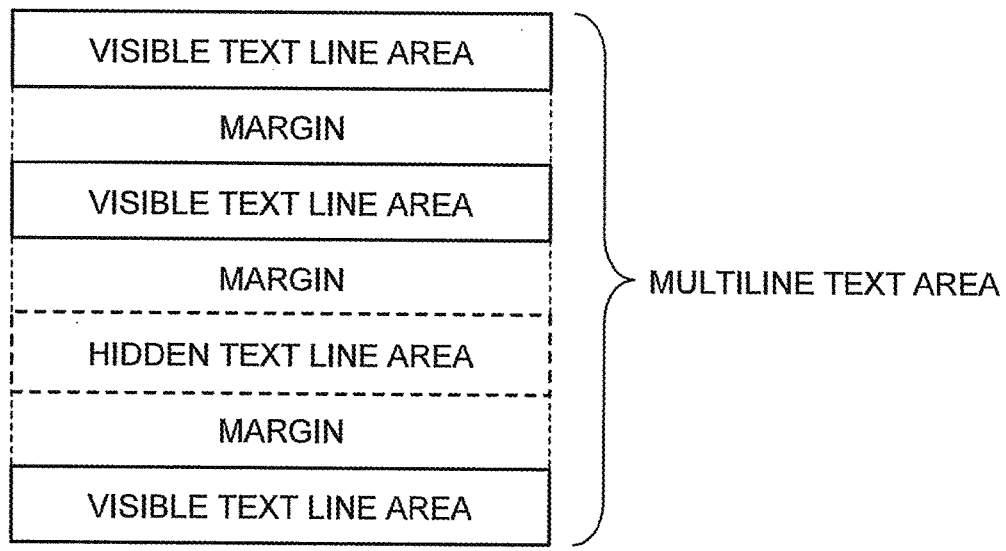

FIG.48
(a)
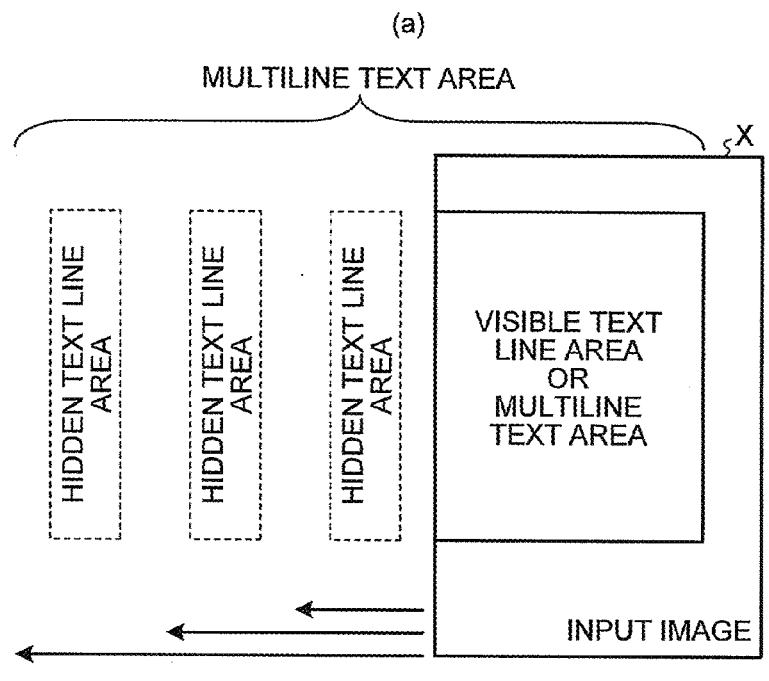
(b)
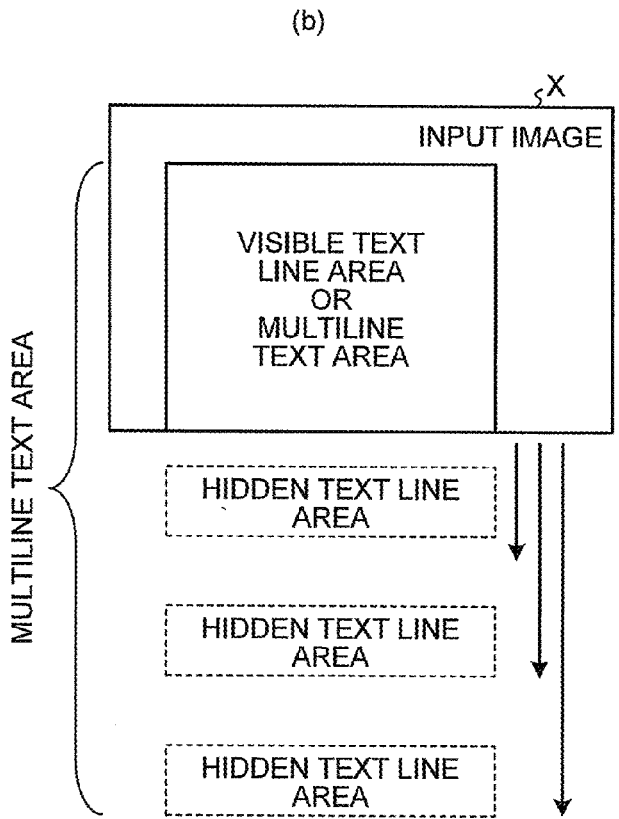

FIG.50
(a)
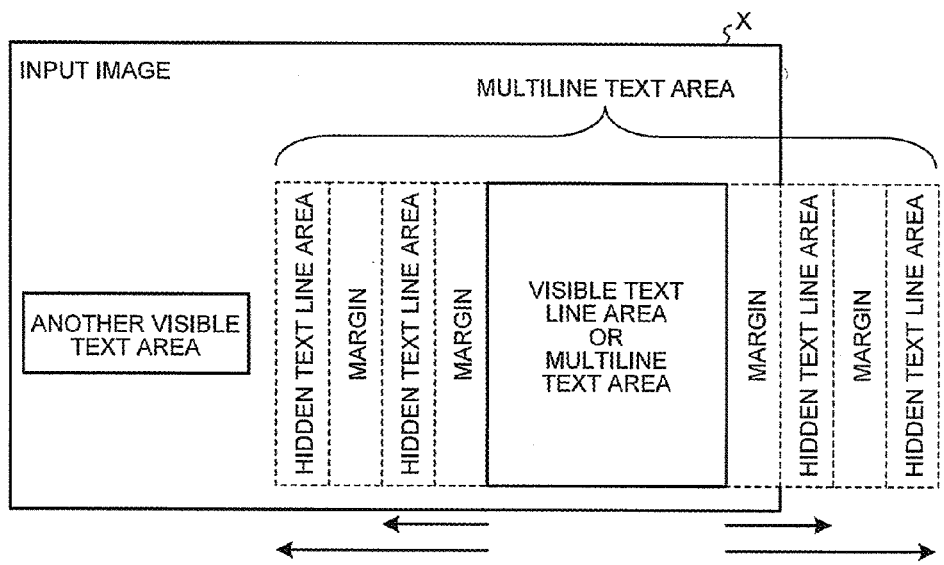
(b)
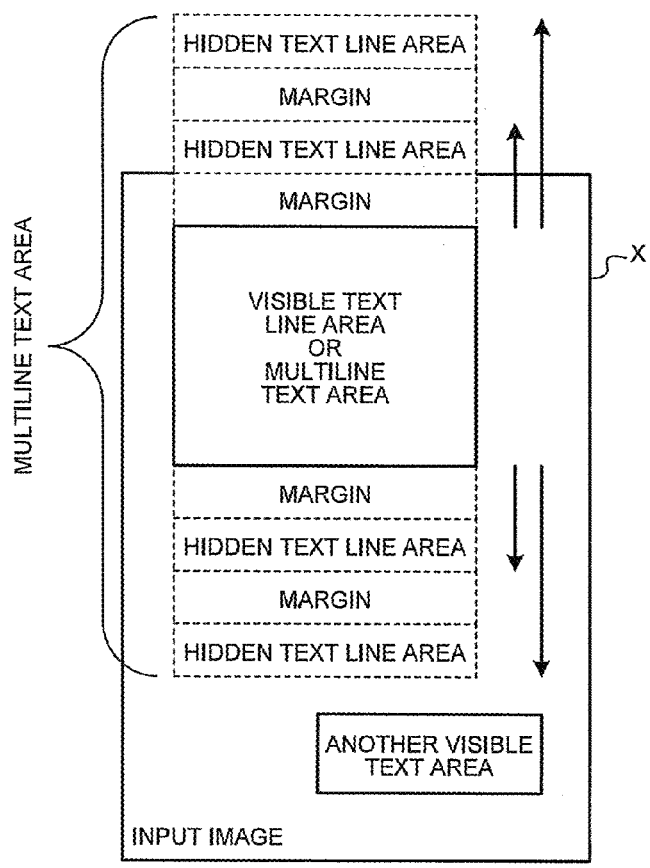

CHARACTER RECOGNITION DEVICE, IMAGE DISPLAY DEVICE, IMAGE RETRIEVAL DEVICE, CHARACTER RECOGNITION METHOD, AND COMPUTER PROGRAM PRODUCT

CROSS-REFERENCE TO RELATED APPLICATION

This application is based upon and claims the benefit of priority from Japanese Patent Application No. 2014-223173, filed on Oct. 31, 2014; the entire contents of which are incorporated herein by reference.

FIELD

Embodiments described herein relate generally to a character recognition device, an image display device, an image retrieval device, a character recognition method, and a computer program product.

BACKGROUND

Typically, a technology is known for recognizing characters from a scene image that is input from, for example, the camera installed in a smartphone. In the visual scene captured in a scene image, sometimes there are characters which are actually present but are not visible by remaining hidden. For example, sometimes the characters on a signboard are not visible if the signboard is present at the back of a power pole acting as an obstruction. Moreover, sometimes the characters within a particular range are not visible due to over-exposure or defocusing. However, in the conventional character recognition technology, only the visible characters are treated as the target for recognition. Hence, character recognition is performed without including any hidden characters.

In the case in which the text obtained as a result of performing character recognition is used in various text applications, the missing text attributed to no recognition of the hidden characters could become a major issue. For example, in the case of translating a text obtained as a result of performing character recognition, the missing characters may lead to a major confusion in the analysis thereby possibly leading to a significant decline in the translation accuracy. Moreover, in the case of performing image retrieval based on the text obtained as a result of performing character recognition, the missing characters lead to a decline in the recall rate of the search result. Particularly, in the case of a word-based searching device, the impact is felt in a significant manner. For that reason, there has been a demand for building a new technology in which the text representing a result of performing character recognition is obtained by supplementing the hidden characters.

BRIEF DESCRIPTION OF THE DRAWINGS

FIG. 4 is a diagram illustrating examples of hidden text areas;
FIG. 7 is a flowchart for explaining a sequence of operations performed by a character pattern recognizer;
FIG. 15 is a diagram for explaining an example of a frame-out truncated-type partially-hidden text area;
FIG. 17 is a diagram for explaining examples of obstruction-induced truncated-type partially-hidden text areas.

FIG. 43 is a diagram for explaining a method for integrating text line areas;

FIG. 48 is a diagram illustrating examples of frame-out truncated-type multiline text areas;

FIG. 50 is a diagram for explaining examples of obstruction-induced truncated-type multiline text areas;

DETAILED DESCRIPTION

According to an embodiment, a character recognition device includes a detector, a first recognizer, an estimator, a second recognizer, and an output unit. The detector is configured to detect a visible text area that represents an area in which a character is visible, from an input image. The first recognizer is configured to perform character pattern recognition with respect to the visible text area, and calculate a character pattern recognition cost according to a likelihood of a character pattern. The estimator is configured to estimate a partially-hidden text area into which a hidden text area and one or more visible text areas are integrated. The hidden text area represents an area estimated to have a hidden character. The second recognizer is configured to calculate an integrated cost into which the character pattern recognition cost calculated with respect to the visible text area included in the partially-hidden text area and a linguistic cost corresponding to a linguistic likelihood of a text that fits in the entire of the partially-hidden text area are integrated. The output unit is configured to output a text that is selected or ranked based on the integrated cost, as a result of character recognition performed with respect to the partially-hidden text area.

First Embodiment

A character recognition device according to a first embodiment performs text recognition with respect to text areas including characters (text) in an image that has been input (hereinafter, called an "input image"). At that time, character recognition is performed by supplementing the characters that are actually present but remain hidden and thus not visible in the input image. Meanwhile, in the explanation of the first embodiment, a text area represents the image area in which a single line of text is appearing. When a text appears over a plurality of lines, each line is treated as a. separate text area.

Classification of Blind Phenomenon

Figure 1:
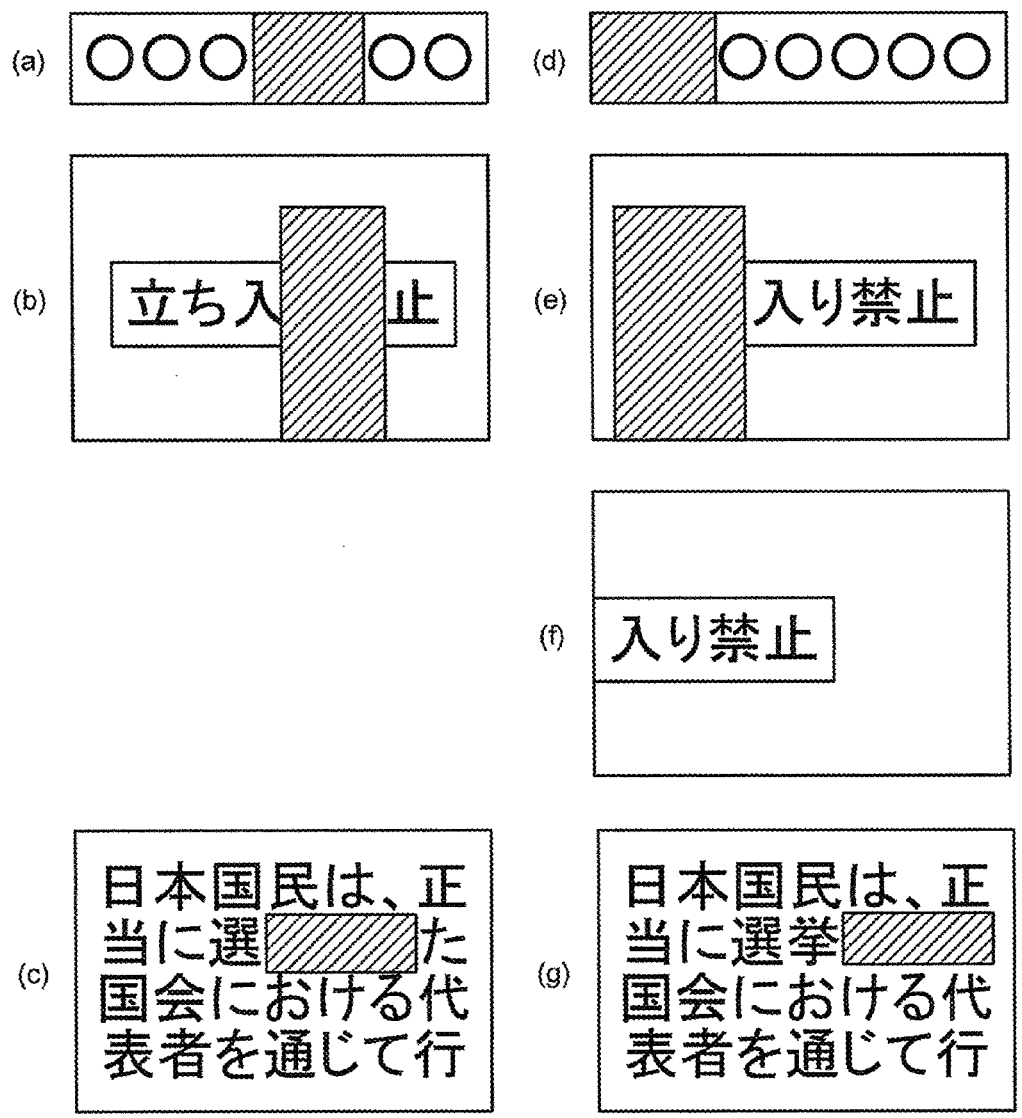
FIG. 1 is a diagram illustrating a blind phenomenon.

In the following example, the phenomenon in which the characters that are actually present but remain hidden is called a "blind phenomenon". FIG. 1 is a diagram illustrating the blind phenomenon. From the perspective of the position at which characters remain hidden in a text area, the blind phenomenon is classified into two types, namely, a "fragmented type" and a "truncated type".

As illustrated in (a) in FIG. 1, the "fragmented type" represents a pattern in which characters other than the characters at both ends of the text area remain hidden. In (b) in FIG. 1 is illustrated an example of the blind phenomenon of the fragmented type occurring in a scene image, in which characters located midway in a background signboard remain hidden due to an obstruction such as a power pole. In (c) in FIG. 1 is illustrated an example of the blind phenomenon of the fragmented type occurring in a scan image that is obtained by reading an original using a scanner. In the scan image, characters located midway in the second line of text are blacked out due to ink.

As illustrated in (d) in FIG. 1, the "truncated type" represents a pattern in which characters at the leading end or the tail end of a text area remain hidden. In (e) in FIG. 1 is illustrated an example of the blind phenomenon of the truncated type occurring in a scene image, in which characters at the left end of a background signboard remain hidden due to an obstruction such as a power pole. In (f) in FIG. 1 is illustrated another example of the blind phenomenon of the truncated type occurring in a scene image, in which a signboard has gone out of frame to the left side and the characters at the left end remain hidden. In (g) in FIG. 1 is illustrated an example of the blind phenomenon of the truncated type occurring in a scan image in which characters at the left end of the second line of text are blacked out due to ink. Meanwhile, in the following explanation, the blind phenomenon illustrated in (e) and (g) in FIG. 1 is called an "obstruction-induced truncated type", and the blind phenomenon illustrated in (f) in FIG. 1 is called a "frame-out truncated type".

Partially-Lost Character Phenomenon

The classification of the blind phenomenon as described above represents classification based on the manner in which characters remain hidden. However, in reality, the characters do not necessarily remain hidden in concert with the character boundaries. As illustrated in (a) and (b) in FIG. 2, there are times when hiding occurs midway through a character. This phenomenon is herein called a "partially-lost character phenomenon", and the concerned character is called a "partially-lost character" and the concerned character area is called and a "partially-lost character area", respectively. In the examples illustrated in (a) and (b) in FIG. 2, the areas enclosed by hatched lines represent the partially-lost character areas. The partially-lost character phenomenon may occur in any of the abovementioned types of the blind phenomenon, and may cause confusion in character recognition. In the first embodiment, the partially-lost character phenomenon is also dealt with.

Points to Note During Operations According to First Embodiment

As described above, in the first embodiment, the area covering a single line of text is treated as a text area. When a text appears over a plurality of lines, each line is treated as a separate text area.

Moreover, it is assumed that each text area is a rectangular area. Regarding text areas that are deformed due to projection distortion or rotation, as part of pre-processing, such text areas are detected and corrected so that a correct-position image is obtained; and then the operations according to the first embodiment are performed. Meanwhile, performing correction to obtain a correct-position image is a known technology. Hence, the detailed explanation is not given herein.

Meanwhile, it is assumed that a text written horizontally has the text direction from left to right, and a text written vertically has the text direction from top to bottom. In the case of dealing with a language such as Arabic that does not fit the criteria; the text direction can be adjusted.

Definition of Terms

Given below are the area-related terms used in the explanation of the first embodiment.

Visible text area: a rectangular area that includes a single line of text in which characters appear in continuity in an image is called a "visible text area". An area in which characters are not visible in an image due to the blind phenomenon is not considered as a visible text area.

Hidden text area: a rectangular area in which characters are actually present but remain hidden due to the blind phenomenon is called a "hidden text area".

Partially-hidden text area: from among arbitrary pairs of a visible text area and a hidden text area in an image, a single rectangular area made of adjacent pairs forming a single line of text is called a "partially-hidden text area".

Text area: the broader concept including visible text areas, hidden text areas, and a partially-hidden text area is called a "text area".

Configuration of Character Recognition Device

Figure 3:
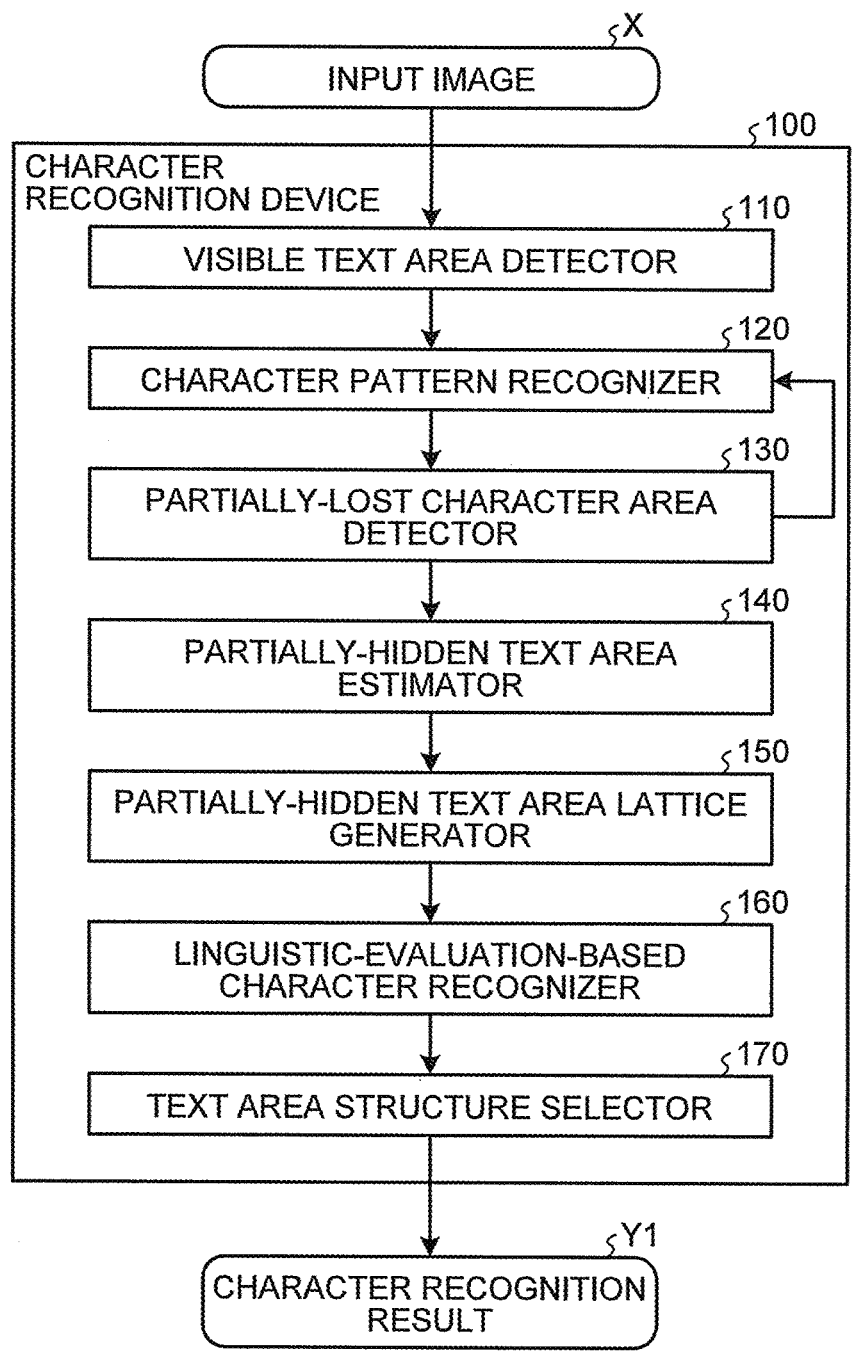
FIG. 3 is a block diagram illustrating a configuration example of a character recognition device according to a first embodiment.

FIG. 3 is a block diagram illustrating a configuration example of a character recognition device 100 according to the first embodiment. As illustrated in FIG. 3, the character recognition device 100 according to the first embodiment includes a visible text area detector 110 (a detector), a character pattern recognizer 120 (a first recognizer), a partially-lost character area detector 130, a partially-hidden text area estimator 140 (an estimator), a partially-hidden text area lattice generator 150, a linguistic-evaluation-based character recognizer 160 (a second recognizer), and a text area structure selector 170 (an output unit). In the character recognition device 100 according to the first embodiment, various estimation operations are performed, and cost is consistently used as the indicator with respect to the estimation results. Herein, cost represents an indicator having the opposite concept to the certainty factor and the score. Thus, higher the certainty factor, smaller becomes the cost.

The visible text area detector 110 detects visible text areas from an input image X. Herein, the visible text area detector 110 can perform operations using the existing technology. A specific example of the operations is explained later in detail.

The character pattern recognizer 120 performs character pattern recognition with respect to each visible text area, and outputs text candidates in a lattice format. The output lattice has paths corresponding to the text candidates which are obtained as a result of performing character pattern recognition. Moreover, each path has a cost assigned thereto according to the likelihood of the character pattern recognition with respect to the corresponding text candidate (hereinafter, such a cost is called a "character pattern recognition cost"). The character pattern recognizer 120 can perform operations using the existing technology. A specific example of the operations is explained later in detail.

Figure 2:
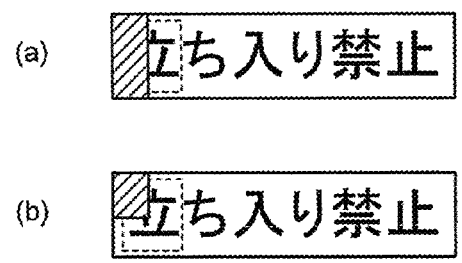
FIG. 2 is a diagram for explaining a partially-lost character.

The partially-lost character area detector 130 detects partially-lost character areas in which the partially-lost character phenomenon has occurred as illustrated in FIG. 2. In the first embodiment, two types of methods are provided. The first method is to reject areas having a low recognition cost. The second method is to detect partially-lost character areas using a detector. If a partially-lost character area is detected, it is removed from the visible text area to which the concerned characters belong. As a result, partially-lost characters are no more included in the visible target areas. A specific example of the operations is explained later in detail.

The partially-hidden text area estimator 140 estimates hidden text areas based on the visible text areas that have been detected, and then estimates a partially-hidden text area by integrating the hidden text areas. In FIG. 4 are illustrated examples of hidden text areas. In FIG. 4, (a) to (e) correspond to the specific examples of the blind phenomenon illustrated in FIG. 1, and the areas enclosed by heavy lines represent hidden text areas.

The partially-hidden text area estimator 140 detects the occurrence of the blind phenomenon based on, for example, the absolute positional relationship or the relative positional relationship between the visible text areas in the input image X; and then estimates adjacent hidden text areas. However, since the estimation accuracy is low, at this stage, excessive detection is done including detection of the candidates having a low certainty factor, and the detection is narrowed down in subsequent operations by performing detailed determination. A specific example of the operations is explained later in detail.

The partially-hidden text area lattice generator 150 generates a lattice of a partially-hidden text area. As described above, a partially-hidden text area represents a single rectangular area that, from among arbitrary pairs of a visible text area and a hidden text area in the image, is made of adjacent pairs forming a single line of text. The partially-hidden text area lattice generator 150 generates character string candidates, which can be applicable as the hidden text areas, in a lattice format; concatenates the lattice with a character string candidate lattice of the visible text areas; and obtains a lattice of the partially-hidden text area. However, regarding the applicable text candidates, a restriction is applied that the size estimated to be necessary in image expression in the case of using an equivalent font to adjacent visible text areas is substantially identical to the size of the hidden text areas.

Meanwhile, the lattice of a partially-hidden text area is assigned with the space cost of hidden text areas. As far the method of assigning the space cost is concerned, two methods are provided. One method is to assign the cost calculated from the spatial perspective. The other method is to identify the reason causing hiding, and to assign the cost according to the reason. A specific example of the operations is explained later in detail.

The linguistic-evaluation-based character recognizer 160 performs linguistic evaluation throughout the entire text area with respect to a partially-hidden text area group and with respect to individual visible text area groups, and performs comprehensive character recognition by combining the evaluation result with the character pattern recognition cost and the space cost that are already obtained. That is, the linguistic-evaluation-based character recognizer 160 calculates an integrated cost by integrating the character pattern recognition cost, the space cost, and the cost according to the linguistic likelihood of the text applicable to the entire partially-hidden text area (hereinafter, the calculated cost is called a "linguistic cost"); and performs comprehensive character recognition with respect to the partially-hidden text area. As a result, in the partially-hidden text area, a hidden text area is evaluated to be at a high level if that hidden text area fits in as small an area size as possible in the text to which linguistic appropriateness is assigned throughout the entire partially-hidden text. A specific example of the operations is explained later in detail.

The text area structure selector 170 determines an integration method for incorporating all visible text areas, which are detected from the input image X, in the partially-hidden text area; and outputs a character recognition result Y1 with respect to each text area included in the input image X. At that time, as the result of performing character recognition with respect to the partially-hidden text area, the text area structure selector 170 outputs the text that is selected or ranked based on the integrated cost.

There is a room for selection of the method of incorporating the visible text areas into the partially-hidden text area. For example, when three visible text areas are linearly present and when a hidden text is present in between the visible text areas, there is an option of integrating the three visible text areas into a single partially-hidden text area or there is an option of integrating two of the three visible text areas into a partially-hidden text area. Meanwhile, in the case of the blind phenomenon of the truncated type, there is a degree of freedom in the amount of extension of a hidden text area. In that regard, the text area structure selector 170 selects an integration method from all possible integration methods in such a way that the cost of each text area is the lowest. Then, the text area structure selector 170 outputs the character recognition result Y1 with respect to the text areas corresponding to the selected integration method. A specific example of the operations is explained later in detail.

Explained below are the details of the operations performed by each module constituting the character recognition device 100 according to the first embodiment.

Visible Text Area Detector

The visible text area detector 110 receives input of the input image X, detects all visible text areas included in the input image X, and outputs a visible text area group. The visible text area detector 110 performs operations using the existing technology. Herein, as an example, the explanation is given about the sequence of operations related to a spot method and a raster method.

Figure 5A:
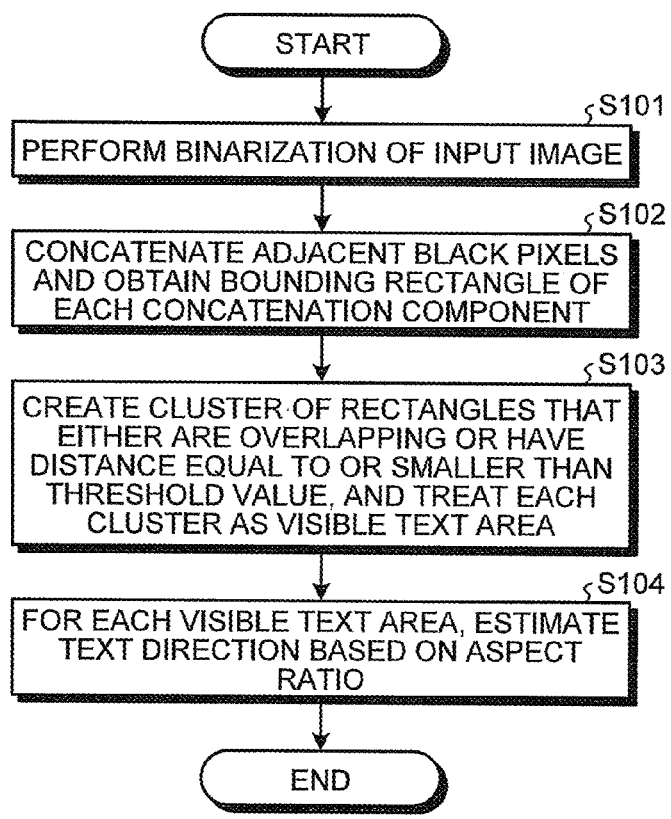
FIG. 5A is a flowchart for explaining a sequence of operations for detecting visible text areas according to a spot method.
Figure 5B:
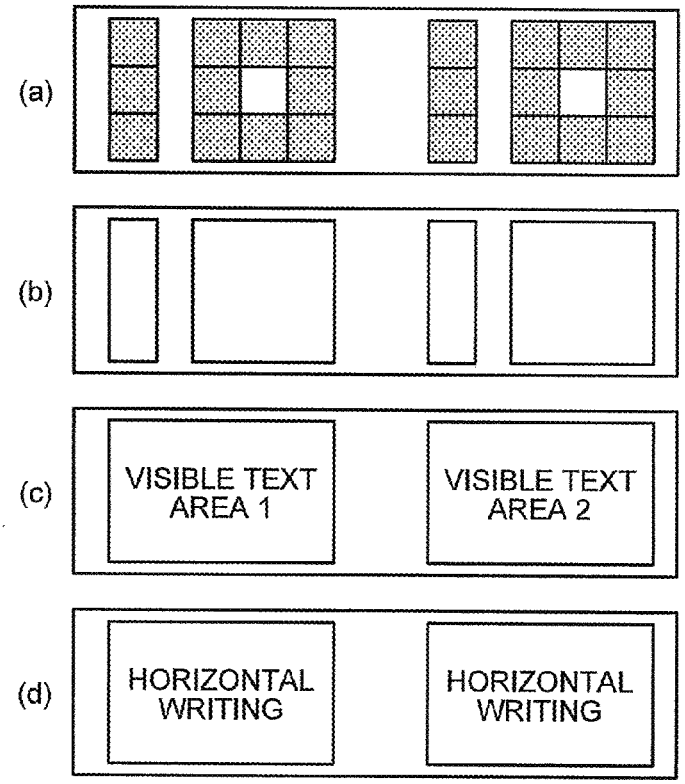
FIG. 5B is a diagram for explaining a specific example of the detection of visible text areas according to the spot method.

The spot method is suitable in processing an image such as a scene image or a scan image of a leaflet in which the text is included in a sparse manner or in which a vertical text as well as a horizontal text is included. FIG. 5A is a flowchart for explaining a sequence of operations for detecting the visible text areas according to the spot method. FIG. 5B is a diagram for explaining a specific example of the detection of visible text areas according to the spot method. For the purpose of illustration, the explanation is given for a casein which the background is bright and the characters are dark.

In the case of detecting visible text areas according to the spot method, the visible text area detector 110 performs the operations from Steps S101 to S104 explained below and detects visible text areas from the input image X.

Step S101: the visible text area detector 110 performs binarization of the input image X (see (a) in FIG. 5B).

Step S102: the visible text area detector 110 concatenates adjacent black pixels (a cluster of concatenated pixels is called a "concatenation component") and obtains the bounding rectangle of each concatenation component (see (b) in FIG. 5B).

Step S103: the visible text area detector 110 creates a cluster of rectangles that either are overlapping or have the distance equal to or smaller than a threshold value, and treats each cluster as a visible text area (see (c) in FIG. 5B).

Step S104: for each text area, the visible text area detector 110 estimates the text direction based on the aspect ratio. More particularly, if the aspect ratio indicates a vertically long text, vertical writing is estimated to be the text direction. Similarly, if the aspect ratio indicates a horizontal long text, horizontal writing is estimated to be the text direction. However, if the aspect ratio indicates a square, then the text direction is considered to be ambiguous (see (d) in FIG. 5B).

Figure 6A:
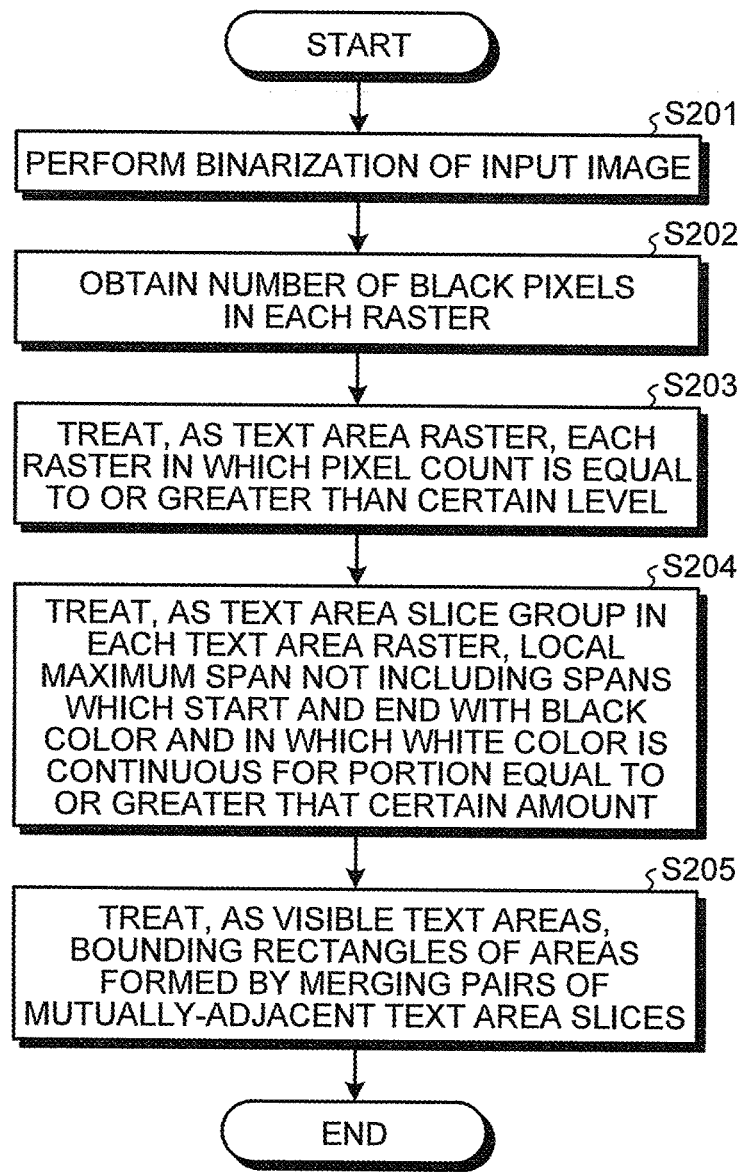
FIG. 6A is a flowchart for explaining a sequence of operations for detecting visible text areas according to a raster method.
Figure 6B:
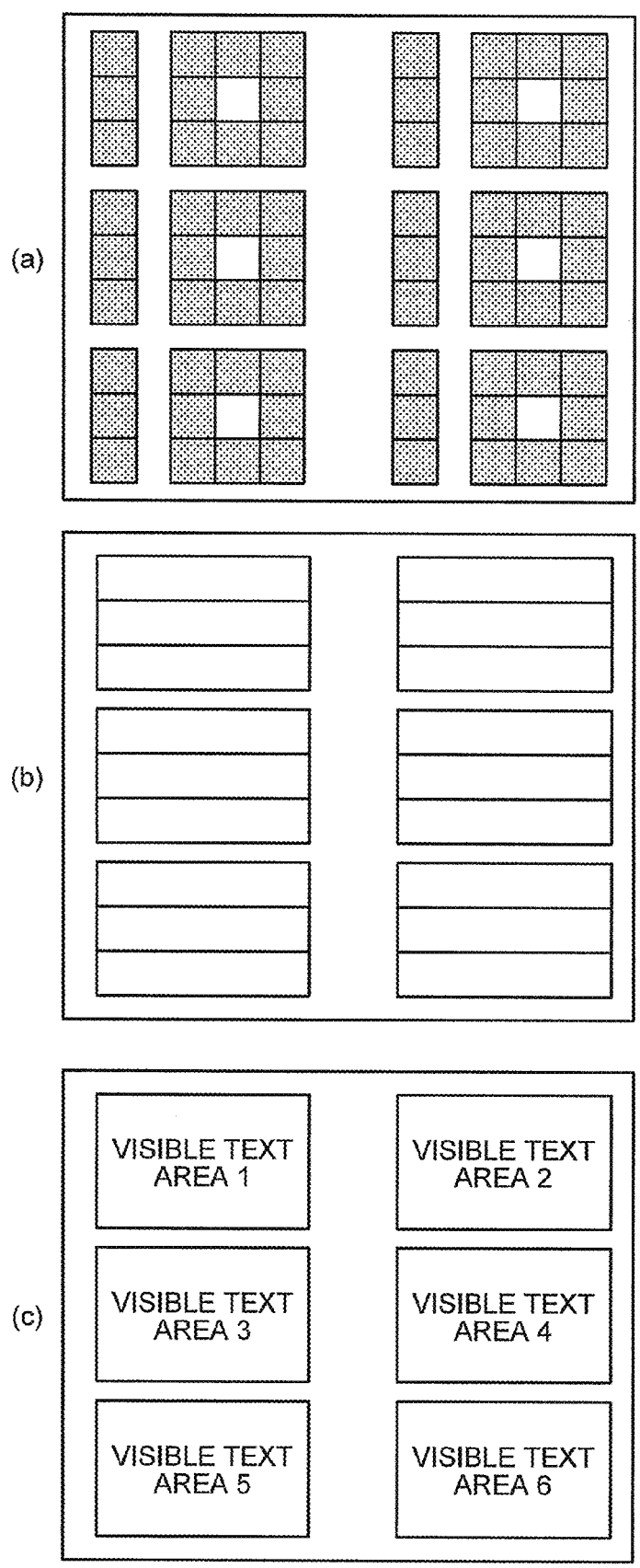
FIG. 6B is a diagram for explaining a specific example of the detection of visible text areas according to the raster method.

The raster method is suitable for an image such as a scan image of a thesis in which a majority of the area is occupied by the text in the same direction (vertical/horizontal). FIG. 6A is a flowchart for explaining a sequence of operations for detecting visible text areas according to the raster method. FIG. 6B is a diagram for explaining a specific example of the detection of visible text areas according to the raster method. For the purpose of illustration, the explanation is given for a case in which the background is bright, the characters are dark, and the text direction indicates horizontal writing.

In the case of detecting visible text areas according to the raster method, the visible text area detector 110 performs the operations from Steps S201 to S205 explained below and detects visible text areas from the input image X.

Step S201: the visible text area detector 110 performs binarization of the input image X (see (a) in FIG. 6B).

Step S202: the visible text area detector 110 obtains the number of black pixels in each raster.

Step S203: the visible text area detector 110 treats, as a text area raster, each raster in which the pixel count obtained is equal to or greater than a certain level.

Step S204: in each text area raster, the visible text area detector 110 treats, as a text area slice group, a local maximum span that does not include spans which start and end with black color and in which white color is continuous for a portion equal to or greater than a certain amount (see (b) in FIG. 6B).

Step S205: the visible text area detector 110 treats, as visible text areas, bounding rectangles of areas formed by merging pairs of mutually-adjacent text area slices (see (c) in FIG. 6B).

Character Pattern Recognizer

The character pattern recognizer 120 receives input of a visible text area group detected from the input image X by the visible text area detector 110; and outputs a text candidate group, which is obtained as the result of collation with the character pattern, and a lattice representing the character pattern recognition costs in the text candidate group. The character pattern recognizer 120 performs operations using the existing technology. Given below is the explanation of a typical sequence of operations in broad terms.

FIG. 7 is a flowchart for explaining a sequence of operations performed by the character pattern recognizer 120. With respect to the visible text area group detected by the visible text area detector 110, the character pattern recognizer 120 performs operations from Steps S301 to S309 explained below. Herein, a pattern model for each character type is prepared in advance and is called a "character type pattern dictionary".

Step S301: the character pattern recognizer 120 retrieves a single visible text area from the visible text area group.

Step S302: the character pattern recognizer 120 divides the visible text area, which is retrieved at Step S301, into areas (called "character component images") in the units of appropriate character components.

Step S303: the character pattern recognizer 120 selects a single character string candidate to be subjected to collation from among all character strings.

Step S304: the character pattern recognizer 120 sequentially retrieves a single character from the anterior side of the character string candidate selected at Step S303.

Step S305: the character pattern recognizer 120 retrieves, from the anterior side of the text, one or more character component image groups matching with the character type size of the character retrieved at Step S304; and calculates costs by performing collation with the character type pattern.

Step S306: the character pattern recognizer 120 determines whether or not all characters have been retrieved from the character string candidate selected at S303. If all characters have been retrieved (Yes at Step S306), then the system control proceeds to Step S307. However, if all characters have not been retrieved (No at Step S306), then the system control returns to Step S304.

Step S307: the character pattern recognizer 120 determines whether or not collation has been performed for all character string candidates. If collation has been performed for all character string candidates (Yes at Step S307), then the system control proceeds to Step S308. However, if collation has not been performed for all character string candidates (No at Step S307), then the system control returns to Step S303.

Step S308: the character pattern recognizer 120 integrates the collation result (a string including the character type and the cost) related to each character string candidate as the lattice of the visible text area retrieved at Step S301, and outputs the lattice.

Step S309: the character pattern recognizer 120 determines whether or not all visible text areas have been retrieved from the visible text area group. If all visible text areas have not been retrieved (No at Step S309), then the system controls returns to Step S301. When all visible text areas are retrieved, it marks the end of the operations.

Figure 8:
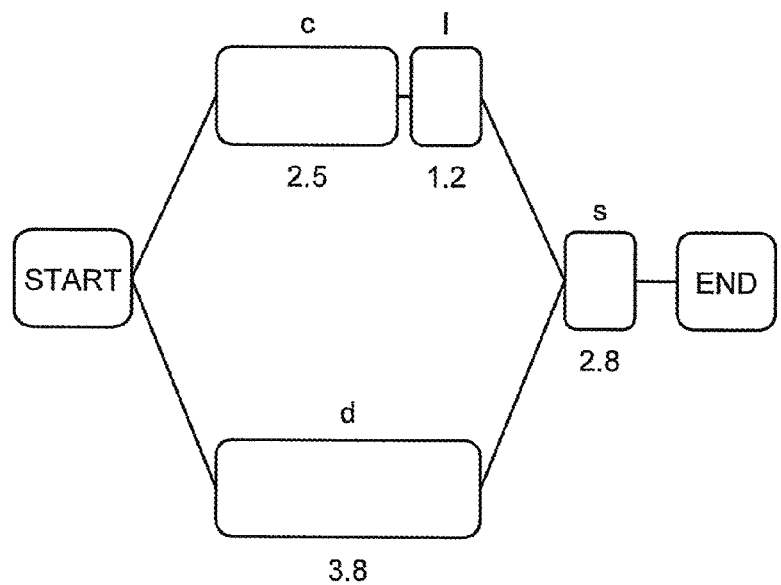
FIG. 8 is a diagram illustrating an exemplary lattice output by the character pattern recognizer.

FIG. 8 is a diagram illustrating an exemplary lattice output by the character pattern recognizer 120. Each node of the lattice has a recognition character and the cost. In a path joining the start node to the end node, the concatenation of characters in all nodes represents the recognition result of the character pattern; while the sum of the costs represents the character pattern recognition cost with respect to the entire character pattern. In the example illustrated in FIG. 8, "cls" and "ds" represent the two types of the recognition result of the character pattern and have the character pattern recognition costs of 6.5 and 6.6, respectively.

Partially-Lost Character Area Detector

The partially-lost character area detector 130 detects partially-lost character areas illustrated in FIG. 2. When a partially-lost character area is detected by the partially-lost character area detector 130, that area is removed from the visible text areas, and the operations performed by the character pattern recognizer 120 are again carried out. The object of using the partially-lost character area detector 130 is to repeat this sequence of operations, and completely eliminate the partially-lost character areas from the visible text areas. As far as the method by which the partially-lost character area detector 130 performs operations, one method is to use character recognition rejection and another method is to use a partially-lost character discriminator.

A partially-lost character has a different shape than any other character type. Hence, when the character recognition operation is performed, the recognition cost increases in a significant way. This fact is used in the method of using character recognition rejection. Thus, when the recognition cost is equal to or greater than a threshold value, the character is determined to be a partially-lost character.

Figure 9:
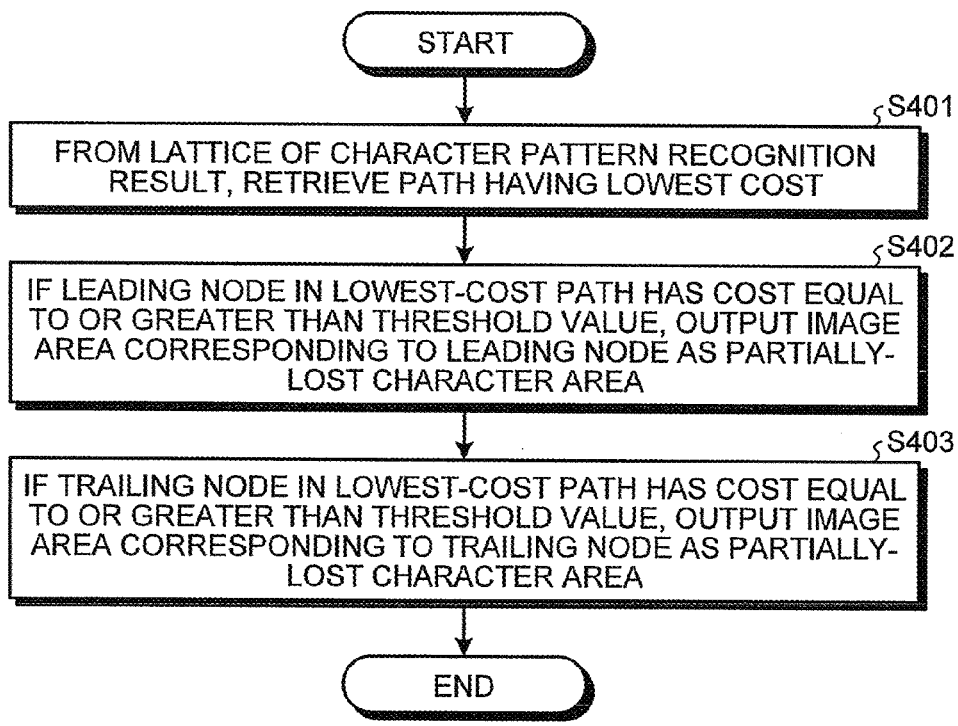
FIG. 9 is a flowchart for explaining a sequence of operations for detecting a partially-lost character area using character recognition rejection.

FIG. 9 is a flowchart for explaining a sequence of operations for detecting a partially-lost character area using character recognition rejection. In the case of detecting a partially-lost character area using character recognition rejection, the partially-lost character area detector 130 performs Steps S401 to S403 explained below using the lattice of the character pattern recognition result output by the character pattern recognizer 120, and detects a partially-lost character area.

Step S401: from the lattice of the character pattern recognition result output by the character pattern recognizer 120, the partially-lost character area detector 130 retrieves the path having the lowest cost.

Step S402: if the leading node in the lowest-cost path retrieved at Step S401 has the cost equal to or greater than a threshold value, then the partially-lost character area detector 130 outputs the image area corresponding to the leading node as a partially-lost character area.

Step S403: if the trailing node in the lowest-cost path retrieved at Step S401 has the cost equal to or greater than a threshold value, then the partially-lost character area detector 130 outputs the image area corresponding to the trailing node as a partially-lost character area.

Meanwhile, in the sequence of operations illustrated in FIG. 9, although only the lowest-cost path is used, it is not always true that the lowest-cost path is a correct recognition result. Hence, alternatively, the operations at Steps S402 and S403 can be performed with respect to each of the paths having lower k number of costs, and the logical sum is obtained.

In the method of using a partially-lost character discriminator, whether or not an area is a partially-lost character area is explicitly-determined. A large number of partially-lost character images and character images are prepared in advance, and a binary discriminator is generated using the images as training data. Then, partially-lost character areas are detected by sequentially applying the discriminator to the images that are clipped by a window which slides on the text areas.

Figure 10A:
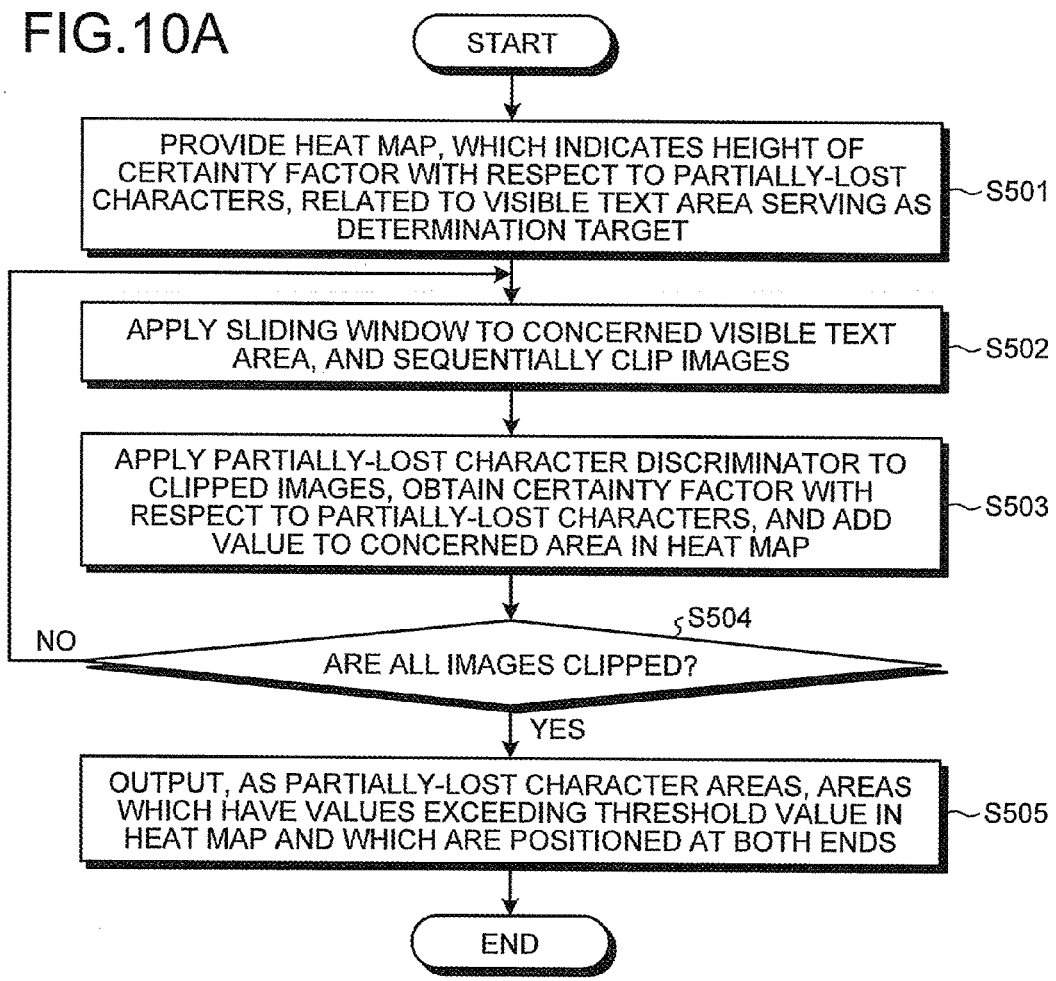
FIG. 10A is a flowchart for explaining a sequence of operations for detecting partially-lost character areas using a partially-lost character discriminator.
Figure 10B:
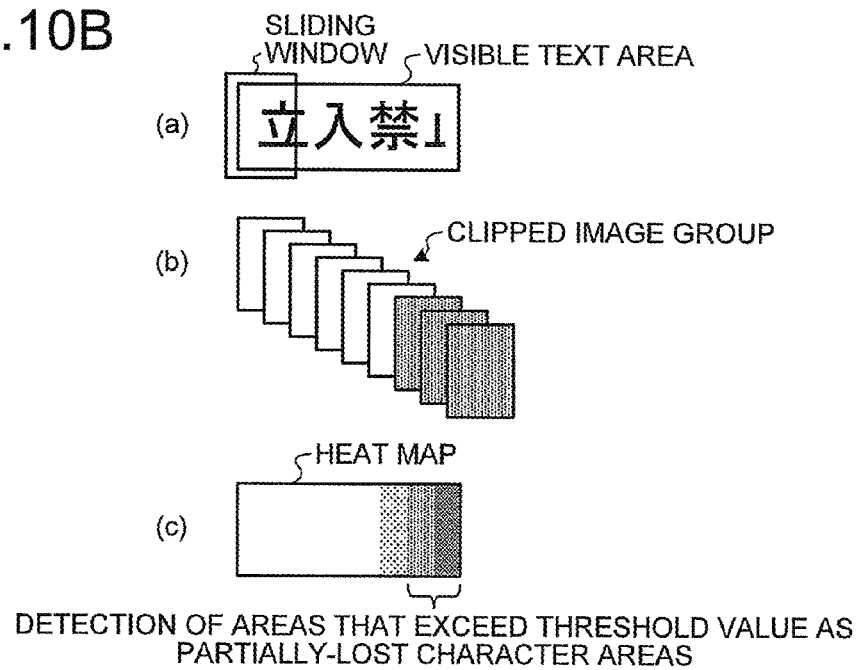
FIG. 10B is a diagram for explaining a specific example of the detection of partially-lost character areas using a partially-lost character discriminator.

FIG. 10A is a flowchart for explaining a sequence of operations for detecting partially-lost character areas using a partially-lost character discriminator. FIG. 10B is a diagram for explaining a specific example of the detection of partially-lost character areas using a partially-lost character discriminator. In the case of detecting partially-lost character areas using a partially-lost character discriminator, the partially-lost character area detector 130 performs operations from Steps S501 to S505 explained below and detects partially-lost character areas. Herein, it is assumed that the partially-lost character discriminator has been generated in advance by performing a training operation based on a binary classification method having the certainty factor (for example, based on logistic regression) using a large number of partially-lost character images and character images.

Step S501: the partially-lost character area detector 130 provides a heat map, which indicates the height of the certainty factor with respect to partially-lost characters, related to a visible text area serving as the determination target. The heat map is assumed to have the initial value of zero.

Step S502: the partially-lost character area detector 130 applies a sliding window to the visible text area serving as the determination target, and sequentially clips images (see (a) and (b) in FIG. 10B).

Step S503: the partially-lost character area detector 130 applies the partially-lost character discriminator to the clipped images, obtains the certainty factor with respect to partially-lost characters, and adds the value to the concerned area in the heat map.

Step S504: the partially-lost character area detector 130 determines whether all images are clipped in the range of the visible text area serving as the target determination. If all images are clipped (Yes at Step S504), then the system control proceeds to Step S505. However, if all images are not yet clipped, then the system control returns to Step S502.

Step S505: the partially-lost character area detector 130 outputs areas, which have values exceeding a threshold value in the heat map and which are positioned at both ends, as the partially-lost character areas (see (c) in FIG. 10B).

Partially-Hidden Text Area Estimator

The partially-hidden text area estimator 140 estimates a partially-hidden text area formed as a result of integrating visible text areas and hidden text areas. The partially-hidden text area estimator 140 estimates hidden text areas based on the visible text area group that is detected from the input image X by the visible text area detector 110. Moreover, the partially-hidden text area estimator 140 lists all possible integration methods (i.e., all possible partially-hidden text areas) based on the hidden text area group that is obtained and the visible text area group.

Regarding the operation for estimating hidden text areas, different modules are used to perform different sequences of operations with respect to the blind phenomenon of the fragmented type, the blind phenomenon of the frame-out truncated type, and the blind phenomenon of the obstruction-induced truncated type.

Figure 11:
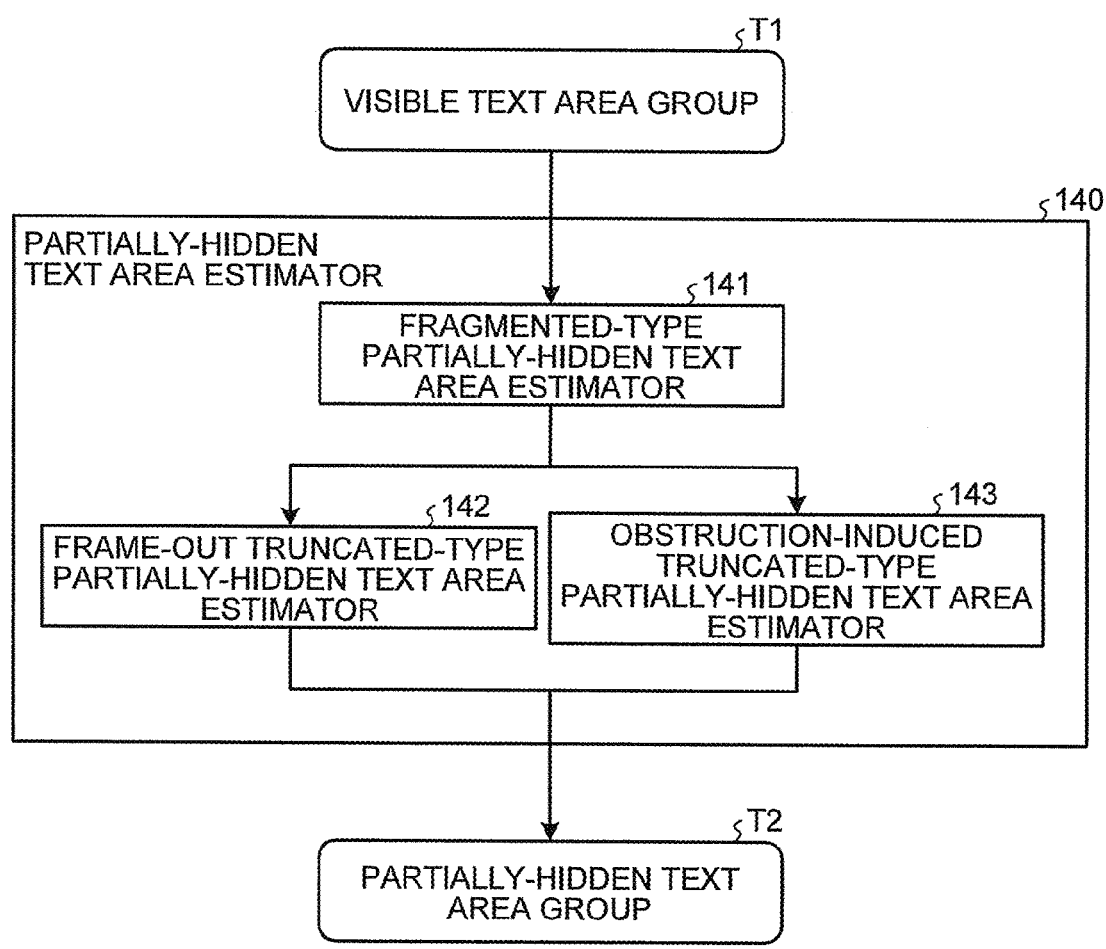
FIG. 11 is a block diagram illustrating a configuration example of a partially-hidden text area estimator.

FIG. 11 is a block diagram illustrating a configuration example of the partially-hidden text area estimator 140. As illustrated in FIG. 11, the partially-hidden text area estimator 140 includes a fragmented-type partially-hidden text area estimator 141, a frame-out truncated-type partially-hidden text area estimator 142, and an obstruction-induced truncated-type partially-hidden text area estimator 143. When a visible text area group T1 is input to the partially-hidden text area estimator 140, it is the fragmented-type partially-hidden text area estimator 141 that firstly performs operations with respect to the visible text area group T1. That is followed by the operations performed by the frame-out truncated-type partially-hidden text area estimator 142 or the obstruction-induced truncated-type partially-hidden text area estimator 143. Then, the partially-hidden text area estimator 140 combines the results of such operations and outputs a partially-hidden text area group T2.

Thus, with respect to the partially-hidden text area group generated by the fragmented-type partially-hidden text area estimator 141, there is a possibility that a hidden text area is assigned by the frame-out truncated-type partially-hidden text area estimator 142 or the obstruction-induced truncated-type partially-hidden text area estimator 143. Regarding the three types of operations described herein, it is also possible to perform only the required operations depending on the application. Meanwhile, in the configuration example illustrated in FIG. 11, the operations of the frame-out truncated-type partially-hidden text area estimator 142 or the operations of the obstruction-induced truncated-type partially-hidden text area estimator 143 are performed in a selective manner. Alternatively, the frame-out truncated-type partially-hidden text area estimator 142 and the obstruction-induced truncated-type partially-hidden text area estimator 143 can be connected in series so that the operations of both estimators can be performed.

Given below is the detailed explanation of the operations performed by each of the fragmented-type partially-hidden text area estimator 141, the frame-out truncated-type partially-hidden text area estimator 142, and the obstruction-induced truncated-type partially-hidden text area estimator 143.

Fragmented-Type Partially-Hidden Text Area Estimator

Regarding two or more visible text areas, the fragmented-type partially-hidden text area estimator 141 determines whether or not there are any hidden text areas between those visible text areas based on the positions and the sizes of the visible text areas. Then, the fragmented-type partially-hidden text area estimator 141 makes arbitrarily combinations of the visible text area group and the hidden text area group, and lists possible partially-hidden text areas.

Regarding the integration of a text area group into a partially-hidden text area, listed below are the conditions that need to be satisfied as far as the text areas constituting the text area group are concerned. The conditions are called "text area integration conditions". Meanwhile, not all of the text area integration conditions are mandatory, and conditions required for the integration into a partially-hidden text area can be appropriately selected according to the type of the input image X.

First condition: there are two or more constituent text areas.

Second condition: the constituent text areas are linearly arranged; and, when the text areas are projected on a vector perpendicular to the text direction, substantially same line segments are obtained (each line segment is substantially adjacent to the bounding rectangle).

Third condition: of the constituent visible text areas, the visible text areas without an ambiguous text direction have the text direction in the direction of arrangement of the text areas.

Fourth condition: in the constituent visible text areas, the coloration pattern, such as the background and the character color, is similar.

Fifth condition: in the constituent visible text areas, the scale of the character size is similar.

Sixth condition: in the constituent visible text areas, the depth has an error equal to or smaller than a threshold value.

Herein, the depth mentioned in the sixth condition represents the distance (depth) from the photographer in the case when the input image X is taken using a camera. For example, the depth represents information that is included in a depth-information-attached image (an RGB-D image) that is taken using a camera such as a light field camera capable of depth detection. The depth can be used in distinguishing between the obstruction on the near side and the signboard on the far side in a scene image.

Figure 12:
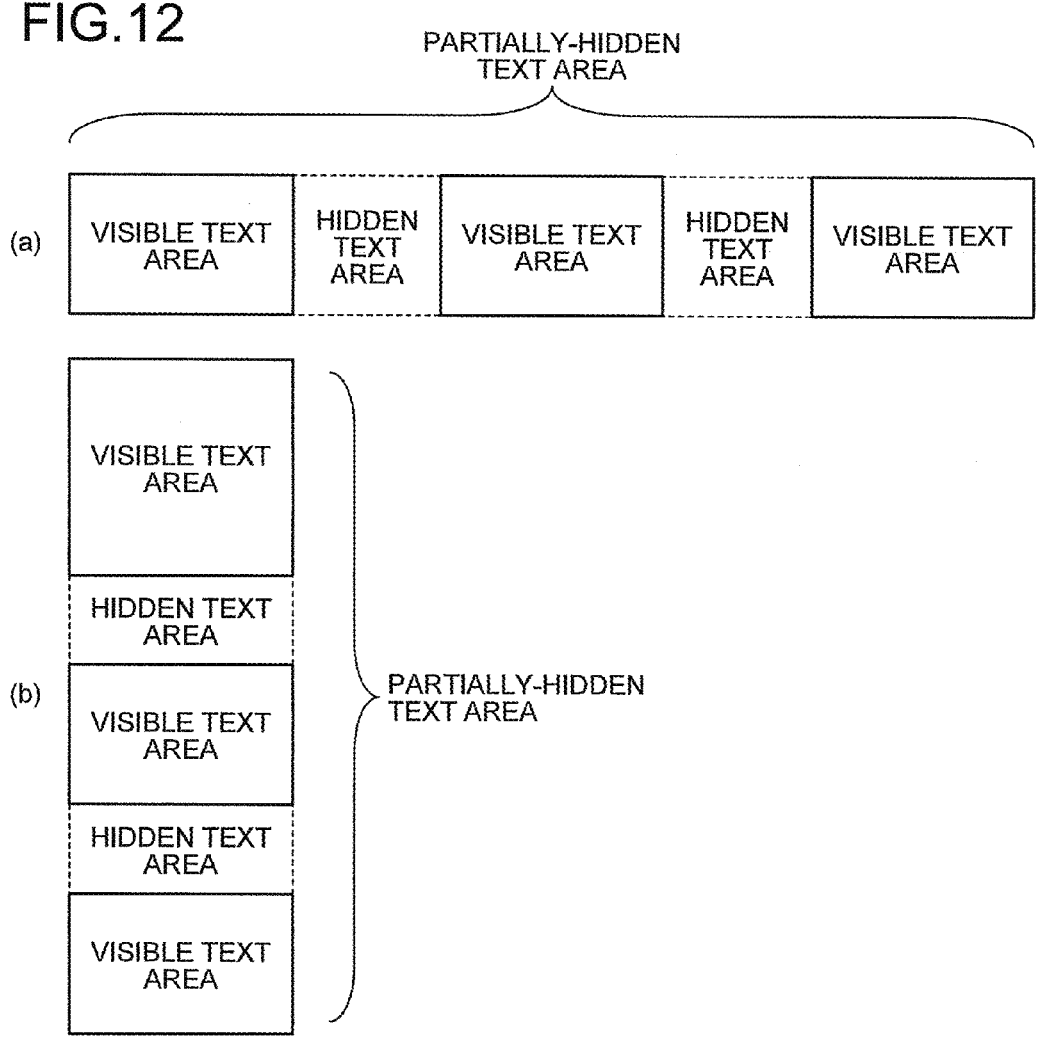
FIG. 12 is a diagram for explaining a method for integrating text areas.

FIG. 12 is a diagram for explaining the method for integrating text areas. In (a) in FIG. 12 is illustrated an example in which visible text areas and hidden text areas are integrated in the horizontal direction to form a partially-hidden text area; and the example satisfies the first to third conditions described above. In (b) in FIG. 12 is illustrated an example in which visible text areas and hidden text areas are integrated in the vertical direction to form a partially-hidden text area; and the example satisfies the first and second conditions described above.

Figure 13:
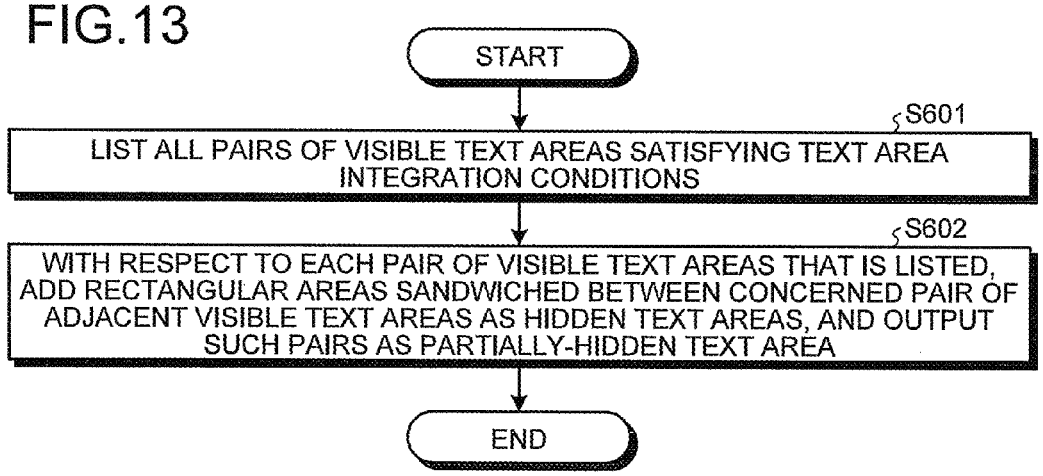
FIG. 13 is a flowchart for explaining a sequence of operations performed by a fragmented-type partially-hidden text area estimator.
Figure 14:
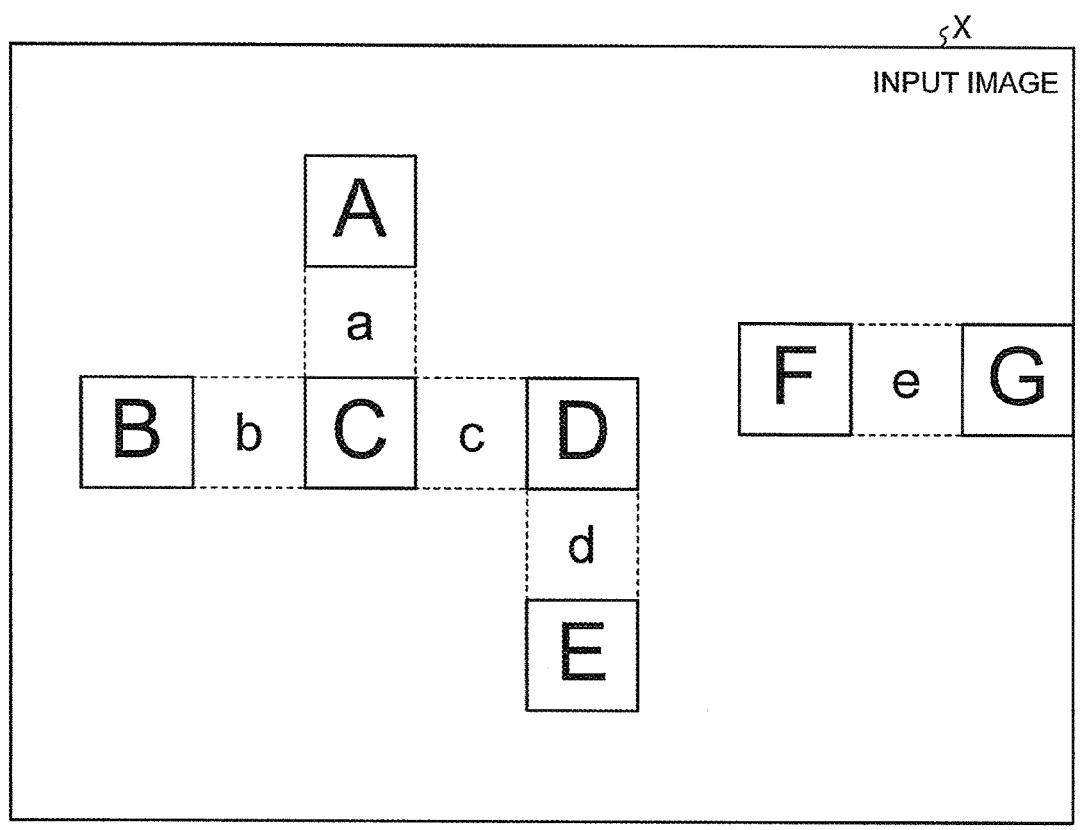
FIG. 14 is a diagram illustrating an exemplary structure of a partially-hidden text area.

Explained below with reference to FIGS. 13 and 14 is a specific example of the operations performed by the fragmented-type partially-hidden text area estimator 141. FIG. 13 is a flowchart for explaining a sequence of operations performed by the fragmented-type partially-hidden text area estimator 141. FIG. 14 is a diagram illustrating an exemplary structure of a partially-hidden text area. The fragmented-type partially-hidden text area estimator 141 performs the operations at Steps S601 and S602 explained below, and estimates a fragmented-type partially-hidden text area. Meanwhile, because the following explanation is about an algorithm, all visible text areas are assumed to have an ambiguous text direction.

Step S601: the fragmented-type partially-hidden text area estimator 141 lists all pairs of visible text areas satisfying the text area integration conditions. In the example illustrated in FIG. 14, the pairs of visible text areas listed at Step S601 are (A, C), (D, E), (B, C), (C, D), (B, C, D), and (F, G).

Step S602: with respect to each pair of visible text areas obtained at Step S601, the fragmented-type partially-hidden text area estimator 141 adds, as hidden text areas, all rectangular areas sandwiched between the concerned pair of adjacent visible text areas and outputs the result as a partially-hidden text area. In the example illustrated in FIG. 14, the partially-hidden text areas output at Step S602 are (A, a, C), (D, d, E), (B, b, C), (C, c, D), (B, b, C, c, D), and (F, e, G).

In the subsequent operations, the partially-hidden text areas concatenated in the horizontal direction are recognized to have the horizontal text direction and the partially-hidden text areas concatenated in the vertical direction are recognized to have the vertical text direction.

Frame-Out Truncated-Type Partially-Hidden Text Area Estimator

With respect to the visible text areas adjacent to the rim (the top side, the bottom side, the left side, and the right side) of the input image X or with respect to the partially-hidden text areas output by the fragmented-type partially-hidden text area estimator 141, under the assumption that hidden text areas are present on the outside of the sides of the input image X, the frame-out truncated-type partially-hidden text area estimator 142 estimates, as partially-hidden text areas, areas formed by extending the areas toward the outside of the sides of the input image X. However, unlike in the case of the fragmented type, there are no criteria for determining the size of the hidden text areas. Hence, the length of an area extended toward the outside of the sides of the input image X is determined according to the setting done in advance.

Regarding the method for setting the length of an extended area, for example, it is possible to think of a method of using the length based on the character size scale. Meanwhile, it is also possible to have a plurality of setting values. In that case, identical operations are performed using all setting values.

FIG. 15 is a diagram for explaining an example of a frame-out truncated-type partially-hidden text area. In (a) in FIG. 15 is illustrated an example in which the visible text area or the partially-hidden text area adjacent to the left side of the input image X is extended toward the outside from the left side of the input image X, and the post-extension area is treated as a partially-hidden text area. In (b) in FIG. 15 is illustrated an example in which the visible text area or the partially-hidden text area adjacent to the bottom side of the input image X is extended toward the outside from the bottom side of the input image X, and the post-extension area is treated as a partially-hidden text area. In each example, since there is no clue about the extent to which the area should be extended, area extension is done according to several types of lengths set in advance.

Figure 16:
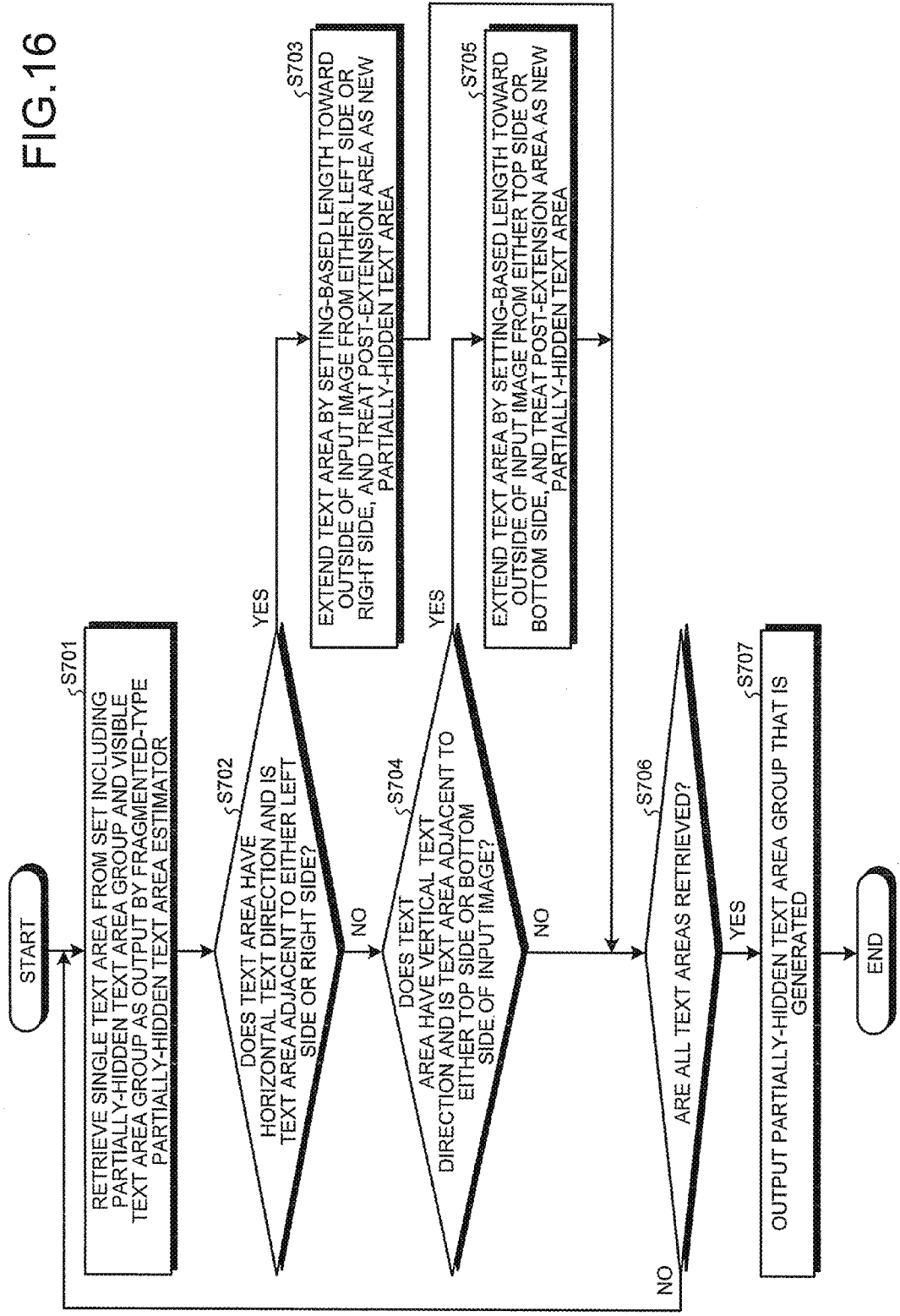
FIG. 16 is a flowchart for explaining a sequence of operations performed by a frame-out truncated-type partially-hidden text area estimator.

FIG. 16 is a flowchart for explaining a sequence of operations performed by the frame-out truncated-type partially-hidden text area estimator 142. Herein, the frame-out truncated-type partially-hidden text area estimator 142 performs the operations from Steps S701 to S707 explained below, and estimates a frame-out truncated-type partially-hidden text area.

Step S701: the frame-out truncated-type partially-hidden text area estimator 142 retrieves a single text area from the set including the partially-hidden text area group and the visible text area group as output by the fragmented-type partially-hidden text area estimator 141.

Step S702: the frame-out truncated-type partially-hidden text area estimator 142 determines whether or not the text area retrieved at Step S701 has the horizontal text direction and is adjacent to either the left side or the right side of the input image X. If both conditions are satisfied (Yes at Step S702), then the system control proceeds to Step S703. However, if any one condition is not satisfied (No at Step S702), the system control proceeds to Step S704.

Step S703: the frame-out truncated-type partially-hidden text area estimator 142 extends the text area, which is retrieved at Step S701, by the setting-based length toward the outside of the image from either the left side or the right side to which the text area is adjacent, and treats the post-extension area as a new partially-hidden text area.

Step S704: the frame-out truncated-type partially-hidden text area estimator 142 determines whether or not the text area retrieved at Step S701 has the vertical text direction and is adjacent to either the top side or the bottom side of the input image X. If both conditions are satisfied (Yes at Step S704), then the system control proceeds to Step S705. However, if any one condition is not satisfied (No at Step S704), the system control proceeds to Step S706.

Step S705: the frame-out truncated-type partially-hidden text area estimator 142 extends the text area, which is retrieved at Step S701, by the setting-based length toward the outside of the image from either the top side or the bottom side to which the text area is adjacent, and treats the post-extension area as a new partially-hidden text area.

Step S706: the frame-out truncated-type partially-hidden text area estimator 142 determines whether or not all text areas to be processed have been retrieved. If all text areas have been retrieved (Yes at Step S706), the system control proceeds to Step S707. However, if all text areas have not been retrieved (No at Step S706), then the system control returns to Step S701.

Step S707: the frame-out truncated-type partially-hidden text area estimator 142 outputs the partially-hidden text area group that is generated.

In the operations described above, the partially-hidden text areas extended in the horizontal direction are recognized to have the horizontal text direction and the partially-hidden text areas extended in the vertical direction are recognized to have the vertical text direction.

Obstruction-Induced Truncated-Type Partially-Hidden Text Area Estimator

With respect to all visible text areas or with respect to the partially-hidden text areas output by the fragmented-type partially-hidden text area estimator 141, under the assumption that hidden text areas are present on the anterior side of the text or on the posterior side of the text, the obstruction-induced truncated-type partially-hidden text area estimator 143 estimates, as partially-hidden text areas, areas formed by extending the text areas in the text direction. In an identical manner to the frame-out truncated type, the length of the extended area is determined according to the setting done in advance. Regarding the method for setting the length of the extended area, for example, it is possible to think of a method of using the length based on the character size scale of the original text areas. Meanwhile, it is also possible to have a plurality of setting values. In that case, identical operations are performed using all setting values. However, unlike in the case of the frame-out truncated type, there is an additional restriction on the length of the extended area that no overlapping occurs with other visible text areas.

FIG. 17 is a diagram for explaining examples of obstruction-induced truncated-type partially-hidden text areas. In (a) in FIG. 17 is illustrated an example in which a visible text area or a partially-hidden text area having the horizontal text direction is extended in the horizontal direction without causing overlapping with other visible text areas, and the post-extension area is treated as a partially-hidden text area. In (b) in FIG. 17 is illustrated an example in which a visible text area or a partially-hidden text area having the vertical text direction is extended in the vertical direction without causing overlapping with other visible text areas, and the post-extension area is treated as a partially-hidden text area. In each example, since there is no clue about the extent to which the area should be extended, area extension is done according to several types of lengths set in advance.

Figure 18:
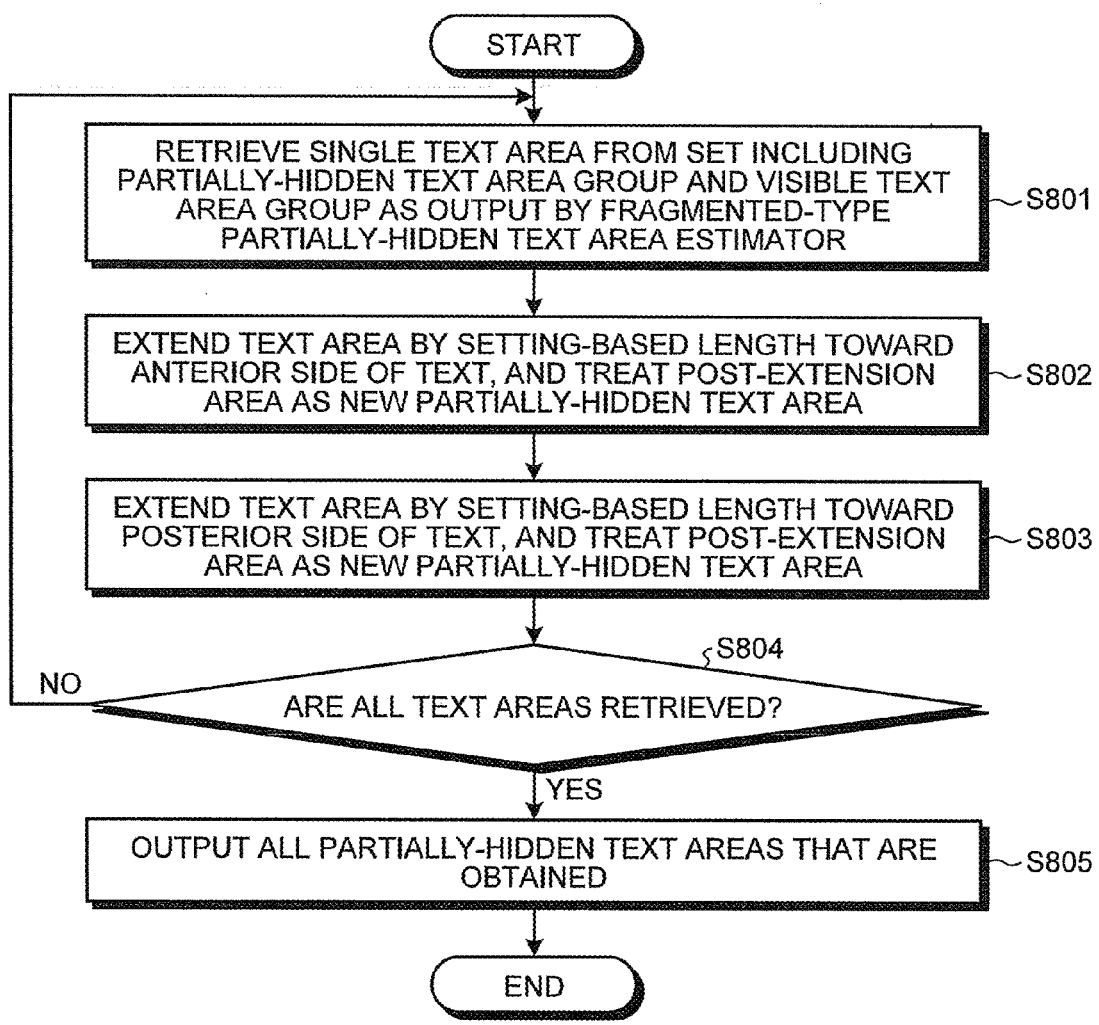
FIG. 18 is a flowchart for explaining a sequence of operations for estimating obstruction-induced truncated-type partially-hidden text areas.

FIG. 18 is a flowchart for explaining a sequence of operations performed by the obstruction-induced truncated-type partially-hidden text area estimator 143. Herein, the obstruction-induced truncated-type partially-hidden text area estimator 143 performs operations from Steps S801 to S805 explained below, and estimates an obstruction-induced truncated-type partially-hidden text area.

Step S801: the obstruction-induced truncated-type partially-hidden text area estimator 143 retrieves a single text area from the set including the hidden text area group and the visible text area group as output by the fragmented-type partially-hidden text area estimator 141.

Step S802: the obstruction-induced truncated-type partially-hidden text area estimator 143 extends the text area, which is retrieved at Step S801, by the setting-based length toward the anterior side of the text, and treats the post-extension area as a new partially-hidden text area. However, if extension according to the set length causes overlapping with other visible text areas, then that setting value is not used for extension.

Step S803: the obstruction-induced truncated-type partially-hidden text area estimator 143 extends the text area, which is retrieved at Step S801, by the setting-based length toward the posterior side of the text, and treats the post-extension area as a new partially-hidden text area. However, if extension according to the set length causes overlapping with other visible text areas, then that setting value is not used for extension.

Step S804: the obstruction-induced truncated-type partially-hidden text area estimator 143 determines whether or not all text areas to be processed have been retrieved. If all text areas have been retrieved (Yes at Step S804), the system control proceeds to Step S805. However, if all text areas have not been retrieved (No at Step S804), then the system control returns to Step S801.

Step S805: the obstruction-induced truncated-type partially-hidden text area estimator 143 outputs all partially-hidden text areas that are obtained.

In the operations described above, the partially-hidden text areas extended in the horizontal direction are recognized to have the horizontal text direction and the partially-hidden text areas extended in the vertical direction are recognized to have the vertical text direction.

Partially-Hidden Text Area Lattice Generator

With respect to each partially-hidden text area generated by the partially-hidden text area estimator 140, the partially-hidden text area lattice generator 150 generates a lattice in which text candidates across the entire area are listed along with the respective costs. For example, after generating the lattices of the partially-hidden text areas, the partially-hidden text area lattice generator 150 concatenates, in a chain-like manner, the lattices of the visible text areas as generated by the character pattern recognizer 120 and the lattices of the hidden text areas; and outputs the result as the lattice of a partially-hidden text area. In that case, during the operation for generating the lattices of the hidden text areas, since an image giving a clue about character estimation is not present in the hidden text areas, the character strings fitting according to the size of the area are treated as candidates and a lattice is output in which the candidates are listed.

Figure 19:
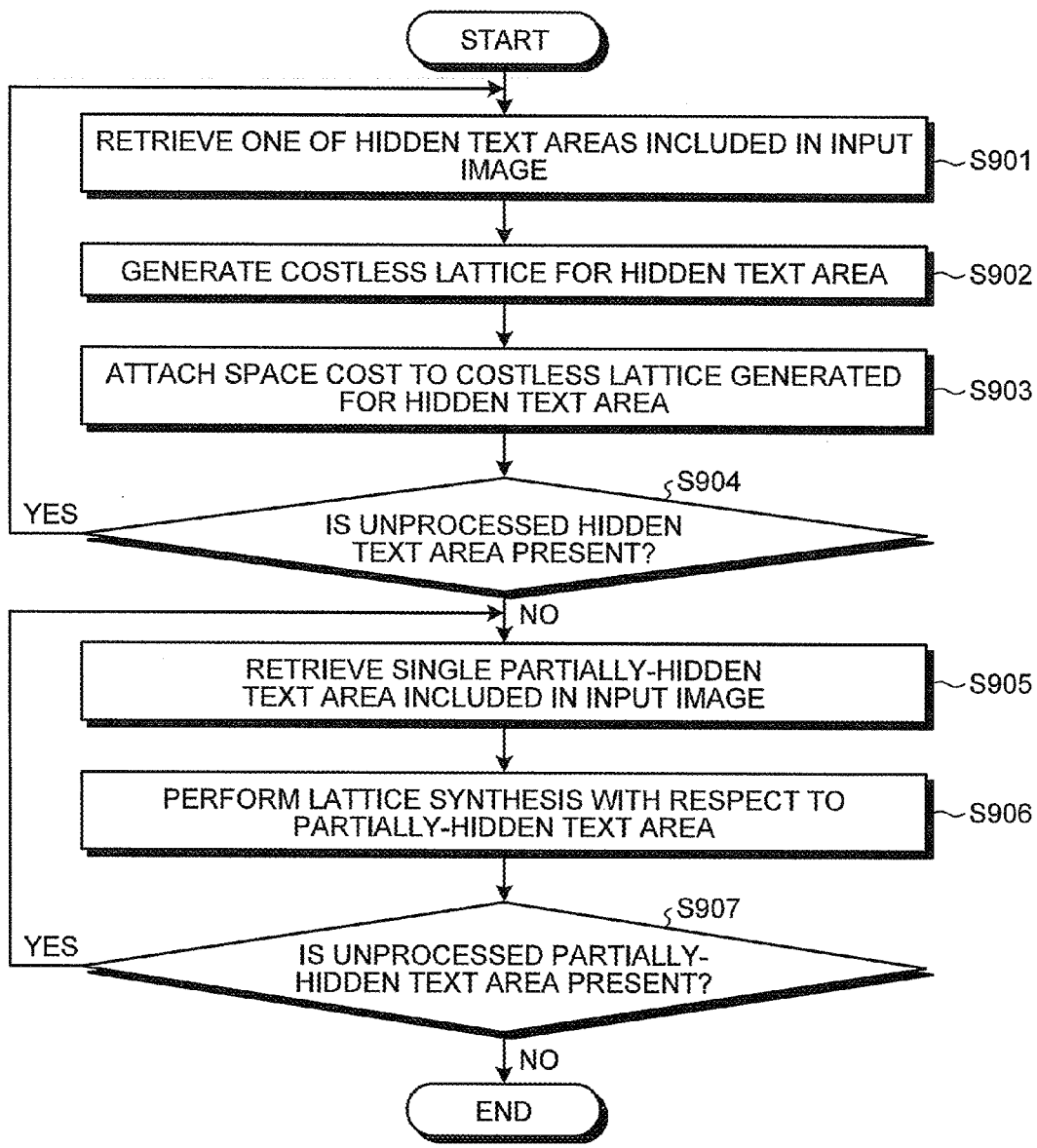
FIG. 19 is a flowchart for explaining a sequence of operations for generating a lattice of a partially-hidden text area.

FIG. 19 is a flowchart for explaining a sequence of operations for generating the lattice of a partially-hidden text area. The partially-hidden text area lattice generator 150 performs operations from Steps S901 to S907 explained below, and generates a lattice of a partially-hidden text area.

Step S901: the partially-hidden text area lattice generator 150 retrieves one of the hidden text areas included in the input image X.

Step S902: the partially-hidden text area lattice generator 150 generates a costless lattice for the hidden text area retrieved at Step S901. The detailed explanation of the operation is given later.

Step S903: the partially-hidden text area lattice generator 150 attaches a space cost to the costless lattice generated for the hidden text area at Step S902.

Step S904: the partially-hidden text area lattice generator 150 determines whether or not any unprocessed hidden text area is present. If no unprocessed hidden text area is present (No at Step S904), then the system control proceeds to Step S905. However, if any unprocessed hidden text area is present (Yes at Step S904), then the system control returns to Step S901.

Step S905: the partially-hidden text area lattice generator 150 retrieves a single partially-hidden text area included in the input image X.

Step S906: the partially-hidden text area lattice generator 150 performs lattice synthesis with respect to the partially-hidden text area retrieved at Step S905. The detailed explanation of the operation is given later.

Step S907: the partially-hidden text area lattice generator 150 determines whether or not any unprocessed partially-hidden text area is present. If any unprocessed partially-hidden text area is present (Yes at Step S907), then the system control returns to Step S905. However, if no unprocessed partially-hidden text area is present (No at Step S907), it marks the end of the operations.

Given below is the detailed explanation of the following operations: generating a costless lattice of a hidden text area at Step S902; attaching a space cost to a hidden text area lattice at Step S903; and performing lattice synthesis with respect to the partially-hidden text area at Step S906.

Generating Costless Lattice of Hidden Text Area

As preparation, a standard font dictionary is provided in which three sets of data having a uniform scale (a character type n, a height Yn, and a width Xn) are stored. Moreover, in all character types, Ymax represents the greatest height and Xmax represents the greatest width. The generation of a costless lattice for a hidden text area is different in the case of horizontal writing than in the case of vertical writing. Thus, the explanation for horizontal writing is given separately from the explanation for vertical writing.

Figure 20:
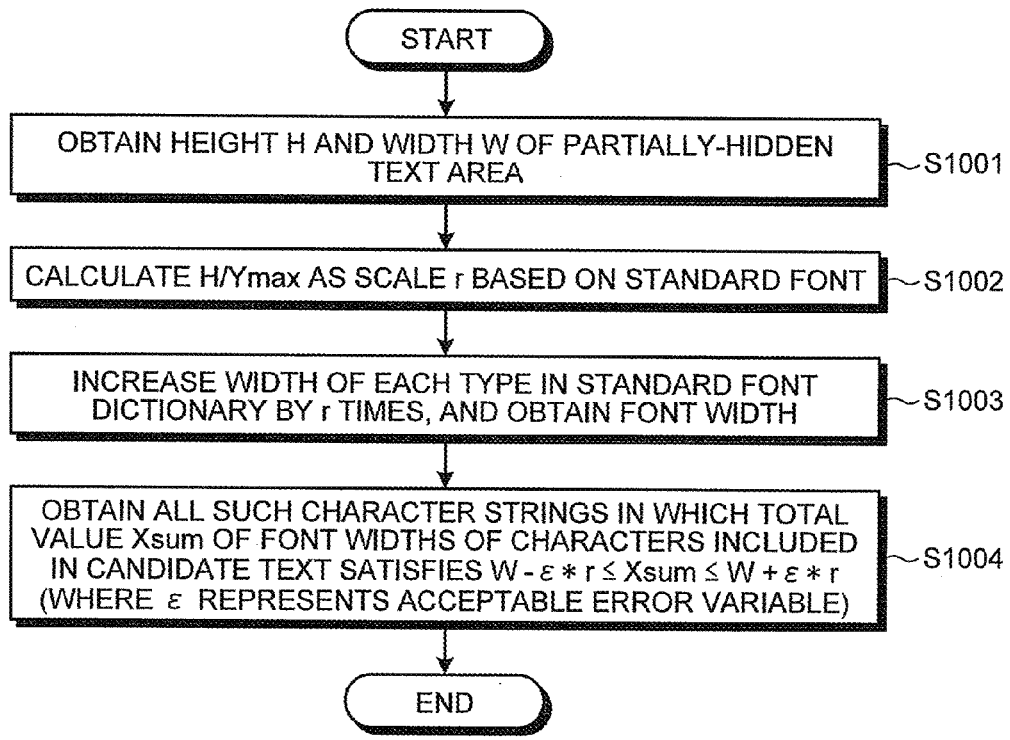
FIG. 20 is a flowchart for explaining a sequence of operations for generating a costless lattice for a horizontal hidden text area.

FIG. 20 is a flowchart for explaining a sequence of operations for generating a costless lattice for a horizontal hidden text area. The partially-hidden text area lattice generator 150 performs the operations from Steps S1001 to S1004 explained below, and generates a costless lattice for a horizontal hidden text area.

Step S1001: the partially-hidden text area lattice generator 150 obtains a height H and a width W of the partially-hidden text area to be processed.

Step S1002: the partially-hidden text area lattice generator 150 calculates H/Ymax as a scale r based on the standard font.

Step S1003: the partially-hidden text area lattice generator 150 increases the width of each character type in the standard font dictionary by r times. The increased width is called a "font width".

Step S1004: the partially-hidden text area lattice generator 150 obtains all such character strings in which a total value Xsum of the font widths of the characters included in a candidate text satisfies W−ϵ×r≤Xsum≤W+ϵ×r (where ϵ represents an acceptable error variable). These character strings represent text candidates, and the lattice having paths corresponding to such text candidates is set as the costless lattice of the hidden text area. Meanwhile, while setting the acceptable error variable ϵ, the margin around the text lines can also be taken into account.

Figure 21:
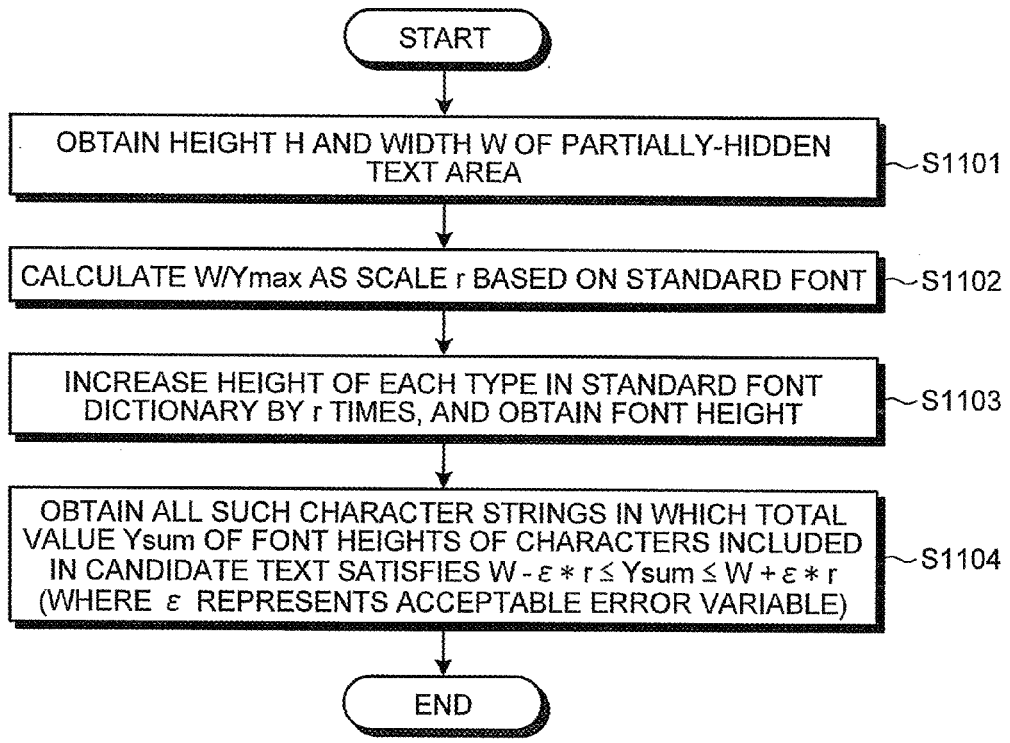
FIG. 21 is a flowchart for explaining a sequence of operations for generating a costless lattice for a vertical hidden text area.

FIG. 21 is a flowchart for explaining a sequence of operations for generating a costless lattice for a vertical hidden text area. The partially-hidden text area lattice generator 150 performs the operations from Steps S1101 to S1104 explained below, and generates a costless lattice for a vertical hidden text area.

Step S1101: the partially-hidden text area lattice generator 150 obtains a height H and a width W of the partially-hidden text area to be processed.

Step S1102: the partially-hidden text area lattice generator 150 calculates W/Ymax as the scale r based on the standard font.

Step S1103: the partially-hidden text area lattice generator 150 increases the height of each character type in the standard font dictionary by r times. The increased width is called a "font height".

Step S1104: the partially-hidden text area lattice generator 150 obtains all such character strings in which a total value Ysum of the font heights of the characters included in a candidate text satisfies W−ϵ×r≤Ysum≤W+ϵ×r (where ϵ represents an acceptable error variable). These character strings represent text candidates, and the lattice having paths corresponding to such text candidates is set as the costless lattice of the hidden text areas. Meanwhile, while setting the acceptable error variable ϵ, the margin around the text lines can also be taken into account.

Figure 22:
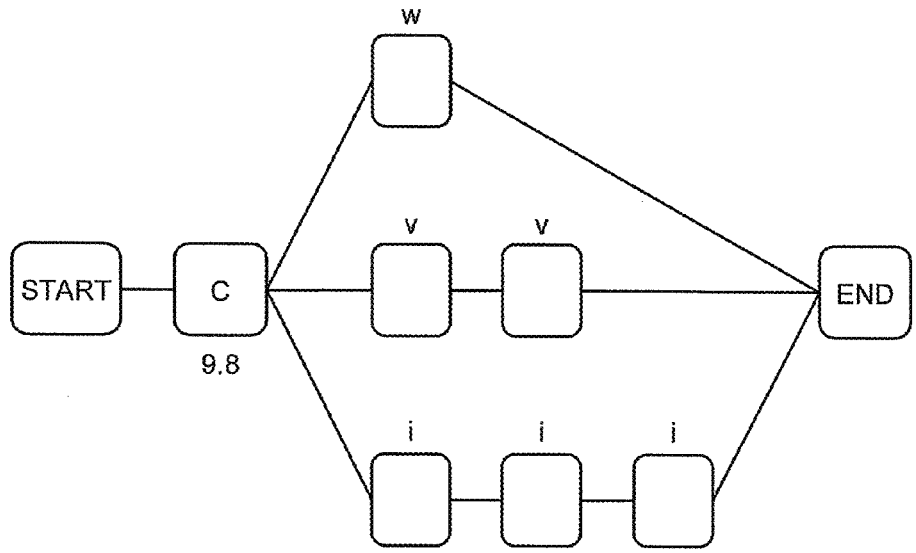
FIG. 22 is a diagram illustrating an exemplary lattice of a hidden text area.

FIG. 22 is a diagram illustrating an exemplary lattice of a hidden text area. In the example illustrated in FIG. 22, "w", "vv", and "iii" are character strings representing the text candidates that fit in a partially-hidden text area. Herein, the numerical value assigned to a node c in the lattice illustrated in FIG. 22 represents the space cost explained below.

Assignment of Space Cost to Hidden Text Area Lattice

The space cost represents a cost according to the probability of the hidden text area. As far as the method for assigning the space cost is concerned, one method is to assign the space cost according to the size of the hidden text area and another method is to assign the space cost according to the reason behind the blind environment. The first method is a versatile method that can be implemented to any type of area, while the second method is a specialized method that can be expected to produce a high degree of accuracy in regard to a particular reason behind the blind phenomenon. Since the two methods are mutually complementary, it is possible to combine the methods, such as by using the sum of the cost. The detailed explanation of the operations is given below.

Assignment of Space Cost According to Size

The space cost is assigned in the following manner.

In the case of horizontal writing: $-\ln(\alpha \times e^{(-W/H)})$

In the case of vertical writing: $-\ln(\alpha \times e^{(-H/W)})$

Herein, H represents the height of the hidden text area; W represents the width of the hidden text area; and α represents a pre-provided constant number for adjustment. Under the assumption of following the exponential distribution with respect to the length obtained by normalizing the occurrence probability of the hidden text area by the character scale; the negative logarithmic likelihood is set as the space cost. Thus, greater the size of the hidden text area, greater becomes the space cost.

The coefficient α can be assigned according to the type of the hidden text area such as the fragmented type, the frame-out truncated type, or the obstruction-induced truncated type. Such coefficient α is equivalent to the prior probability of each of the fragmented type, the frame-out truncated type, and the obstruction-induced truncated type. For example, as compared to the truncated type in which only one end is defined by a visible text area, the fragmented type in which both ends are sandwiched by visible text areas is believed to have a higher probability. Moreover, even in the truncated type, the frame-out truncated type having evidence in the form of image sides is believed to have a higher probability than the obstruction-induced truncated type. Such a difference in the probability can be set using the difference in the value of the coefficient α.

Regarding each hidden text area in the input image X, the partially-hidden text area lattice generator 150 calculates the space cost according to the size of the concerned hidden text area using the methods explained above; and assigns the calculated value of the space cost to the node C in the lattice illustrated in FIG. 22.

Assignment of Space Cost Based on Reason Behind Blind Phenomenon

Typical reasons behind the blind phenomenon can be understood in advance according to the types of the input image X. For example, in a scan image, blacking out due to ink is the typical reason behind the blind phenomenon. In a scene image, blown out highlights in the image, obstruction-induced hiding, and occurrence of frame-out are the typical reasons behind the blind phenomenon. In the present method, based on the result of explicit detection of such a reason, the space cost is assigned to the lattice of a hidden text area. This method has the advantage of being able to understand the probability of the hidden text area in a better way. However, the disadvantage is that the method can be applied only for a particular reason. Thus, it is favorable to implement this method in combination with the method of assigning the space cost according to the size.

Herein, the following facts are considered as the reasons behind the blind phenomenon. Meanwhile, considering the nature of the operations explained below, occurrence of frame-out is not considered for determination.

1: determination of blacking out due to ink
2: determination of blown out highlights
3: determination of an obstruction based on depth information
4: determination of an obstruction based on a specific object Given below are the methods for detecting the location of the reason.

1: when the average brightness of the target area is equal to or smaller than a threshold value, it is determined that the blind phenomenon caused has occurred in that area because of blacking out due to ink.
2: when the average brightness of the target area is equal to or greater than a threshold value, it is determined that the blind phenomenon has occurred in that area because of blown out highlights in the image.
3: when the depth of the target area is smaller by a certain amount or more than the depth of the adjacent visible text area, it is determined that the blind phenomenon has occurred in that area due to an obstruction.
4: when a specific-object detection operation (for example, a face detection operation) is performed with respect to the target area and when a specific object is detected, it is determined that the blind phenomenon has occurred in that area due to an obstruction.

When the reason is detected according to the sequence of operations described above, a constant value set in advance for each reason is assigned as the space cost. Moreover, if the output from the detectors related to the points 1 to 4 given above includes the certainty factor, then the cost can be assigned proportionate to the certainty factor.

Regarding each hidden text area in the input image X, the partially-hidden text area lattice generator 150 implements the methods described above and calculates the space cost according to the reason behind the blind phenomenon; and assigns the calculated value of the space cost to the node C in the lattice illustrated in FIG. 22.

Lattice Synthesis of Partially-Hidden Text Area

The partially-hidden text area lattice generator 150 links, in a chain-like manner, the lattices of the visible text areas and the lattices of the hidden text areas included in the partially-hidden text area; and generates a lattice representing a candidate text group of the entire partially-hidden text area.

Figure 23:
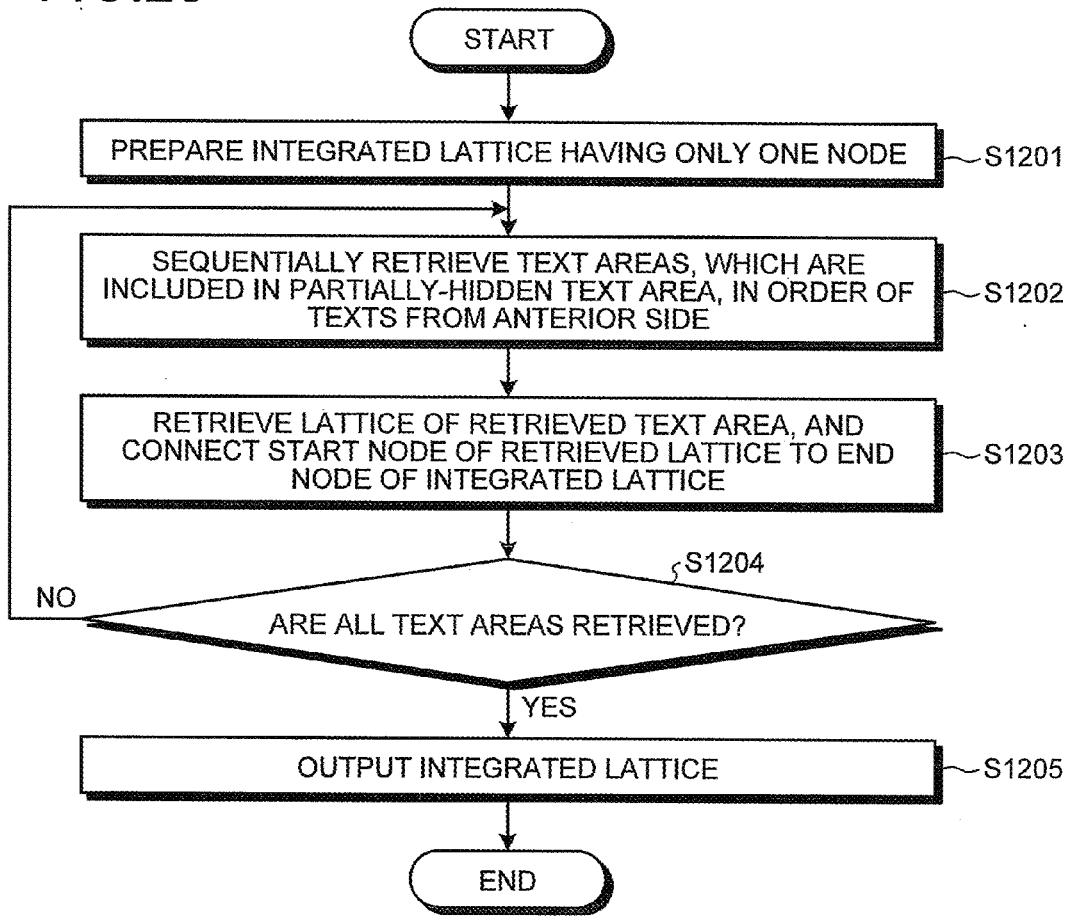
FIG. 23 is a flowchart for explaining a sequence of operations for generating a lattice for a partially-hidden text area.

FIG. 23 is a flowchart for explaining a sequence of operations for generating a lattice for a partially-hidden text area. The partially-hidden text area lattice generator 150 performs operations from Steps S1201 to S1205 explained below; and links, in a chain-like manner, the lattices of the visible text areas and the lattices of the hidden text areas, and generates a lattice for the partially-hidden text area.

Step S1201: the partially-hidden text area lattice generator 150 prepares a lattice having only a single node, which serves as the start node as well as the end node. This lattice is called an "integrated lattice".

Step S1202: the partially-hidden text area lattice generator 150 sequentially retrieves the text areas, which are included in the partially-hidden text area, in the order of texts from the anterior side (i.e., from the left side in horizontal writing, or from the top side in vertical writing).

Step S1203: the partially-hidden text area lattice generator 150 retrieves the lattice of the text area retrieved at Step S1202, and connects the start node of that lattice to the end node of the integrated lattice.

Step S1204: the partially-hidden text area lattice generator 150 determines whether or not all text areas have been retrieved from the partially-hidden text area to be processed. If all text areas have been retrieved (Yes at Step S1204), the system control proceeds to Step S1205. However, if all text areas have not been retrieved (No at Step S1204), then the system control returns to Step S1202.

Step S1205: the partially-hidden text area lattice generator 150 outputs the integrated lattice, which has been subjected to the sequence of operations described above, as the lattice of the partially-hidden text area.

Figure 24:
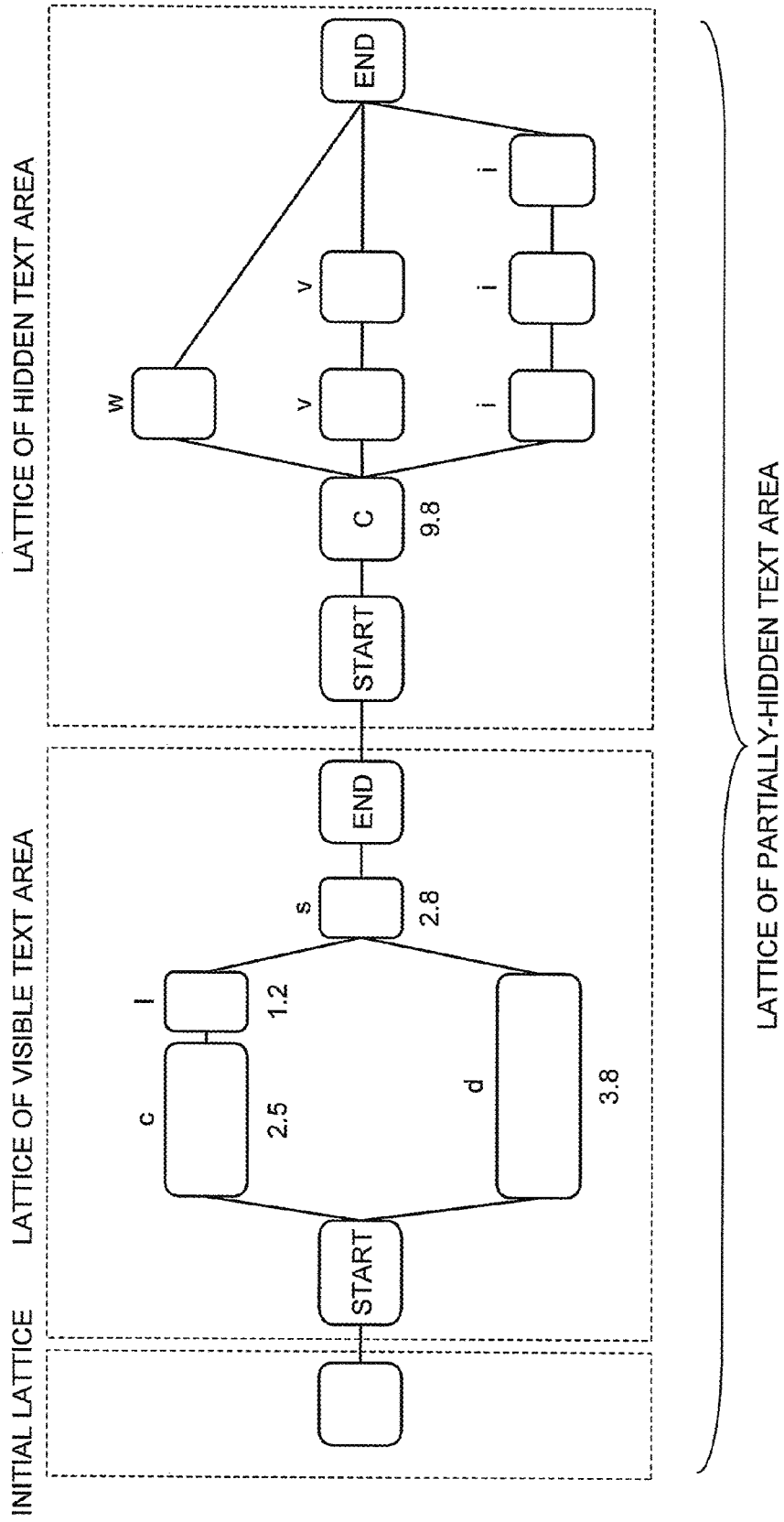
FIG. 24 is a diagram illustrating an exemplary lattice of a partially-hidden text area.

FIG. 24 is a diagram illustrating an example of the lattice of a partially-hidden text area. As illustrated in FIG. 24, the lattice of the partially-hidden text area includes the character pattern recognition cost of the visible text areas and the space cost of the hidden text areas.

Linguistic-Evaluation-Based Character Recognizer

The linguistic-evaluation-based character recognizer 160 performs linguistic evaluation through the entire text area with respect to the partially-hidden text area group and the visible text area group that are obtained; and performs a character recognition operation in which the character pattern recognition cost, the space cost, and the linguistic cost are taken into account.

Herein, linguistic evaluation implies calculation of likelihood with respect to each text candidate using a language model prepared in advance. In the operations performed till this stage, the visible text areas are assigned with lattices in which the character pattern recognition costs are reflected and the partially-hidden text area is assigned with a lattice in which the character pattern recognition cost as well as the space cost is reflected. The operation performed herein includes generating a synthesized lattice by adding linguistic evaluation to the abovementioned lattices, and finding the lowest-cost path in the synthesized lattice. The cost of each path in the synthesized lattice is equivalent to an integrated cost obtained by integrating the character recognition cost, the space cost, and a linguistic cost that depends on the linguistic likelihood of the text fitting in the entire partially-hidden text area.

Meanwhile, the linguistic evaluation is performed using the existing technology. As an example, given below is a brief explanation of a sequence of operations performed using a weighted finite state transducer (WFST). Regarding the linguistic evaluation using a WFST, the details are given in the reference literature mentioned below.

Reference literature: Mohri, Mehryar, et al. "Full expansion of context-dependent networks in large vocabulary speech recognition." Acoustics, Speech and Signal Processing, 1998. Proceedings of the 1998 IEEE International Conference on. Vol. 2. IEEE, 1998.

1: A probabilistic language model is generated using a language model builder. If the generative Ngram model that is a representative probabilistic language model is implemented, then a language model can be built using software such as SRILM (http://www.speech.sri.com/projects/srilm/) or IRSTLM (https://hlt.fbk.eu/technologies/irstlm-irst-language-modelling-toolkit). Alternatively, it is effective to use a probabilistic language model based on the pointwise mutual information (PMI), which represents a model in which the to-be-estimated probability of generation of the text is estimated based on the prior and subsequent texts, while ignoring the order of texts. There are times when this method is effective for the text of a signboard.

2: The probabilistic language model is converted into a WFST, which is referred to as L.

3: A finite state transducer (FST) is generated in which character strings are associated with word strings. The FST is referred to as G.

4: The lattice of the target text area for evaluation (a visible text area of a partially-hidden text area) is converted into a WFST, which is referred to as X.

5: A synthesizing operation of X●G●L is performed (where, "●" represents an operator representing synthesis), and the resultant WFST is obtained. The WFST is referred to as Y.

6: The path having the lowest cost is retrieved from Y. The resultant path is referred to as P.

7: The character string formed by linking the characters written in each node on the path P represents the estimation solution.

Text Area Structure Selector

The partially-hidden text area group that is obtained as a result of performing the operations is a selection candidate of the character recognition result Y1. The text area structure selector 170 determines the partially-hidden text area group that is ought to be eventually selected. Then, the text area structure selector 170 outputs, as the character recognition results Y1 with respect to the partially-hidden text areas, the texts selected or ranked based on the integrated cost.

The text area structure selector 170 selects such an integration method, from among all integration methods for generating the partially-hidden text area group using the visible text areas once at a maximum, in which the partially-hidden text area group and the visible text area group not incorporated into the partially-hidden text area group have the lowest total cost. This operation corresponds to a commonly-implemented combination optimization problem.

Figure 25:
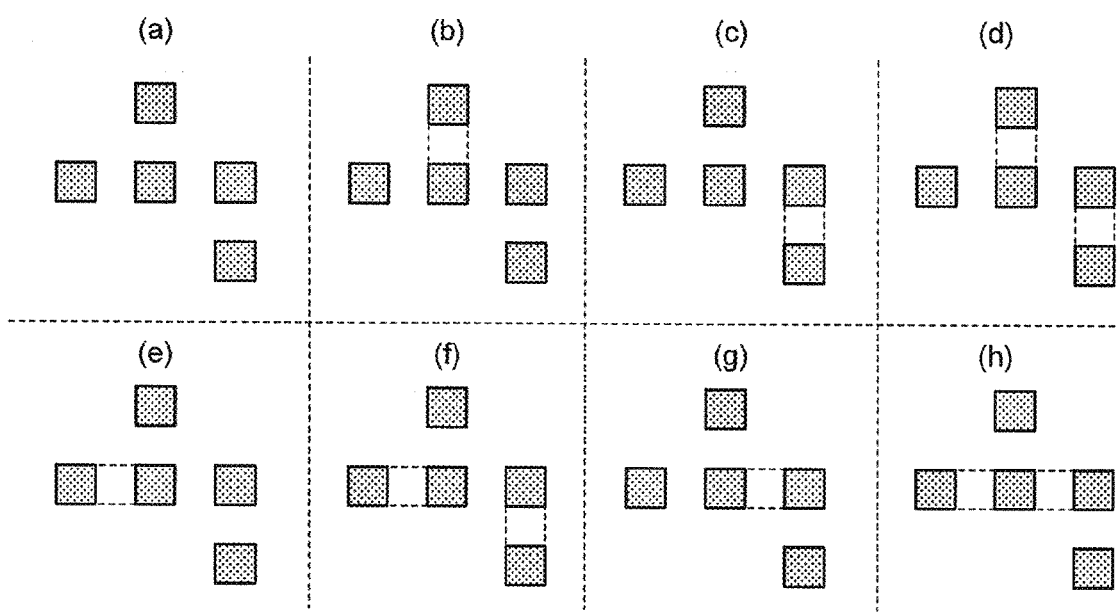
FIG. 25 is a diagram for explaining examples of integratable partially-hidden text areas.

In FIG. 25 are listed examples of partially-hidden text areas that can be integrated with the visible text area illustrated on the left side in FIG. 14. In FIG. 25, the areas having dots written therein represent visible text areas, and white areas enclosed by dashed lines represent hidden text areas. However, for the purpose of illustration, there is no truncated-type hidden text, and only fragmented-type hidden text is present. In this example, with respect to the visible text area group detected as (a) in FIG. 25, the partially-hidden text areas can be estimated by implementing seven methods illustrated in (b) to (h) in FIG. 25. With respect to the visible text areas and the partially-hidden text areas estimated according to the seven methods from (b) to (h), the costs have already been calculated according to the prior operations. Hence, such a method is selected in which the total cost is the lowest. Meanwhile, of the partially-hidden text area group and the visible text area group obtained as the result of operations described above, the text areas having the costs exceeding a threshold value can be removed from the recognition result.

Given below is the explanation of an example of recognition performed by the character recognition device 100 configured in the manner described above according to the first embodiment.

Examples of Recognition of the Fragmented-Type Blind Phenomenon

Figure 26:
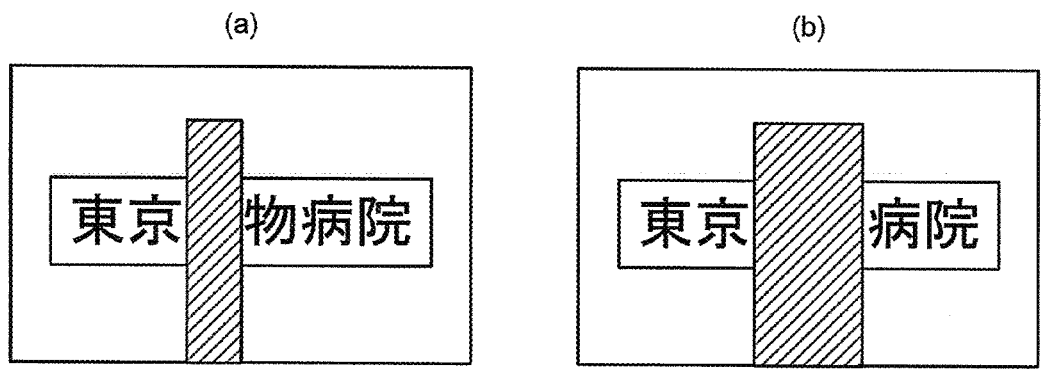
FIG. 26 is a diagram illustrating examples of recognition of a fragmented-type blind phenomenon.

FIG. 26 is a diagram illustrating examples of recognition of the fragmented-type blind phenomenon. In the examples illustrated in (a) and (a) in FIG. 26, the same image is considered except for the area obstructed by an obstruction. Moreover, it is assumed that the two visible text areas fragmented due to an obstruction are separated by a distance that enables linking of the visible text areas.

In the example illustrated in (a) in FIG. 26, the area in between two visible text areas is treated as a hidden text area, and the character recognition result Y1 is output in the form of 東京動物病院 (Tokyo animal hospital) in which 動物 (animal) is put in the hidden text area. In the example illustrated in (b) in FIG. 26, the area in between two visible text areas is treated as a hidden text area, and 東京動物病院 in which 動物 is put in the hidden text area is considered as one of the candidates. However, since the fragmentation width is large, it results in an increase in the space cost of the hidden text area that links the visible text areas. Besides, the terms 東京 (Tokyo) and 病院 (hospital) representing separate recognition of the two visible text areas are determined to be linguistically valid. Therefore, a method is selected in which the terms are not integrated but are treated as separate text areas. Hence, the character recognition result Y1 is output in the form of two texts, namely, 東京 and 病院.

Example of Recognition of the Truncated-Type Blind Phenomenon

Figure 27:
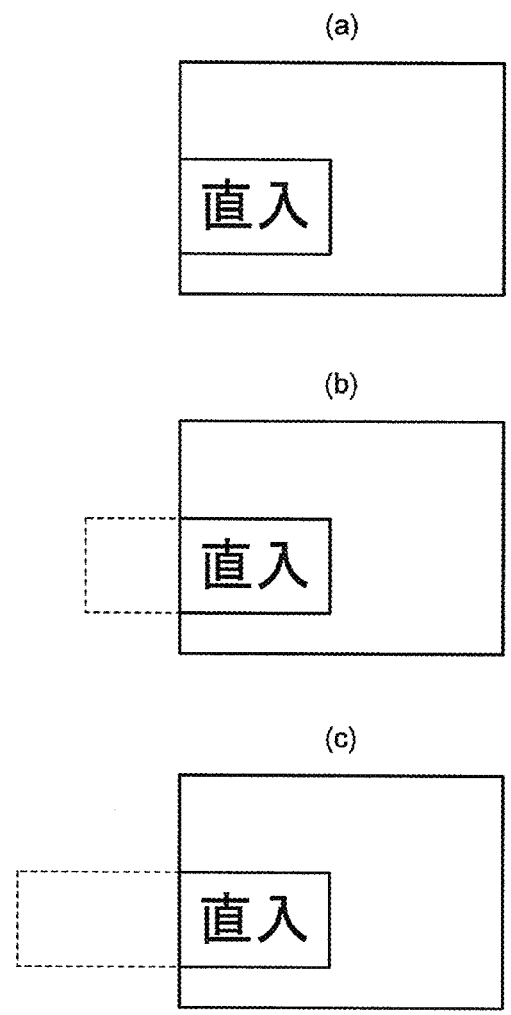
FIG. 27 is a diagram illustrating examples of recognition of a truncated-type blind phenomenon.

FIG. 27 is a diagram illustrating examples of recognition of the truncated-type blind phenomenon. In (a) in FIG. 27 is illustrated the input image X. Herein, assuming a hidden text area, the length for area extension is only one of two selection candidates including the length equal to a single character or the length equal to two characters. In (b) in FIG. 27 is illustrated an example in which the fitting text is searched under the assumption that the hidden text area has the length equal to a single character, while in (c) in FIG. 27 is illustrated an example in which the fitting text is searched under the assumption that the hidden text area has the length equal to two characters.

In the example illustrated in (b) in FIG. 27, for example, 真直入 (enter straight), 宿直入 (start night duty), and 立直入 (declare Riˆchi) are the candidates. Each of those candidates has a high linguistic cost (linguistic cost: large). However, since the hidden text area is equal in size to the size of a single character, the space cost is lower (space cost: small) than in the example illustrated in (c) in FIG. 27. Meanwhile, in the example illustrated in FIG. 27, for example, 単刀直入 (point-blank) is the candidate. This candidate has a low linguistic cost (linguistic cost: small). However, since the hidden text area is equal in size to the size of two characters, the space cost is higher (space cost:medium) than in the example illustrated in FIG. 27.

In the examples illustrated in (b) and (c) in FIG. 27, the character pattern recognition cost is same. Hence, the space costs and the linguistic costs are considered as comparison targets. In this example, 単刀直入 illustrated in (c) in FIG. 27 and having a lower linguistic cost is selected and is output as the character recognition result Y1.

As described above in detail with reference to specific examples, in the character recognition device 100 according to the first embodiment, the visible text area detector 110 detects visible text areas from the input image X, and the character pattern recognizer 120 performs character pattern recognition with respect to the visible text areas and calculates the character pattern recognition costs according to the likelihood of the character patterns. Then, the partially-hidden text area estimator 140 estimates a partially-hidden text area in which the visible text areas and the hidden text areas are integrated, and the partially-hidden text area lattice generator 150 and the linguistic-evaluation-based character recognizer 160 calculate an integrated cost in which the character recognition costs of the visible text areas included in the partially-hidden text area and the space costs of the hidden text areas are integrated with the linguistic cost corresponding to the linguistic likelihood of the text fitting the entire partially-hidden text area. Then, the text area structure selector 170 outputs, as the character recognition result Y1 with respect to the partially-hidden text area, the text that is -selected or ranked according to the integrated cost.

Thus, in the character recognition device 100 according to the first embodiment, the character recognition result Y1 can be obtained in the form of the text in which the hidden characters are supplemented.

Second Embodiment

Given below is the explanation of a second embodiment. The second embodiment relates to an image display device in which the character recognition device 100 according to the first embodiment is used.

Figure 28:
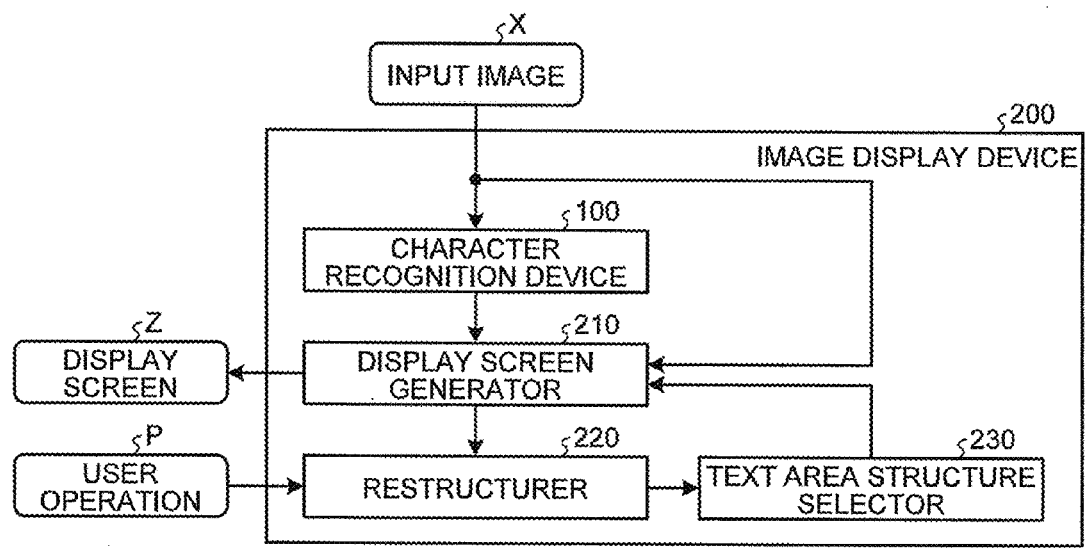
FIG. 28 is a block diagram illustrating a configuration example of an image display device according to a second embodiment.

FIG. 28 is a block diagram illustrating a configuration example of an image display device 200 according to the second embodiment. As illustrated in FIG. 28, the image display device 200 according to the second embodiment includes the character recognition device 100, a display screen generator 210, a restructurer 220, and a text area structure selector 230.

The image display device 200 according to the second embodiment displays the text representing the character recognition result Y1 (hereinafter, called a "recognition text") superimposed on the text areas that are detected from the input image X by the character recognition device 100. At that time, for example, the attention of the user is sought by displaying the text in an identifiable manner, such as by having a color code in which the text of the visible text areas is displayed in blue color and the text of the hidden text areas is displayed in green color.

Moreover, in the image display device 200 according to the second embodiment, as an optional function, a text representing the character recognition result Y1 is displayed also with respect to a partially-hidden text area that includes the hidden text areas rejected by the text area structure selector 170 of the character recognition device 100. At that time, for example, the text of the rejected hidden text areas is displayed in red color so that it can distinguished from the text of the selected hidden text areas.

Figure 29:
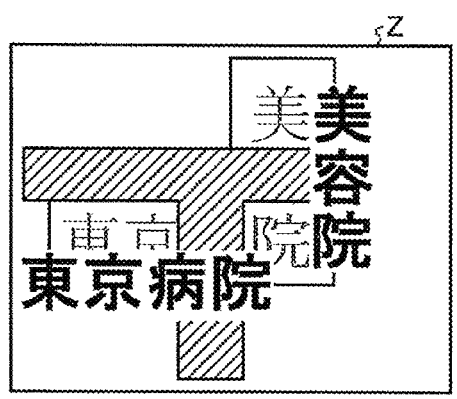
FIG. 29 is a diagram illustrating an example of a display screen displayed by the image display device.

FIG. 29 is a diagram illustrating an example of a display screen Z displayed by the image display device 200 according to the second embodiment. In FIG. 29, the text 東京病院 (Tokyo hospital) and the text 美容院 (beauty salon) are superimposed on the text detected from the input image X. Of such texts, the portion 容 of 美容院 represents the text of the hidden text area that was rejected. In the image display device 200 according to the second embodiment, if the user performs a predetermined operation such as clicking the text of the rejected hidden text area, the text area structure is rebuilt to accept the concerned hidden text area and the recognition result is redisplayed. As a result, in case there is an error in accepting and rejecting the hidden text areas, the error can be corrected by the user operation. In response to a change in the structure, the integration method changes in a chain reaction. Consequently, there are times when the text contents that are recognized and estimated also undergo a significant change.

As explained in the first embodiment, the character recognition device 100 receives the input image X and calculates the recognition text related to each text area. In the second embodiment, the character recognition device 100 not only outputs the recognition text but also outputs corresponding position information. Moreover, the character recognition device 100 outputs the recognition text of the text areas including the text areas rejected by the text area structure selector 170.

The display screen generator 210 receives the recognition text and the corresponding position information related to each text area from the character recognition device 100; generates the display screen Z in which the recognition text is superimposed at the position of each text area of an input image X1; and displays the display screen Z on a display. At that time, the display screen generator 210 displays the text in an identifiable manner. For example, the display screen generator 210 performs color coding of the text so that the text of the visible text areas is displayed in blue color, the text of the, selected hidden text areas is displayed in green color, and the text of the rejected hidden text areas is displayed in red color.

The restructurer 220 receives a user operation P that specifies an arbitrary hidden text area which was rejected, and then instructs the text area structure selector 230 to rebuild the text structure while accepting the hidden text area specified in the user operation P. Meanwhile, for example, by performing a clicking operation for a plurality of number of times while keeping the shift key pressed, it is also possible to receive the user operation P that specifies two or more rejected hidden text areas.

The text area structure selector 230 solves the combination optimization problem in an identical manner to the text area structure selector 170 of the character recognition device 100, and rebuilds the text area structure. However, at the time of solving the combination optimization problem, a restriction is applied that the partially-hidden text area having a user-specified hidden text area is included in the partially-hidden text area group to be generated. Once the text area structure selector 230 rebuilds the text area structure, the display screen generator 210 generates a display screen according to the rebuilt text area structure and displays the display screen on the display.

As described above, in the image display device 200 according to the second embodiment, the text representing the recognition result obtained by the character recognition device 100 can be presented to the user in an easy-to-understand manner. Moreover, the image display device 200 has the function of rebuilding the text area structure according to the user operation P. Hence, the image display device 200 can also be used as an editor for correcting the estimation errors in the text area structure. The data corrected by the image display device 200 according to the second embodiment can be used in various text applications such as in machine translation of text or in image retrieval as explained below.

Third Embodiment

Given below is the explanation of a third embodiment. The third embodiment relates to an image retrieval device in which the character recognition device 100 according to the first embodiment is used.

Figure 30:
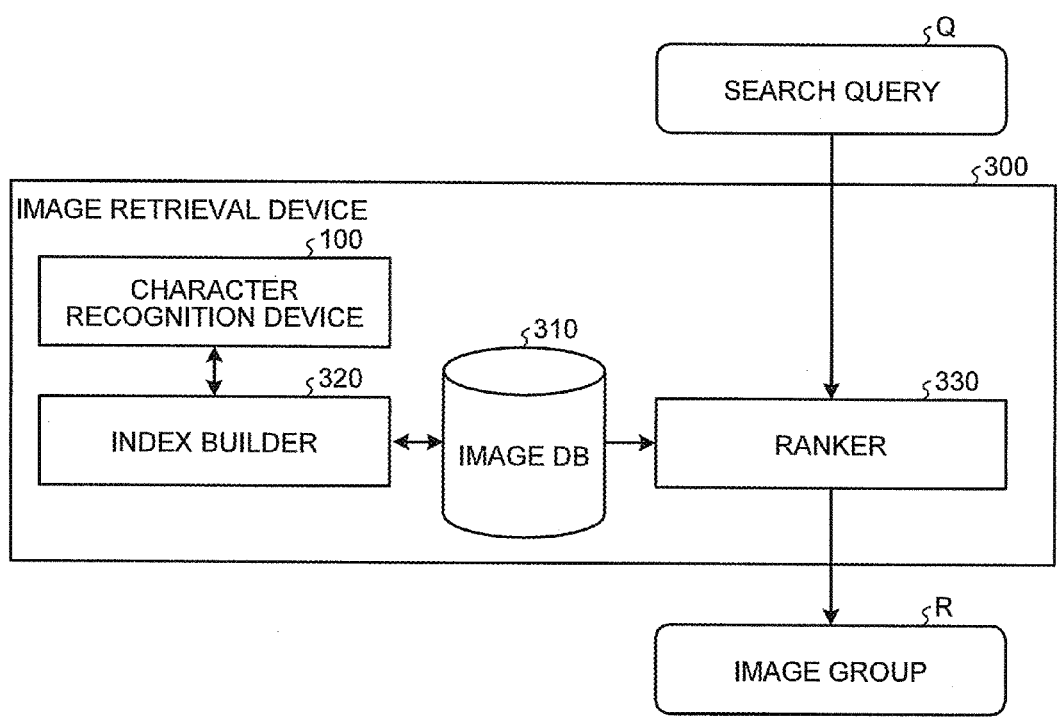
FIG. 30 is a block diagram illustrating a configuration example of an image retrieval device according to a third embodiment.

FIG. 30 is a block diagram illustrating a configuration example of an image retrieval device 300 according to the third embodiment. As illustrated in FIG. 30, the image retrieval device 300 according to the third embodiment includes the character recognition device 100, an image database (DB) 310, an index builder 320, and a ranker 330.

When a search query Q for performing a search using a text is received from the user, the image retrieval device 300 according to the third embodiment returns an image group R, from among the image groups stored in the image DB 310, that matches with the search query Q. Herein, collation between the search query Q and the images stored in the image DB 310 is done using the recognition text obtained as a result of character recognition performed by the character recognition device 100. That is, the recognition text output by the character recognition device 100 is used as the index of images.

As explained in the first embodiment, the character recognition device 100 outputs the recognition result in the form of a text including text areas which remain hidden due to the blind phenomenon. Hence, even if some part of the text is hidden, it becomes possible to perform matching with the search query Q. That enables achieving a higher recall rate as compared to the image retrieval performed using the existing technology. Meanwhile, the text in hidden text areas has a higher degree of uncertainty than the text in visible text areas. Hence, by adding an operation for varying the weights in the units of characters, the accuracy (can also be called precision) is enhanced.

In the image retrieval device 300 according to the third embodiment, as an optional function, regarding the text to be used as the index, the text of not only the text areas included in the integration method that is implemented by the text area structure selector 170 of the character recognition device 100 is used but the text of the text areas included in the integration methods rejected by the text area structure selector 170 is also used. Moreover, not only the recognition text of the lowest cost in each text area is used as the index, but the recognition text candidates ranked second or lower in the cost-based ranking are also used as the index. That enables achieving further enhancement in the recall rate of image retrieval. However, since the use of such indexes leads to a decline in the accuracy, an operation is added for varying the weight with respect to each index.

In the third embodiment, a method is implemented in which a search operation based on a word vector is performed. Herein, the word vector represents a high-dimensional vector in which each vocabulary is associated with one dimension and the value representing the frequency of occurrence of the concerned vocabulary is set as a vector element. A practical retrieval system often includes an operation for removing the vocabulary such as definite articles or particles that are not required in the search, or often has the inverted index installed therein for enhancing the search speed. However, herein, the explanation of such functions is not given. Meanwhile, as the search query Q that is received represents word strings separated by blank spaces.

In the image retrieval device 300 according to the third embodiment, firstly, in the index building phase, a recognition-text-based word vector is generated with respect to each image stored in the image DB 310, and registers the word vectors as the image index. In the search phase, the word vectors are generated from the search query Q. Then, for each image, the total of cosine scales (called "search scores") with the word vectors registered as the image index is calculated sequentially on an image-by-image basis; and the image group R is output in which the search scores are arranged in descending order. As far as the image index is concerned, the result of multiplying different weights ($\lambda 1$ to $\lambda 8$) with the frequency based on the text given below is used. Meanwhile, if indicators for the magnitude of association among the vectors are available, then any indicator other than the cosine scale can be used.

$\lambda 1$: the weight with respect to the recognition text of a first candidate for a selected visible text area $\lambda 2$: the weight with respect to the recognition text of a second candidate for a selected visible text area $\lambda 3$: the weight with respect to the recognition text of a first candidate for a selected hidden text area $\lambda 4$: the weight with respect to the recognition text of a second candidate for a selected hidden text area $\lambda 5$: the weight with respect to the recognition text of a first candidate for a rejected visible text area $\lambda 6$: the weight with respect to the recognition text of a second candidate for a rejected visible text area $\lambda 7$: the weight with respect to the recognition text of a first candidate for a rejected hidden text area $\lambda 8$: the weight with respect to the recognition text of a second candidate for a rejected hidden text area As explained in the first embodiment, the character recognition device receives the input image X and calculates the recognition text related to each text area. In the third embodiment, the input image X represents each image stored in the image DB 310.

The index builder 320 performs an operation in which, with respect to each image stored in the image DB 310, the recognition texts obtained by the character recognition device 100 are attached as the index. This operation is performed in advance before the start of image retrieval.

Figure 31:
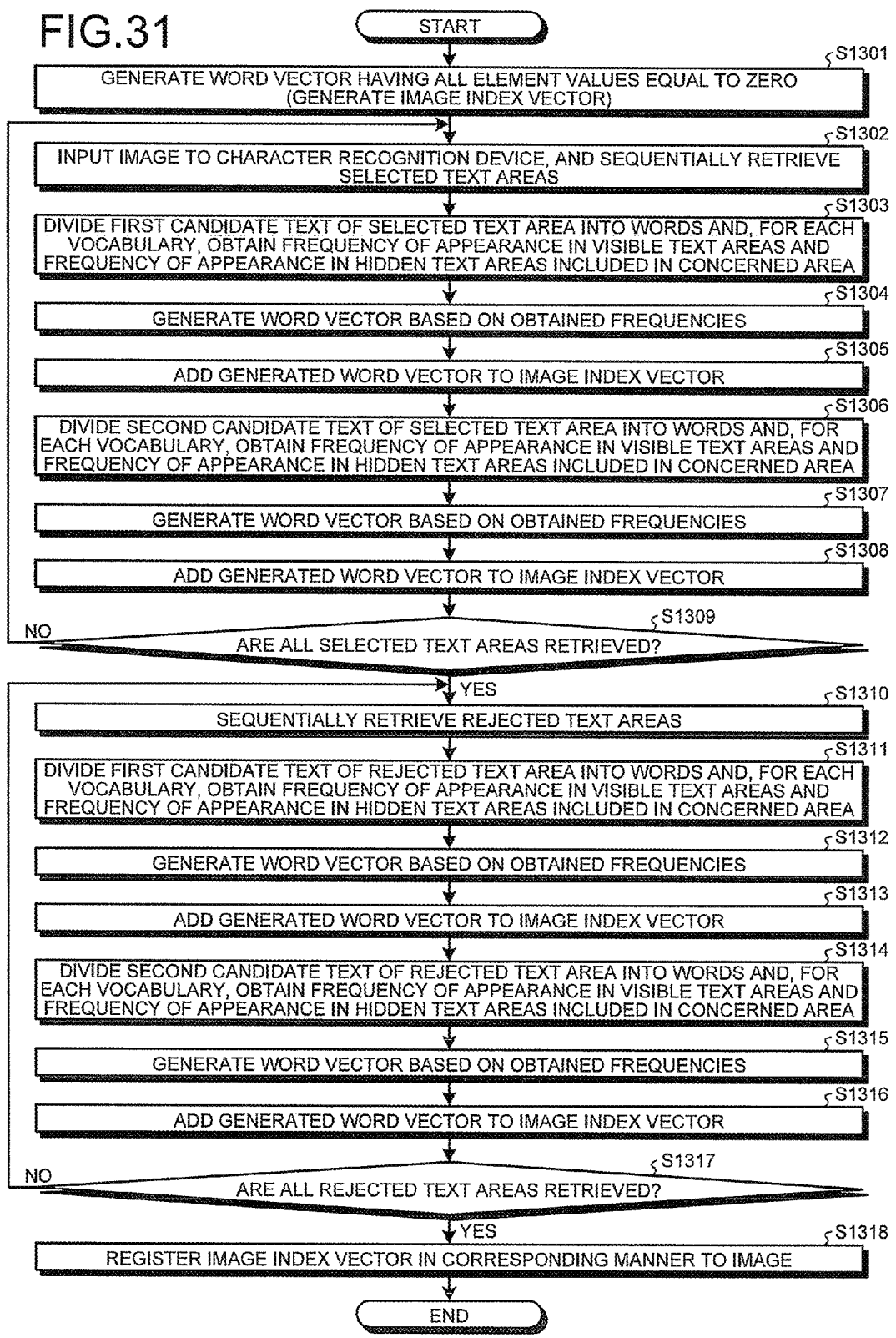
FIG. 31 is a flowchart for explaining a sequence of operations for building an index.

FIG. 31 is a flowchart for explaining a sequence of operations for building an index. The operations from Steps S1301 to S1318 explained below are performed with respect to each image stored in the image DB 310, and a word-vector-based index having inclined weights is attached. In the following explanation, the partially-hidden text area group and the visible text area group that are included in the integration method selected by the text area structure selector 170 of the character recognition device 100 are collectively called "selected text areas"; while the partially-hidden text area group and the visible text area group that are included in all rejected integration methods (alternatively, top N number of integration methods) are collectively called "rejected text areas".

Step S1301: the index builder 320 generates a word vector having all element values equal to zero. The word vector is called an "image index vector".

Step S1302: the index builder 320 retrieves an image from the image DB 310, inputs the image to the character recognition device 100, and sequentially retrieves the selected text areas one by one.

Step S1303: the index builder 320 divides the first candidate text in the selected text area, which is retrieved at Step S1302, into words; and, for each vocabulary ($w_i$), obtains the frequency of appearance ($N1_{w\_i}$) in the visible text areas and the frequency of appearance ($N2_{w\_i}$) in the hidden text areas included in the concerned area.

Step S1304: the index builder 320 generates a word vector based on the frequencies obtained at Step S1303. Herein, the dimensional element value equivalent of the vocabulary ($w_i$) is assumed to be $\lambda 1 \times N1_{w\_i} + \lambda 2 \times N2_{w\_i}$.

Step S1305: the index builder 320 adds the word vector generated at Step S1304 to the image index vector.

Step S1306: the index builder 320 divides the second candidate text in the selected text area, which is retrieved at Step S1302, into words; and, for each vocabulary ($w_i$), obtains the frequency of appearance ($N3_{w\_i}$) in the visible text areas and the frequency of appearance ($N4_{w\_i}$) in the hidden text areas included in the concerned area.

Step S1307: the index builder 320 generates a word vector based on the frequencies obtained at Step S1306. Herein, the dimensional element value equivalent of the vocabulary ($w_i$) is assumed to be $\lambda 3 \times N3_{w\_i} + \lambda 4 \times N4_{w\_i}$.

Step S1308: the index builder 320 adds the word vector generated at Step S1307 to the image index vector.

Step S1309: the index builder 320 determines whether or not all selected text areas are retrieved. If all selected text areas are retrieved (Yes at Step S1309), the system control proceeds to Step S1310. However, if all selected text areas are not yet retrieved (No at Step S1309), then the system control returns to Step S1302.

Step S1310: the index builder 320 sequentially retrieves the rejected text areas one by one.

Step S1311: the index builder 320 divides the first candidate text in the rejected text area, which is retrieved at Step S1310, into words; and, for each vocabulary ($w_i$), obtains the frequency of appearance ($N5_{w\_i}$) in the visible text areas and the frequency of appearance ($N6_{w\_i}$) in the hidden text areas included in the concerned area.

Step S1312: the index builder 320 generates a word vector based on the frequencies obtained at Step S1311. Herein, the dimensional element value equivalent of the vocabulary ($w_i$) is assumed to be $\lambda 5 \times N5_{w\_i} + \lambda 6 \times N6_{w\_i}$.

Step S1313: the index builder 320 adds the word vector generated at Step S1312 to the image index vector.

Step S1314: the index builder 320 divides the second candidate text in the rejected text area, which is retrieved at Step S1310, into words; and, for each vocabulary ($w_i$), obtains the frequency of appearance ($N7_{w\_i}$) in the visible text areas and the frequency of appearance ($N8_{w\_i}$) in the hidden text areas included in the concerned area.

Step S1315: the index builder 320 generates a word vector based on the frequencies obtained at Step S1314. Herein, the dimensional element value equivalent of the vocabulary ($w_i$) is assumed to be $\lambda 7 \times N7_{w\_i} + \lambda 8 \times N8_{w\_i}$.

Step S1316: the index builder 320 adds the word vector generated at Step S1315 to the image index vector.

Step S1317: the index builder 320 determines whether or not all rejected text areas are retrieved. If all rejected text areas are retrieved (Yes at Step S1317), then the system control proceeds to Step S1318. However, if all selected text areas are not yet retrieved (No at Step S1317), then the system control returns to Step S1310.

Step S1318: the index builder 320 registers, in the image DB 310, the image index vector generated by performing the operations described above in a corresponding manner to the image retrieved from the image DB 310 at Step S1302.

Meanwhile, there are times when a word included in a recognition text cuts across a visible text area and a hidden text area. In such a case, during the operations described above, the result of proportional division of the frequency of the word with the character count in that word is used. For example, if a five-character word has three characters appearing in a visible text area and has two characters appearing in a hidden visible area, the word is counted to appear for 0.6 times in the visible text area and is counted to appear for 0.4 times in the hidden text area.

The ranker 330 receives the search query Q in the text format, performs sequential collation with the index attached to each image that is stored in the image DB 310, and outputs the image groups R matching with the search query Q in descending order of the matching score.

Figure 32:
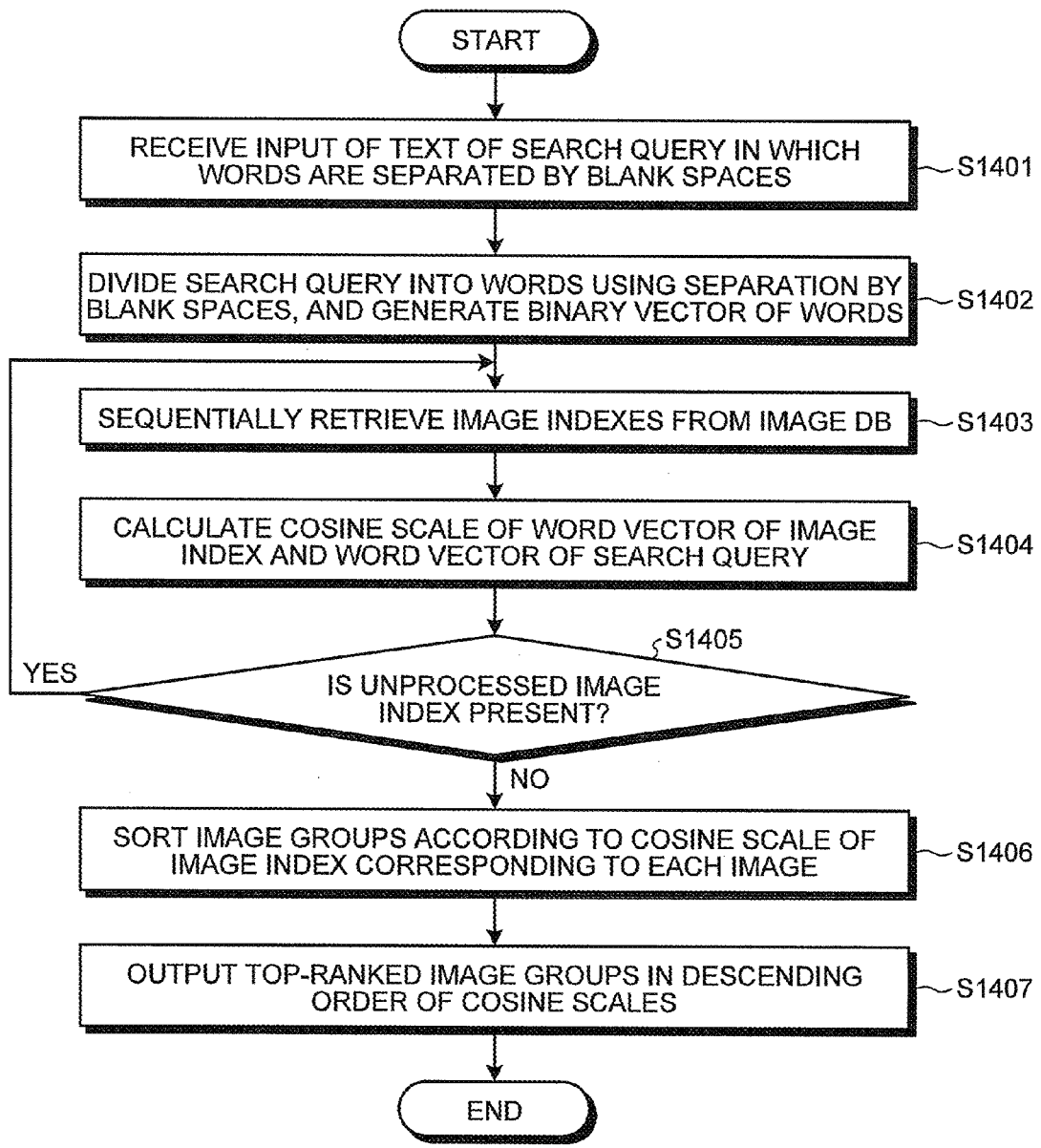
FIG. 32 is a flowchart for explaining a sequence of operations during a ranking operation.

FIG. 32 is a flowchart for explaining a sequence of operations during a ranking operation. Based on the search query Q input from the user, the ranker 330 performs the operations from Steps S1401 to S1407 explained below, and outputs the top-ranked image groups R.

Step S1401: the ranker 330 receives input of the text of the search query Q in which words are separated by blank spaces.

Step S1402: the ranker 330 divides the search query into words using separation by blank spaces, and generates a binary vector of the words, which is a high-dimensional sparse vector in which the vocabulary represents dimensions and in which "1" is set in the elements including the vocabulary and "0" is set in the remaining elements.

Step S1403: the ranker 330 sequentially retrieves the image indexes from the image DB 310.

Step S1404: the ranker 330 calculates the cosine scale of the word vector of the image index, which is retrieved from the image DB 310 at Step S1403, and the word vector of the search query Q generated at Step S1402.

Step S1405: the ranker 330 determines whether or not any unprocessed image index is present. If no unprocessed image index is present (No at Step S1405), then the system control proceeds to Step S1406. However, if any unprocessed image index is present (Yes at Step S1406), then the system control returns to Step S1403.

Step S1406: the ranker 330 sorts the image groups according to the cosine scale of the image index corresponding to each image.

Step S1407: the ranker 330 outputs the top-ranked image groups R, which are sorted at Step S1407, in descending order of cosine scales.

As described above, in the image retrieval device 300 according to the third embodiment, images are searched using the image indexes in the form of recognition texts that are recognized by supplementing hidden characters in the images stored in the image DB 310. Hence, it becomes possible to perform highly accurate image retrieval with a high recall rate with respect to the search query Q.

Fourth Embodiment

Given below is the explanation of a fourth embodiment. The fourth embodiment relates to a translation device in which the character recognition device 100 according to the first embodiment is used. The translation device performs machine translation of the recognition text obtained by the character recognition device 100 according to the first embodiment, and displays a translation result. At that time, the translation result is selected by taking into account the likelihood of the text fragment and the degree of importance of the translated fragment.

Using the character recognition device 100 according to the first embodiment, the translation device according to the fourth embodiment performs character recognition with respect to a partially-hidden text area and the visible text areas not incorporated in the partially-hidden text area; performs machine translation of the resultant text into the target language; and presents the translation result having the maximum likelihood to the user.

The translation operation is performed using the existing technology. In many of the translation operations according to the existing technology, the original text is broken down into easy-to-handle moderate units such as paragraphs or phrases (hereinafter, called "translation units"), text candidates obtained by individually translating the translation units into the target language are listed, and the text candidates are combined to form an entire text such as sentences.

Figure 33:
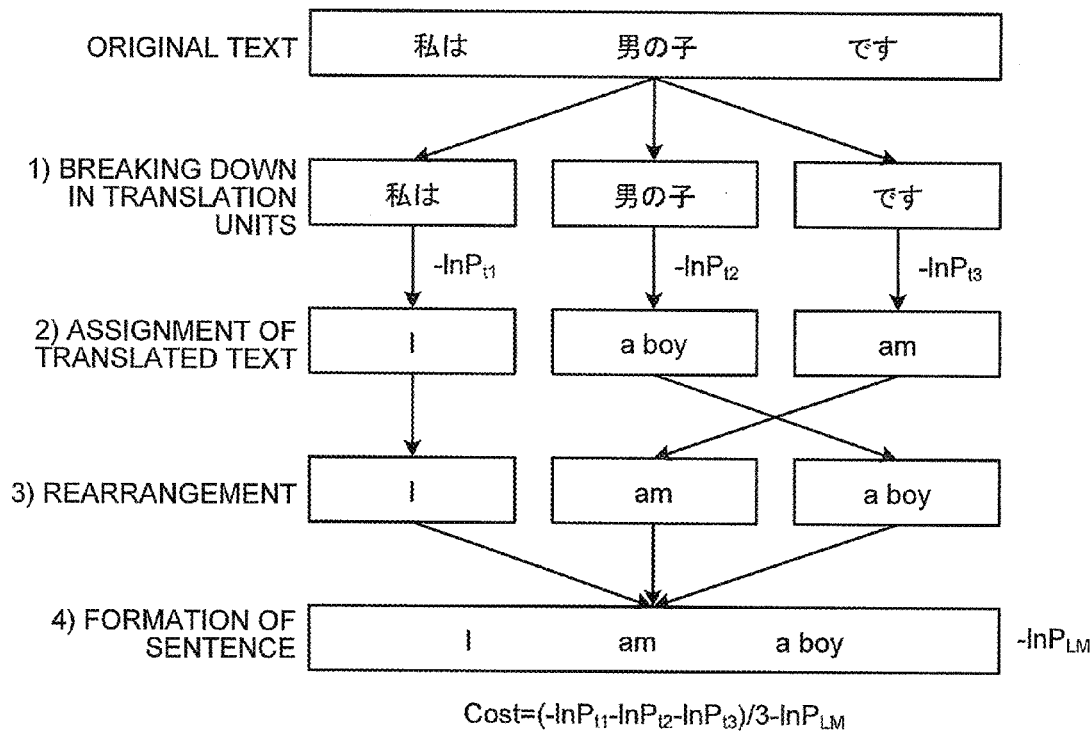
FIG. 33 is a diagram illustrating an example of a conventional translation model.

FIG. 33 is a diagram illustrating an example of the conventional translation model. In the example illustrated in FIG. 33, the sequence of operations is as follows: (1) the original text written in the source language is broken down into translation units, (2) a translated text in the target language is assigned to each translation unit, (3) the translated texts are rearranged to match with the grammar of the target language, and (4) a sentence is formed. The translated text generated according to such a translation process is evaluated by combining the average value of the negative logarithmic likelihood during the translation of each translation unit and the negative logarithmic likelihood from the linguistic perspective of the sentences that are eventually formed. This evaluation value is called a "translation cost". Meanwhile, a plurality of candidates is present during each of (1) breaking down in the translation units, (2) assignment of the translated text, and (3) rearrangement; and combinations of the candidates at each stage represent the candidates throughout the entire process. Using the evaluation method explained above, the candidate having the lowest translation cost is selected from among all candidates.

Herein, attention is paid to the fact that, while deciding on the entire translation text, there is variation in the degree of importance of each translation unit. For example, looking from the semantic perspective, the verbs are the most important elements in determining the meaning of the sentences. Alternatively, in the translation based on syntactic parsing, closer a translation unit to the root node in syntactic parsing, greater is the impact on that translation result.

In the fourth embodiment, the original text to be translated has uncertainty because of being a character recognition result. Since the translation units having a high degree of importance affect the other translation units in a major way, a higher level of certainty factor should be obtained with respect to the original text. In other words, in the case of a translation unit having a low degree of importance, the damage caused by the original text is less even if the original text is incorrect.

After considering such facts, in the fourth embodiment, a translation device is provided in which, with respect to the original text piece corresponding to the translation units having a high degree of importance, obtaining a high certainty factor represents the selection criterion for translation candidates.

Figure 34:
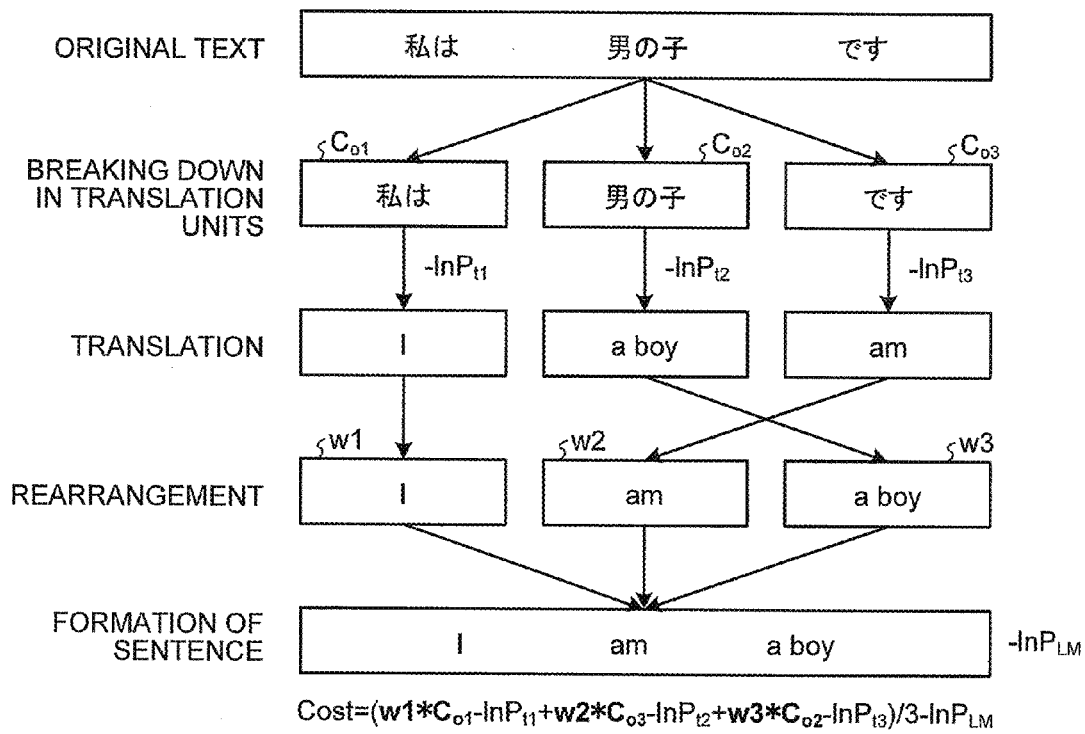
FIG. 34 is a diagram for explaining an example of a translation model according to a fourth embodiment.

FIG. 34 is a diagram for explaining an example of the translation model according to the fourth embodiment. The difference with the conventional translation model illustrated in FIG. 33 is that, for each translation unit, the average of the product of the degree of importance of the translation unit and the character recognition cost of the original text (in FIG. 34, illustrated as bold character portions) is added to the translation cost. As a result, if translation units having a high degree of importance are assigned to the original text piece having a high certainty factor, then it results in a high evaluation.

Given below is the explanation of a method for calculating the cost of the original text piece and a method for calculating the degree of importance that are different from the conventional technology.

Method for Calculating Cost of Original Text Piece

Although the text present in a partially-hidden text area and visible text areas is to be translated, since translation of the text in a partially-hidden text area includes translation of the text in visible text areas, the following explanation is given only about translating the text present in a partially-hidden text area.

Figure 35:
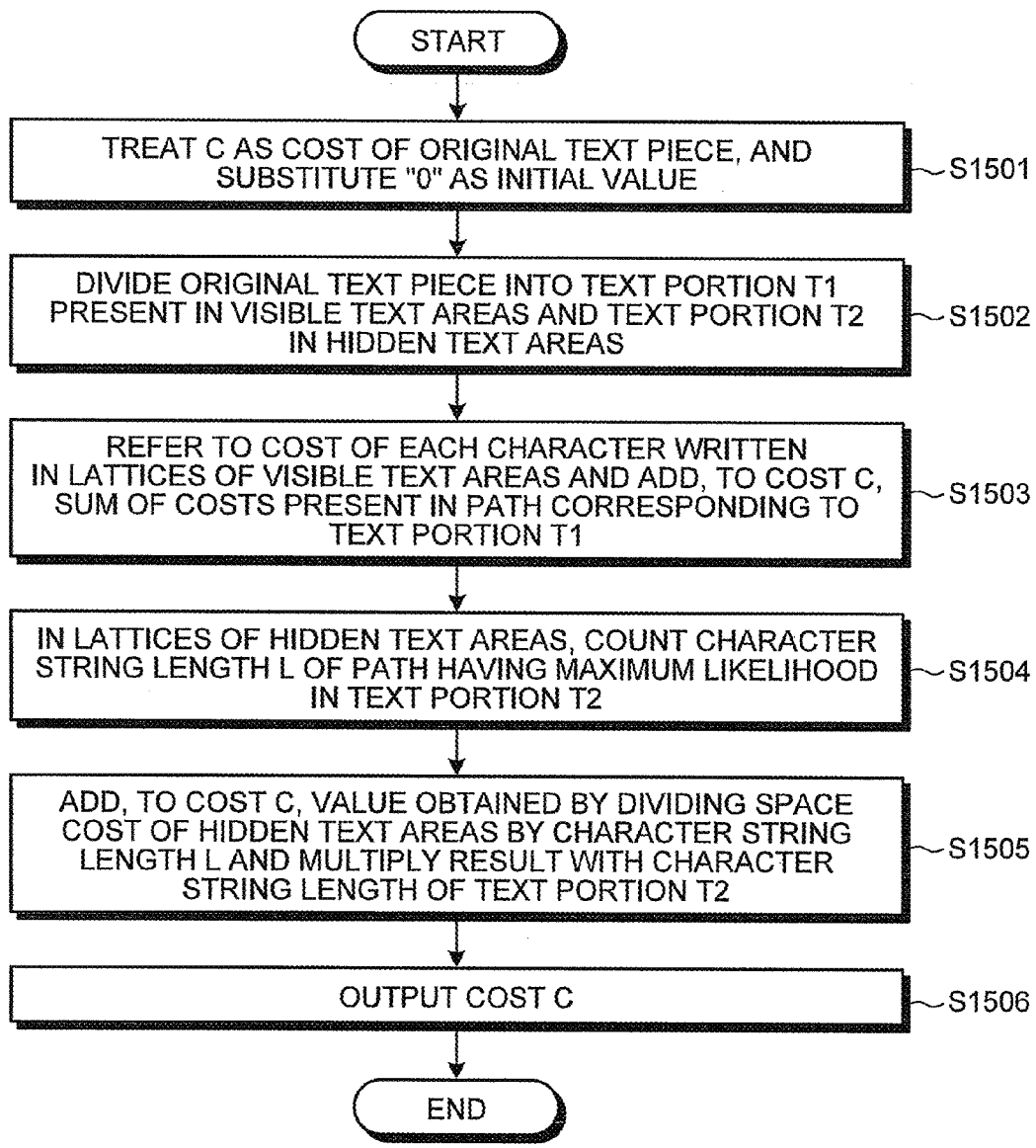
FIG. 35 is a flowchart for explaining a sequence of operations for calculating the cost of an original text piece.

The lattice of a partially-hidden text area has the structure as illustrated in FIG. 24. With that in mind, explained below is a specific sequence of operations. FIG. 35 is a flowchart for explaining a sequence of operations for calculating the cost of the original text piece. The translation device according to the fourth embodiment performs the operations from Steps S1501 to S1506 explained below and calculates the cost of the original text piece.

Step S1501: in the translation device according to the fourth embodiment, C represents the cost of the original text piece and "0" is substituted as the initial value of the cost.

Step S1502: the translation device according to the fourth embodiment divides the original text piece into a text portion T1 present in visible text areas and a text portion T2 present in hidden text areas.

Step S1503: the translation device according to the fourth embodiment refers to the cost of each character written in the lattices of the visible text areas and adds, to the cost C, the sum of the costs present in the path corresponding to the text portion T1.

Step S1504: the translation device according to the fourth embodiment counts, in the lattices, of the hidden text areas, a character string length L of the path having the maximum likelihood in the text portion T2.

Step S1505: the translation device according to the fourth embodiment adds, to the cost C, a value obtained by dividing the space cost of the hidden text areas by the character string length L and multiplying the result with the character string length of the text portion T2.

Step S1506: the translation device according to the fourth embodiment outputs the cost C of the original text piece.

Explained below is a specific example of the cost C of the original text piece calculated by performing the operations described above. When "clsii" illustrated in FIG. 24 represents the original text piece to be processed, the portion "cls" belonging to the visible text areas has the cost of 2.5+1.2+2.8=6.5; while the portion "ii" belonging to the hidden text areas has the cost of 9.8/3×2≅6.53. Thus, the cost C of the original text piece "clsii" becomes 6.5+6.53=13.03.

Meanwhile, in the explanation given above, only the character recognition cost and the space cost are taken into consideration. Alternatively, the cost of the language model as evaluated in the character recognition device 100 can also be used in combination.

Method for Calculating Degree of Importance of Translation Units

Figure 36:
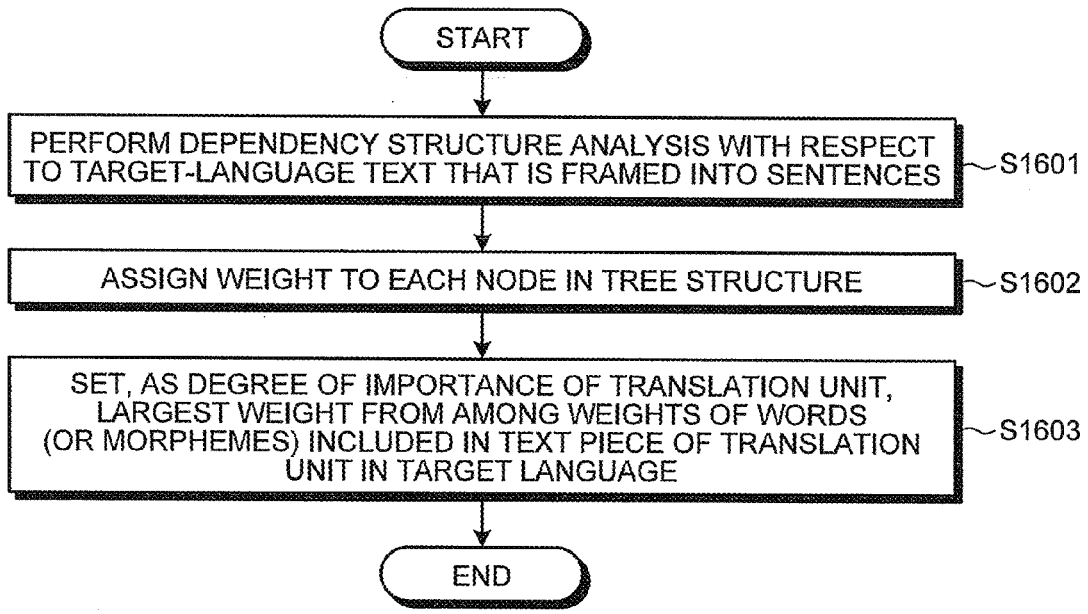
FIG. 36 is a flowchart for explaining a sequence of operations for calculating the degree of importance of translation units.

Explained below is a sequence of operations for calculating the degree of importance of the translation units using depending structure analysis that is one type of syntactic parsing. FIG. 36 is a flowchart for explaining a sequence of operations for calculating the degree of importance of the translation units. The translation device according to the fourth embodiment calculates the degree of importance of the translation units by performing the operations from Steps S1601 to S1603 explained below.

Figure 37:
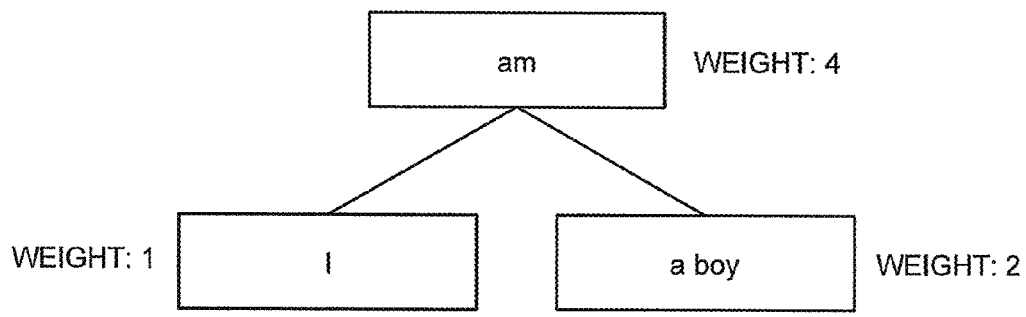
FIG. 37 is a diagram illustrating an exemplary result of dependency structure analysis.

Step S1601: the translation device according to the fourth embodiment performs dependency structure analysis with respect to the target-language text that is framed into sentences. FIG. 37 is a diagram illustrating an exemplary result of dependency structure analysis. The text in the target language forms a tree structure of words or morphemes.

Step S1602: the translation device according to the fourth embodiment assigns a weight to each node in the tree structure. The weight assigned to each node represents the concerned node or the total number of descendent nodes.

Step S1603: the translation device according to the fourth embodiment sets, as the degree of importance of a translation unit, the largest weight from among the weights of the words (or the morphemes) included in the text piece of the concerned translation unit in the target language. In the example illustrated in FIG. 37, "I" has the weight of "1", "am" has the weight of "4", and "a boy" has the weight of "2".

As described above, in the translation device according to the fourth embodiment, the recognition text recognized by supplementing the hidden texts is translated in the target language, and the translation result can be presented to the user.

Fifth Embodiment

Given below is the explanation of a fifth embodiment. The fifth embodiment relates to a character recognition device that is different than the character recognition device 100 according to the first embodiment. In the following explanation, in distinction from the character recognition device 100 according to the first embodiment, the character recognition device according to the fifth embodiment is called a "line-supplementing-type character recognition device".

The character recognition device 100 detects the hidden text in a single line. In contrast, in the line-supplementing-type character recognition device, the text of hidden lines is detected. In regard to such a difference in the objective, the character recognition device 100 according to the first embodiment detects only those hidden text areas that are adjacent to visible text areas; while the line-supplementing-type character recognition device according to the fifth embodiment takes into account the space between lines and also detects hidden text areas separated from visible text areas. As far as detecting the hidden text in a line is concerned, the line-supplementing-type character recognition device according to the fifth embodiment makes use of the character recognition device 100 according to the first embodiment.

Classification of Blind Phenomenon

Figure 38:
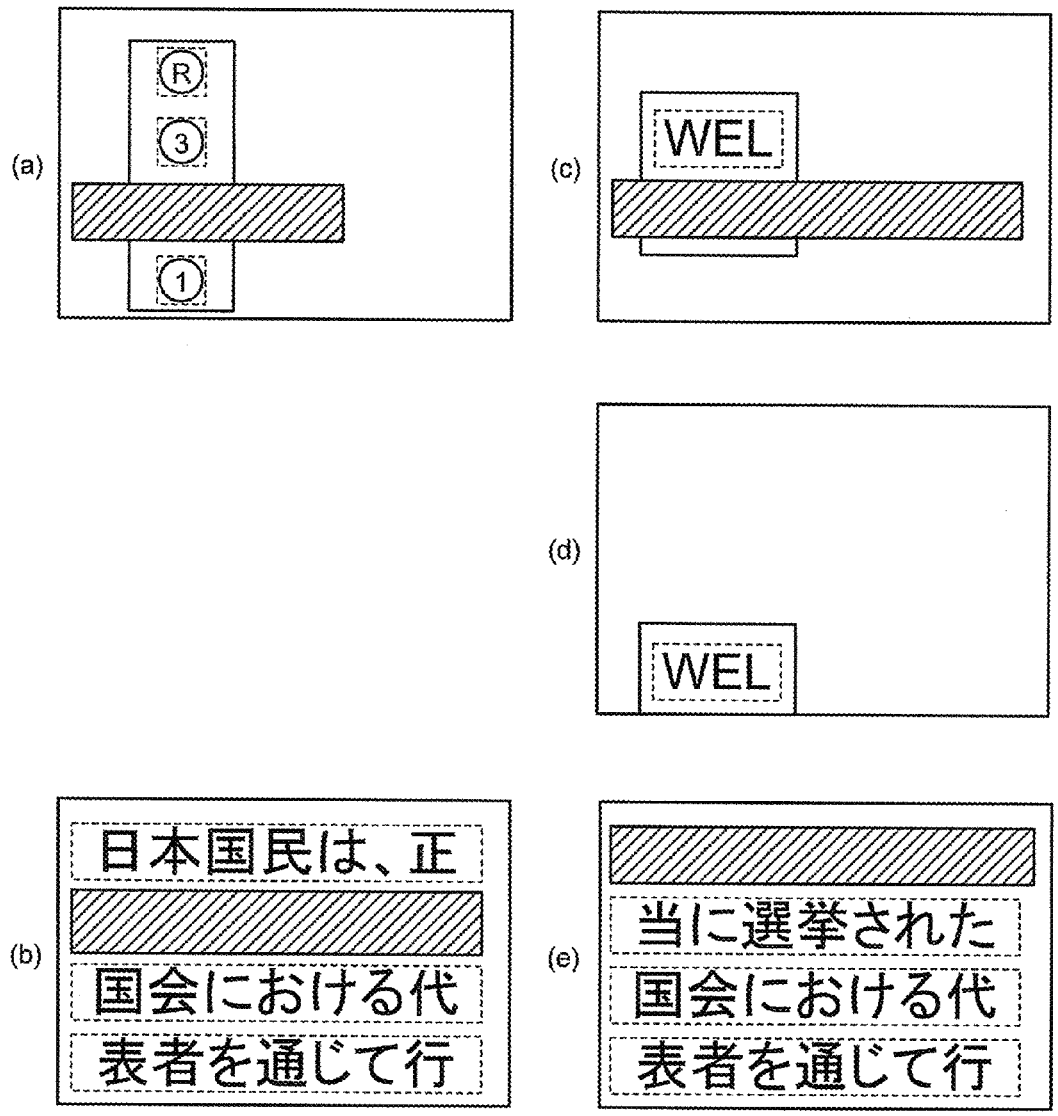
FIG. 38 is a diagram illustrating a blind phenomenon.

Given below is the explanation of the blind phenomenon considered in the fifth embodiment. In the following explanation, the phenomenon in which an actually-present line of the text remains hidden is called the "blind phenomenon". FIG. 38 is a diagram for explaining the blind phenomenon according to the fifth embodiment. From the perspective of the position at which a line remains hidden in the entire text, the blind phenomenon is distinguished into two types of "fragmented type" and "truncated type".

The "fragmented type" represents a pattern in which a line other than the lines at both ends of a multiline text remains hidden. In (a) in FIG. 38 is illustrated an example of the fragmented-type blind phenomenon in a scene image that includes an elevator operation panel as a photographic subject. In the operation panel illustrated in (a) in FIG. 38, since the floor buttons are separated from each other, they are detected as independent lines. Herein, due to an obstruction such as a human body or due to blown out highlights of the image, one of the floor buttons is hidden. In (b) in FIG. 38 is illustrated an example of the fragmented-type blind phenomenon in a scan image in which the second line is blacked out due to ink.

The "truncated type" represents a pattern in which the first line or the last line of a multiline text remains hidden. In (c) in FIG. 38 is an example of the truncated-type blind phenomenon in a scene image in which the last line of a signboard in the background is hidden due to some obstruction. In (d) in FIG. 38 is another example of the truncated-type blind phenomenon in a scene image in which the signboard has gone out of frame in the downward direction and thus the last line remains hidden. In (e) in FIG. 38 is illustrated an example of a truncated-type blind phenomenon in a scan image in which the first line is blacked out due to ink. Meanwhile, in the following explanation, the blind phenomenon illustrated in (c) and (e) in FIG. 38 is called "obstruction-induced truncated type", and the blind phenomenon illustrated in (d) in FIG. 38 is called "frame-out truncated type".

Partially-Lost Line Phenomenon

Figure 39:
FIG. 39 is a diagram for explaining a partially-lost line.

The classification of the blind phenomenon as described above represents classification based on the manner in which the lines remain hidden. However, in reality, the lines do not necessarily remain hidden in concert with the line boundaries. As illustrated in (a) and (b) in FIG. 39, there are times when hiding occurs midway through a line. This phenomenon is herein called "partially-lost line phenomenon" that can be considered to be an extension of the partially-lost character phenomenon, which is explained in the first embodiment, over the entire line. In the line-supplementing-type character recognition device according to the fifth embodiment, since the character recognition device 100 according to the first embodiment is used, the operations performed by the partially-lost character area detector 130 result in the removal of the entire partially-lost line. Hence, in the fifth embodiment, the partially-lost line phenomenon need not be taken into account.

Definition of Terms

Explained below are the area-related terms used in the explanation of the fifth embodiment.

Visible text line area: a text area of a single line as detected by the character recognition device 100 according to the first embodiment (i.e., a partially-hidden text area formed by integrating visible text areas and hidden text areas, or an individual visible text area) is called a "visible text line area".

Hidden text line area: a rectangular area of a single line of text in which characters are actually present but remain hidden due to the blind phenomenon is called a "hidden text line area".

Text line area: when there is no particular distinction between the visible text line area and the hidden text line area, the areas are collectively called a "text line area".

Multiline text area: of arbitrary pairs of a visible text line area and a hidden text line area in the image, a single rectangular area made of pairs forming a single multiline text is called a "multiline text area".

Text area: the broader concept including visible text areas, hidden text areas, partially-hidden text areas, visible text line areas, hidden text line areas, text line areas, and multiline text areas is called a "text area".

Configuration of Line-Supplementing-Type Character Recognition Device

Figure 40:
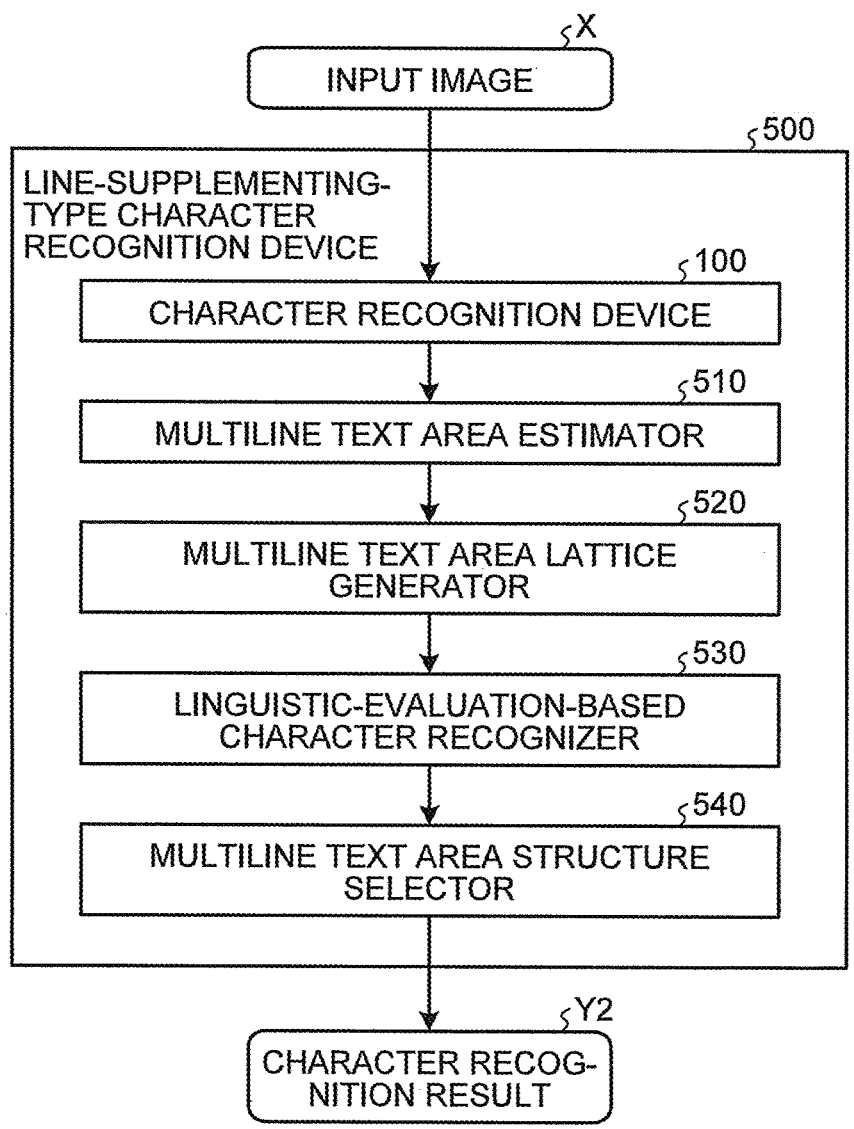
FIG. 40 is a block diagram illustrating a configuration example of a line-supplementing-type character recognition device according to a fifth embodiment.

FIG. 40 is a block diagram illustrating a configuration example of a line-supplementing-type character recognition device 500 according to the fifth embodiment. As illustrated in FIG. 40, the line-supplementing-type character recognition device 500 includes the character recognition device 100, a multiline text area estimator 510, a multiline text area lattice generator 520, a linguistic-evaluation-based character recognizer 530, and a multiline text area structure selector 540.

As explained in the first embodiment, the character recognition device 100 receives input of the input image X, detects visible text areas, and performs character pattern recognition; as well as estimates a partially-hidden text area that is formed by integrating hidden text areas with visible text areas, and outputs a multiline recognition text included in each text area. Meanwhile, each text area has a fixed text direction. As explained already, in the fifth embodiment, even if a hidden text area is included in some portion, the concerned area is uniformly called a visible text line area.

Figure 41:
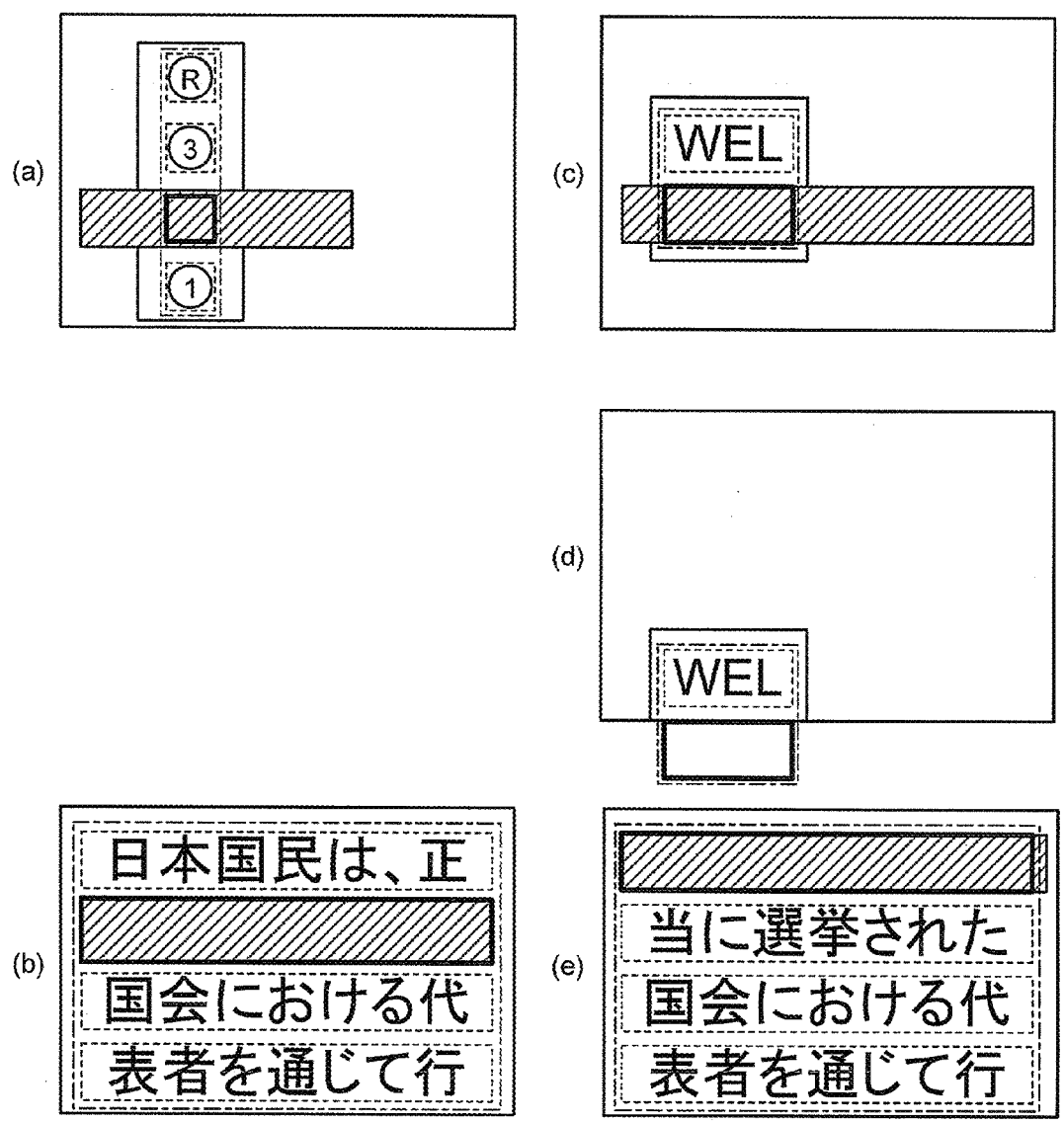
FIG. 41 is a diagram illustrating examples of a hidden text line area.

The multiline text area estimator 510 estimates hidden text line areas based on the visible text line areas detected by the character recognition device 100, and further estimates a multiline text area in which the hidden text line areas are integrated. Examples of a hidden text line area are illustrated in FIG. 41. Herein, in FIG. 41, (a) to (e) respectively correspond to the specific examples of the blind information illustrated in (a) to (e) in FIG. 38, and the areas enclosed by heavy lines represent hidden text line areas.

The multiline text area estimator 510 detects the occurrence of the blind phenomenon based on, for example, the absolute positional relationship or the relative positional relationship between the visible text line areas in the input image X; and then estimates the hidden text line areas. However, since the estimation accuracy is low, at this stage, excessive detection is done including detection of the candidates having a low certainty factor, and the detection is narrowed down in subsequent operations by performing a detailed determination. A specific example of the operations is explained later in detail.

The multiline text area lattice generator 520 generates a lattice of the multiline text areas. As described above, a multiline text area represents an area that, from among the visible text line areas and the hidden text line areas in the input image X, includes pairs which are believed to form a single multiline text. The multiline text area lattice generator 520 generates character string candidates, which can be applicable as the hidden text line areas, in a lattice format; concatenates the lattice with a character string candidate lattice of the visible text line areas; and obtains a lattice of the multiline text area. In the estimation of a character string candidate that can be applicable as a hidden text line area, the size of the concerned area and the character size scale used in the adjacent visible text line areas are used. That is, under the assumption that the used font has about the same size as the adjacent visible text, the character strings fitting in the size of the hidden text line areas become the candidates.

Moreover, the lattice of a multiline text area is assigned with the space cost of the hidden text line areas. As far the method of assigning the space cost is concerned, an identical method to the first embodiment is implemented. A specific example of the operations is explained later in detail.

The linguistic-evaluation-based character recognizer 530 performs linguistic evaluation throughout the entire text area with respect to a multiline text area group and with respect to individual visible text line area groups, and performs comprehensive character recognition by combining the evaluation result with the character pattern recognition costs and the space costs that are already obtained. As a result, a hidden text line area is evaluated to be at a high level if the concerned hidden text line area fits in as small an area size as possible from among the text lines to which linguistic appropriateness is assigned through the entire multiline text.

As far as specific operations are concerned, a method is implemented that is identical to the linguistic-evaluation-based character recognizer 160 of the character recognition device 100 according to the first embodiment.

The multiline text area structure selector 540 determines an integration method for incorporating all visible text line areas, which are detected from the input image X, in the multiline text area; and outputs a character recognition result Y2 with respect to each text area included in the input image X1 that includes the multiline text area.

There is a room for selection of the method of incorporating the visible text line areas into a multiline text area. For example, when three visible text line areas are present, there is an option of integrating the three visible text line areas into a single multiline text area or an option of integrating two of the three visible text line areas into a multiline text area. Meanwhile, in the case of the blind phenomenon of the truncated type, there is a degree of freedom in the number of hidden text line areas that are assumed to be present. In that regard, the multiline text area structure selector 540 selects an integration method from all possible integration methods in such a way that the cost of each text area is the lowest. Then, the multiline text area structure selector 540 outputs the character recognition result Y2 with respect to the text areas corresponding to the selected integration method. A specific example of the operations is explained later in detail.

Given below is the detailed explanation of the operations of the modules, expect for the character recognition module 100 according to the first embodiment, that configure the line-supplementing-type character recognition device 500 according to the fifth embodiment.

Multiline Text Area Estimator

The multiline text area estimator 510 estimates a multiline text area formed by integrating visible text line areas and hidden text line areas. Herein, the multiline text area estimator 510 estimates hidden text line areas based on the visible text line area group that is detected by the character recognition device 100. Moreover, the multiline text area estimator 510 lists all possible integration methods (i.e., all possible multiline text areas) based on the hidden text line area group that is obtained and the visible text line area group.

Regarding the operation for estimating hidden text line areas, different modules are used to perform different sequences of operations with respect to the blind phenomenon of the fragmented type, the blind phenomenon of the frame-out truncated type, and the blind phenomenon of the obstruction-induced truncated type.

Figure 42:
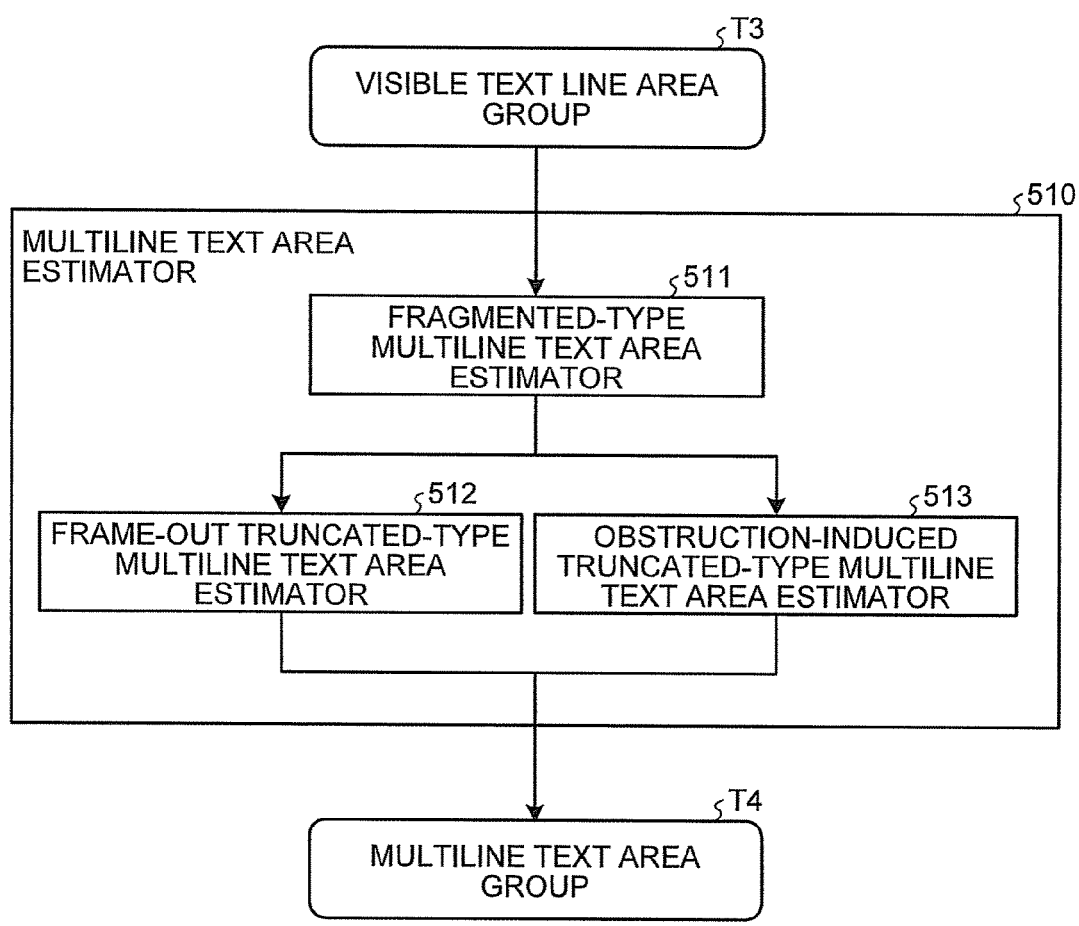
FIG. 42 is a block diagram illustrating a configuration example of a multiline text area estimator.

FIG. 42 is a block diagram illustrating a configuration example of the multiline text area estimator 510. As illustrated in FIG. 42, the multiline text area estimator 510 includes a fragmented-type multiline text area estimator 511, a frame-out truncated-type multiline text area estimator 512, and an obstruction-induced truncated-type multiline text area estimator 513. When a visible text line area group T3 is input to the multiline text area estimator 510, it is the fragmented-type multiline text area estimator 511 that firstly performs operations with respect to the visible text line area group T3. That is followed by the operations performed by the frame-out truncated-type multiline text area estimator 512 or the obstruction-induced truncated-type multiline text area estimator 513. Then, the multiline text area estimator 510 combines the results of such operations and outputs a multiline text area group T4.

Thus, with respect to the multiline text area group generated by the fragmented-type multiline text area estimator

511, there is a possibility that a hidden text line area is assigned by the frame-out truncated-type multiline text area estimator 512 or the obstruction-induced truncated-type multiline text area estimator 513. Regarding the three types of operations described herein, it is also possible to perform only the required operations depending on the application. Meanwhile, in the configuration example illustrated in FIG. 42, the operations of the frame-out truncated-type multiline text area estimator 512 or the operations of the obstruction-induced truncated-type multiline text area estimator 513 are performed in a selective manner. Alternatively, the frame-out truncated-type multiline text area estimator 512 and the obstruction-induced truncated-type multiline text area estimator 513 can be connected in series so that the operations of both estimators can be performed.

Given below is the detailed explanation of the operations performed by each of the fragmented-type multiline text area estimator 511, the frame-out truncated-type multiline text area estimator 512, and the obstruction-induced truncated-type multiline text area estimator 513.

Fragmented-Type Multiline Text Area Estimator

The fragmented-type multiline text area estimator 511 has the same basic principle as the fragmented-type partially-hidden text area estimator 141 of the character recognition device 100 according to the first embodiment. That is, regarding two or more visible text line areas, the fragmented-type multiline text area estimator 511 determines whether or not there are any hidden text line areas between those visible text line areas based on the positions and the sizes of the visible text line areas. Then, the fragmented-type multiline text area estimator 511 arbitrarily combines the visible text line area group and the hidden text line area group, and lists possible hidden text line areas.

The operations performed by the fragmented-type multiline text area estimator 511 according to the fifth embodiment differ from the fragmented-type partially-hidden text area estimator 141 according to the first embodiment in the following three points.

First difference: in the first embodiment, when visible text areas are integrated, all areas present therebetween are recognized as hidden text areas. In contrast, in the fifth embodiment, the line spaces (called "margins") are also taken into account, and the areas present in between visible text line areas are sorted as hidden text line areas and margins. In the following explanation, an area formed by combining margins and hidden text line areas is called a "potential text area".

FIG. 43 is a diagram for explaining a method for integrating text line areas. In (a) in FIG. 43 is illustrated an example in which a multiline text area is formed by horizontally integrating visible text line areas and hidden text line areas. In (b) in FIG. 43 is illustrated an example in which a multiline text area is formed by vertically integrating visible text line areas and hidden text line areas. In both examples, margins are present in between neighboring text line areas.

Second difference: in the fifth embodiment, it is allowed to have a configuration in which a multiline text area does not include hidden text line areas. For example, a text area made of two visible text line areas having a margin therebetween is also one of the types of a multiline text area.

Third difference: in the first embodiment, the target text areas for integration include text areas having an ambiguous text direction. In contrast, in the fifth embodiment, the text direction of all text areas is established.

Regarding the integration of the text line areas, listed below are the conditions that need to be satisfied. The conditions are called "text line area integration conditions". Meanwhile, not all of the text line area integration conditions are mandatory, and conditions required for the integration into a multiline text area can be appropriately selected according to the type of the input image X.

First condition: there are two or more constituent text line areas.

Second condition: The constituent text line areas are linearly arranged; and, when the text line areas are projected on a vector parallel to the text direction, substantially same line segments are obtained (each line segment is substantially adjacent to the bounding rectangle).

Third condition: the constituent visible text line areas have the text direction perpendicular to the direction in which the text line areas are arranged.

Fourth condition: in the constituent visible text line areas, the coloration pattern, such as the background and the character color, is similar.

Fifth condition: in the constituent visible text line areas, the scale of the character size is similar.

Sixth condition: in the constituent visible text line areas, the depth has an error equal to or smaller than a threshold value.

Given below is the explanation of a specific example of the operations performed by the fragmented-type multiline text area estimator 511. Herein, the fragmented-type multiline text area estimator 511 performs, in order, the following operations: listing the potential text areas, sorting the potential text areas as margins and hidden text line areas, and listing the possible multiline text areas.

Figure 44:
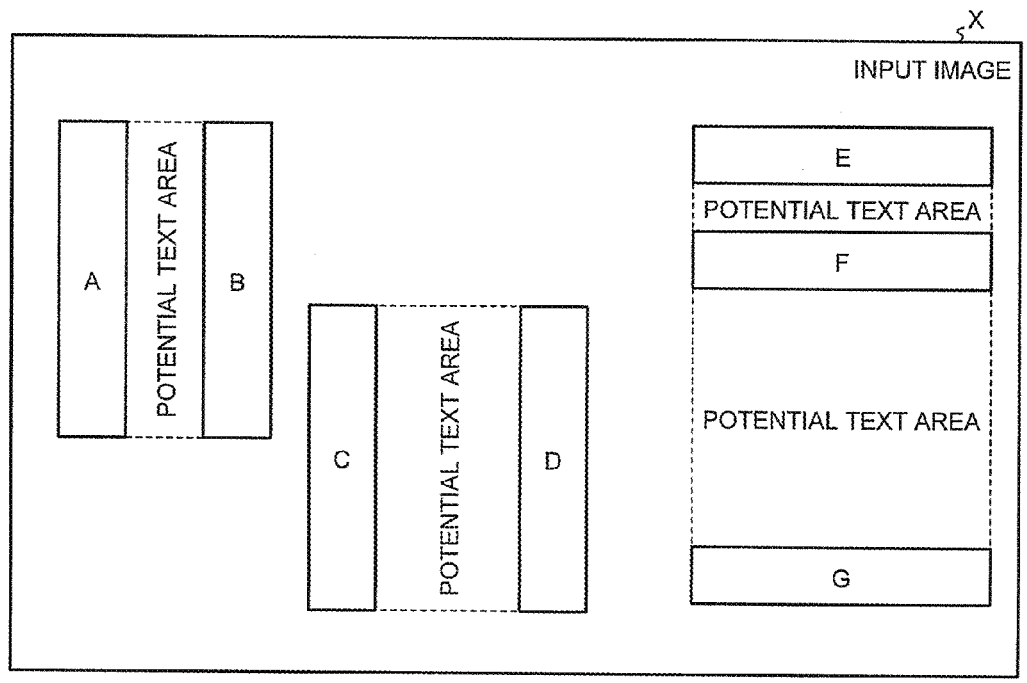
FIG. 44 is a diagram illustrating an exemplary structure of a multiline text area.

Firstly, explained with reference to FIG. 44 is the operation for listing the potential text areas. FIG. 44 is a diagram illustrating an exemplary structure of a multiline text area.

The fragmented-type multiline text area estimator 511 firstly lists pairs of visible text line areas that satisfy the text line area integration conditions in the input image X, and detects the rectangular area sandwiched between each pair of visible text line areas as a potential text area. As a result of performing this operation, in the example illustrated in FIG. 44, areas drawn with dashed lines are detected as potential text areas.

Figure 45:
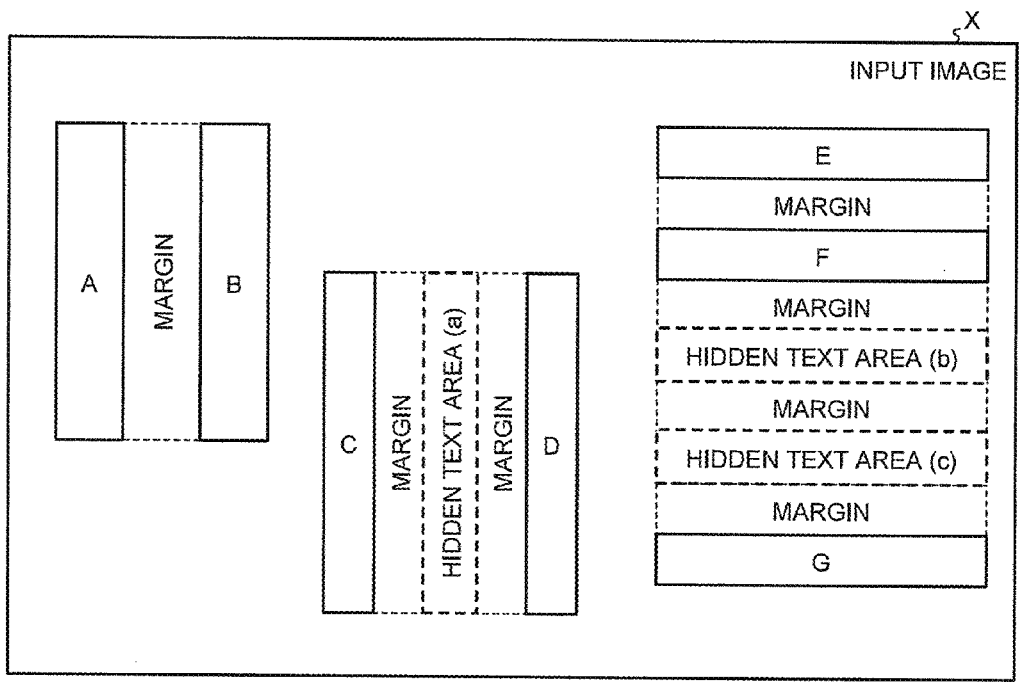
FIG. 45 is a diagram illustrating examples of fragmented-type hidden text line areas.
Figure 46:
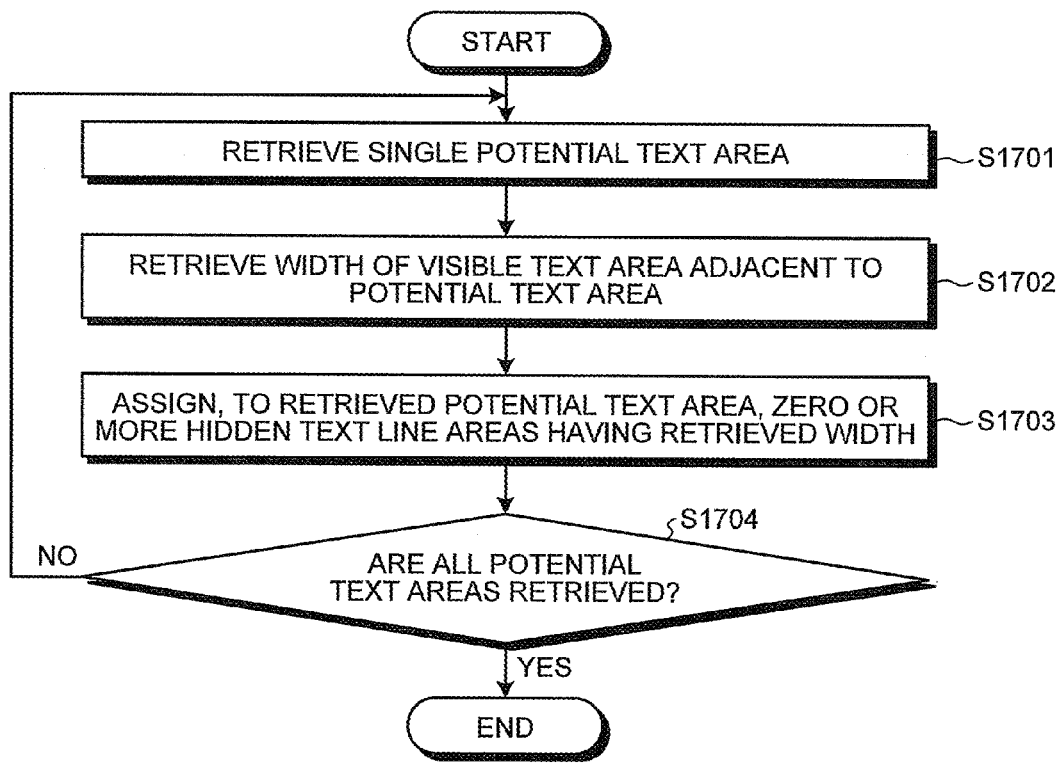
FIG. 46 is a flowchart for explaining the operation for sorting potential text areas as margins and hidden text line areas.

Explained below with reference to FIGS. 45 and 46 is the operation for sorting the potential text areas as margins and hidden text line areas. FIG. 45 is a diagram illustrating examples of fragmented-type hidden text line areas. FIG. 46 is a flowchart for explaining the operation for sorting the potential text areas as margins and hidden text line areas. The fragmented-type multiline text area estimator 511 performs the operations from Steps S1701 to S1704 explained below, and sorts the potential text areas illustrated in FIG. 44 as margins and hidden text line areas as illustrated in FIG. 45.

In the following explanation, width represents the length of the side perpendicular to the text direction. The width of a margin referred to herein can be set with reference to the width of the visible text line adjacent to the concerned potential text area. For example, the width of a margin can be set to be 0.5 times of the width of the adjacent visible text line.

Step S1701: the fragmented-type multiline text area estimator 511 retrieves a single potential text area from the potential text area group detected as a result of performing the operations described above.

Step S1702: the fragmented-type multiline text area estimator 511 retrieves the width of the visible text area adjacent to the potential text area retrieved at Step S1701.

Step S1703: the fragmented-type multiline text area estimator 511 assigns, to the potential text area retrieved at Step S1701, zero or more hidden text line areas having the width retrieved at Step S1702 (i.e., hidden text line areas having the same size of the visible text areas). However, there is a condition that margins are invariably present in between visible text line areas or hidden text line areas, all margins have the same width (equal spacing), and the result is as close to the reference width as possible.

Step S1704: the fragmented-type multiline text area estimator 511 determines whether or not all visible text areas have been retrieved. If all visible text areas have not been retrieved (No at Step S1704), then the system control returns to Step S1701. However, when all visible text areas have been retrieved (Yes at Step S1704), it marks the end of the operations.

Figure 47:
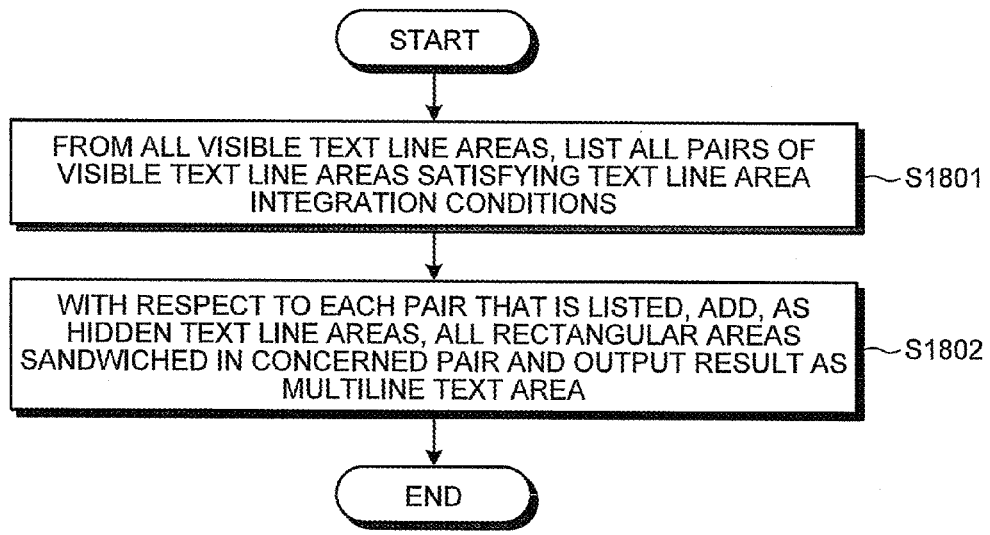
FIG. 47 is a flowchart for explaining a sequence of operations for listing multiline text areas.

Explained with reference to FIGS. 45 and 47 are the operations for listing the possible multiline text areas. FIG. 47 is a flowchart for explaining a sequence of operations for listing the multiline text areas. The fragmented-type multiline text area estimator 511 performs the operations at Steps S1801 and S1802, and lists the possible multiline text areas.

Step S1801: from all visible text line areas, the fragmented-type multiline text area estimator 511 lists all pairs of visible text line areas satisfying the text line area integration conditions. In the example illustrated in FIG. 45, the pairs of visible text line areas listed at Step S1801 are (A, B), (C, D), (E, F), (F, G), and (E, F, G).

Step S1802: with respect to each pair listed at Step S1801, the fragmented-type multiline text area estimator 511 adds, as hidden text line areas, all rectangular areas sandwiched in the concerned pair and outputs the result as a multiline text area. In the example illustrated in FIG. 45, the multiline text areas output at Step S1802 are (A, B), (C, a, D), (E, F), (F, b, c, G), and (E, F, b, c, G).

Frame-out truncated-type multiline text area estimator

With respect to the visible text line areas adjacent to the rim (the top side, the bottom side, the left side, and the right side) of the input image X, under the assumption that hidden text line areas are present on the outside of the sides of the input image X, the frame-out truncated-type multiline text area estimator 512 estimates, as multiline text areas, areas formed by extending the areas toward the outside of the sides of the input image X. However, unlike in the case of the fragmented type, there are no criteria for determining the size of the hidden text line areas. Hence, the length of the area extended toward the outside of the sides of the input image X is determined according to the setting done in advance. Regarding the method for setting the length of the extended area, for example, it is possible to think of a method of using the number of added lines. Meanwhile, it is also possible to have a plurality of setting values. In that case, identical operations are performed using all setting values.

FIG. 48 is a diagram illustrating examples of frame-out truncated-type multiline text areas. In (a) in FIG. 48 is illustrated an example in which the visible text line area or the multiline text area adjacent to the left side of the input image X is extended toward the outside from the left side of the input image X, and the post-extension area is treated as a multiline text area. In (b) in FIG. 48 is illustrated an example in which the visible text line area or the multiline text area adjacent to the bottom side of the input image X is extended toward the outside from the bottom side of the input image X, and the post-extension area is treated as a multiline text area. In each example, since there is no clue about the extent to which the area should be extended, area extension is done according to several types of lengths set in advance corresponding to the number of added lines.

Figure 49:
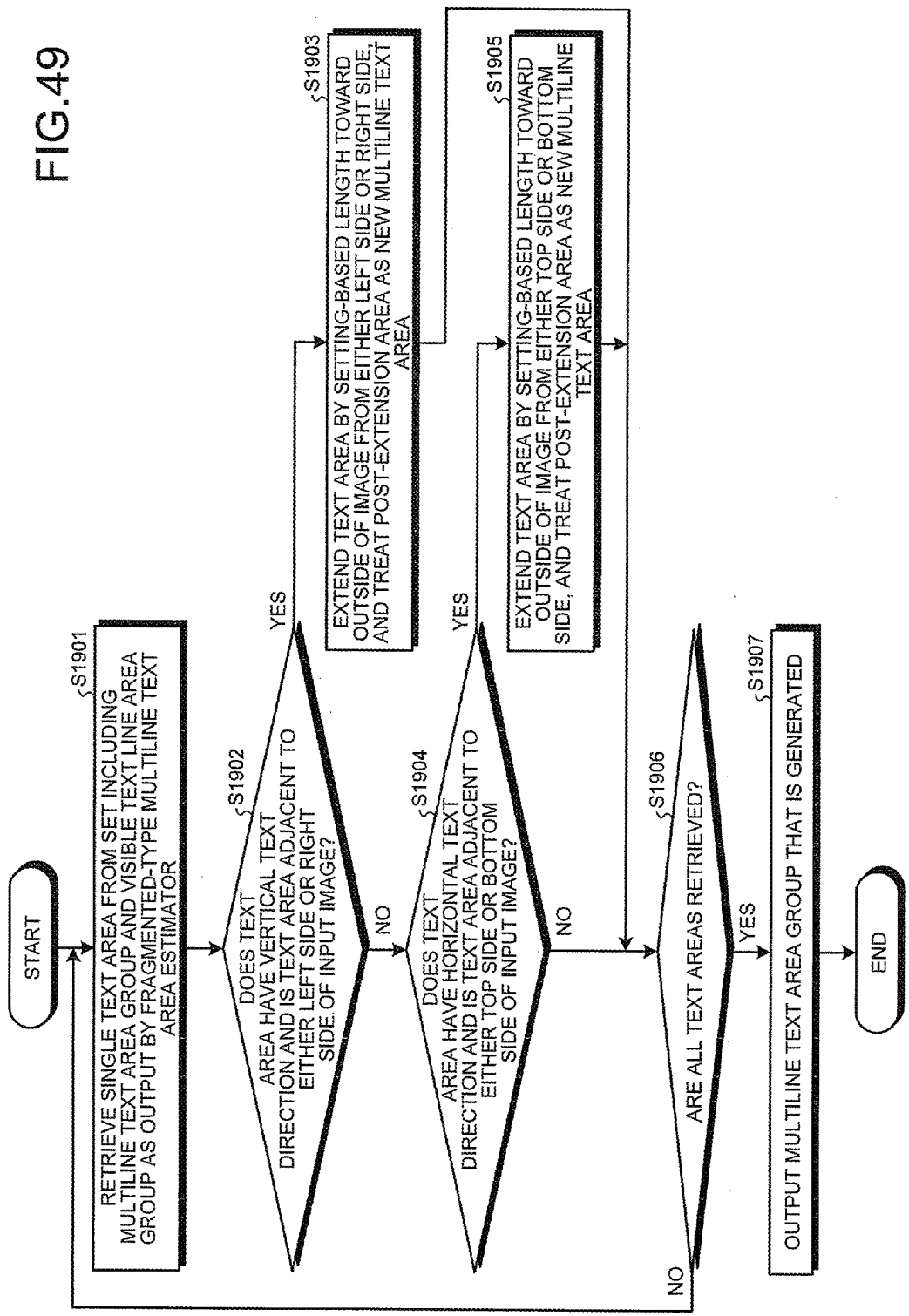
FIG. 49 is a flowchart for explaining a sequence of operations for estimating frame-out truncated-type multiline text areas.

FIG. 49 is a flowchart for explaining a sequence of operations performed by the frame-out truncated-type multiline text area estimator 512. Herein, the frame-out truncated-type multiline text area estimator 512 performs the operations from Steps S1901 to S1907 explained below, and estimates a frame-out truncated-type multiline text area.

Step S1901: the frame-out truncated-type multiline text area estimator 512 retrieves a single text area from the set including the multiline text area group and the visible text line area group as output by the fragmented-type multiline text area estimator 511.

Step S1902: the frame-out truncated-type multiline text area estimator 512 determines whether or not the text area retrieved at Step S1901 has the vertical text direction and is adjacent to either the left side or the right side of the input image X. If both conditions are satisfied (Yes at Step S1902), then the system control proceeds to Step S1903. However, if any one condition is not satisfied (No at Step S1902), the system control proceeds to Step S1904.

Step S1903: the frame-out truncated-type multiline text area estimator 512 extends the text area, which is retrieved at Step S1901, by the setting-based length (i.e., the length equivalent to the width and the margin of the number of added lines) toward the outside of the image from either the left side or the right side to which the text area is adjacent, and treats the post-extension area as a new multiline text area.

Step S1904: the frame-out truncated-type multiline text area estimator 512 determines whether or not the text area retrieved at Step S1901 has the horizontal text direction and is adjacent to either the top side or the bottom side of the input image X. If both conditions are satisfied (Yes at Step S1904), then the system control proceeds to Step S1905. However, if any one condition is not satisfied (No at Step S1904), the system control proceeds to Step S1906.

Step S1905: the frame-out truncated-type multiline text area estimator 512 extends the text area, which is retrieved at Step S1901, by the setting-based length (i.e., the length equivalent to the width and the margin of the number of added lines) toward the outside of the image from either the top side or the bottom side to which the text area is adjacent, and treats the post-extension area as a new multiline text area.

Step S1906: the frame-out truncated-type multiline text area estimator 512 determines whether or not all text areas to be processed have been retrieved. If all text areas have been retrieved (Yes at Step S1906), the system control proceeds to Step S1907. However, if all text areas have not been retrieved (No at Step S1906), then the system control returns to Step S1901.

Step S1907: the frame-out truncated-type multiline text area estimator 512 outputs the multiline text area group that is generated.

Obstruction-Induced Truncated-Type Multiline Text Area Estimator

With respect to all visible text line areas, under the assumption that hidden text line areas are present on the anterior side of the concerned lines or on the posterior side of the concerned lines, the obstruction-induced truncated-type multiline text area estimator 513 estimates, as multiline text areas, areas formed by extending the areas toward the anterior side or the posterior side of the lines. In an identical manner to the frame-out truncated type, the length of the extended area is determined according to the setting done in advance. Regarding the method for setting the length of the extended area, for example, it is possible to think of a method of using the number of added lines. However, unlike in the case of the frame-out truncated type, there is an additional restriction on the length of the extended area that no overlapping occurs with other visible text areas.

FIG. 50 is a diagram for explaining examples of obstruction-induced truncated-type multiline text areas. In (a) in FIG. 50 is illustrated an example in which a visible text line area or a multiline text area having the vertical text direction is extended in the horizontal direction without causing overlapping with other visible text areas, and the post-extension area is treated as a multiline text area. In (b) in FIG. 50 is illustrated an example in which a visible text line area or a multiline text area having the horizontal text direction is extended in the vertical direction without causing overlapping with another visible text area, and the post-extension area is treated as a multiline text area. In each example, since there is no clue about the extent to which the area should be extended, area extension is done according to several types of lengths set in advance corresponding to the number of added lines.

Figure 51:
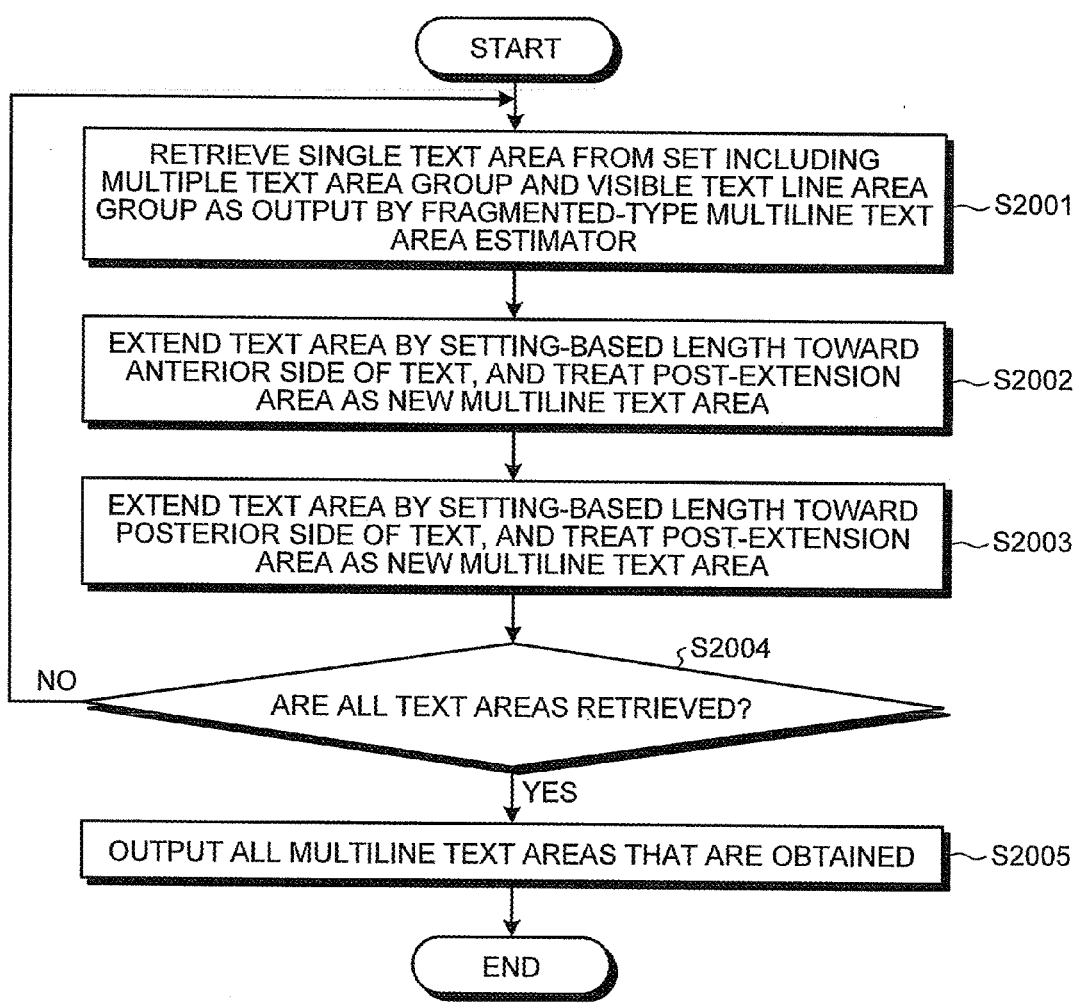
FIG. 51 is a flowchart for explaining a sequence of operations for estimating obstruction-induced truncated-type multiline text areas.

FIG. 51 is a flowchart for explaining a sequence of operations performed by the obstruction-induced truncated-type multiline text area estimator 513. Herein, the obstruction-induced truncated-type multiline text area estimator 513 performs operations from Steps S2001 to S2005 explained below, and estimates an obstruction-induced truncated-type multiline text area. Herein, regarding the margin size, the same setting as that used in the fragmented-type multiline text area estimator 511 is used. Moreover, the newly-generated hidden text line areas are assumed to have the same size as the visible text line areas included in the post-extension text area.

Step S2001: the obstruction-induced truncated-type multiline text area estimator 513 retrieves a single text area from the set including the multiline text area group and the visible text line area group as output by the fragmented-type multiline text area estimator 511.

Step S2002: the obstruction-induced truncated-type multiline text area estimator 513 extends the text area, which is retrieved at Step S2001, by the setting-based length (i.e., the length equivalent to the width and the margin of the number of added lines) toward the anterior side of the text, and treats the post-extension area as a new multiline text area. However, if extension according to the set length causes overlapping with other visible text areas, then that setting value is not used for extension.

Step S2003: the obstruction-induced truncated-type multiline text area estimator 513 extends the text area, which is retrieved at Step S2001, by the setting-based length (i.e., the length equivalent to the width and the margin of the number of added lines) and toward the posterior side of the text, and treats the post-extension area as a new multiline text area. However, if extension according to the set length causes overlapping with another visible text area, then that setting value is not used for extension.

Step S2004: the obstruction-induced truncated-type multiline text area estimator 513 determines whether or not all text areas to be processed have been retrieved. If all text areas have been retrieved (Yes at Step S2004), the system control proceeds to Step S2005. However, if all text areas have not been retrieved (No at Step S2004), then the system control returns to Step S2001.

Step S2005: the obstruction-induced truncated-type multiline text area estimator 513 outputs all multiline text areas that are obtained.

Multiline Text Area Lattice Generator

With respect to each multiline text area generated by the multiline text area estimator 510, the multiline text area lattice generator 520 generates a lattice in which text candidates are listed each of which is formed by chain-like line concatenation of the visual text line areas and the hidden text line areas included in the concerned multiline text area. Herein, the lattices of the visible text line areas are already generated by the character recognition device 100 according to the first embodiment. Thus, for example, the multiline text area lattice generator 520 generates lattices of the hidden text line areas; concatenates, in a chain-like manner, the lattices of the visible text line areas, which are already generated by the character recognition device 100, and the lattices of the hidden text line areas; and outputs the result as the lattice of the multiline text area.

The method for generating the lattice of a hidden text line area is identical to the method for generating the lattice of a hidden text area as implemented by the character recognition device 100 (i.e., the sequences of operations illustrated in FIGS. 19 to 22). Meanwhile, at the time of assigning the space cost based on the area size; the size of the hidden text line area as well as the size of the margin can be taken into account in deciding on the space cost to be assigned to the lattice of the hidden text line area.

Figure 52:
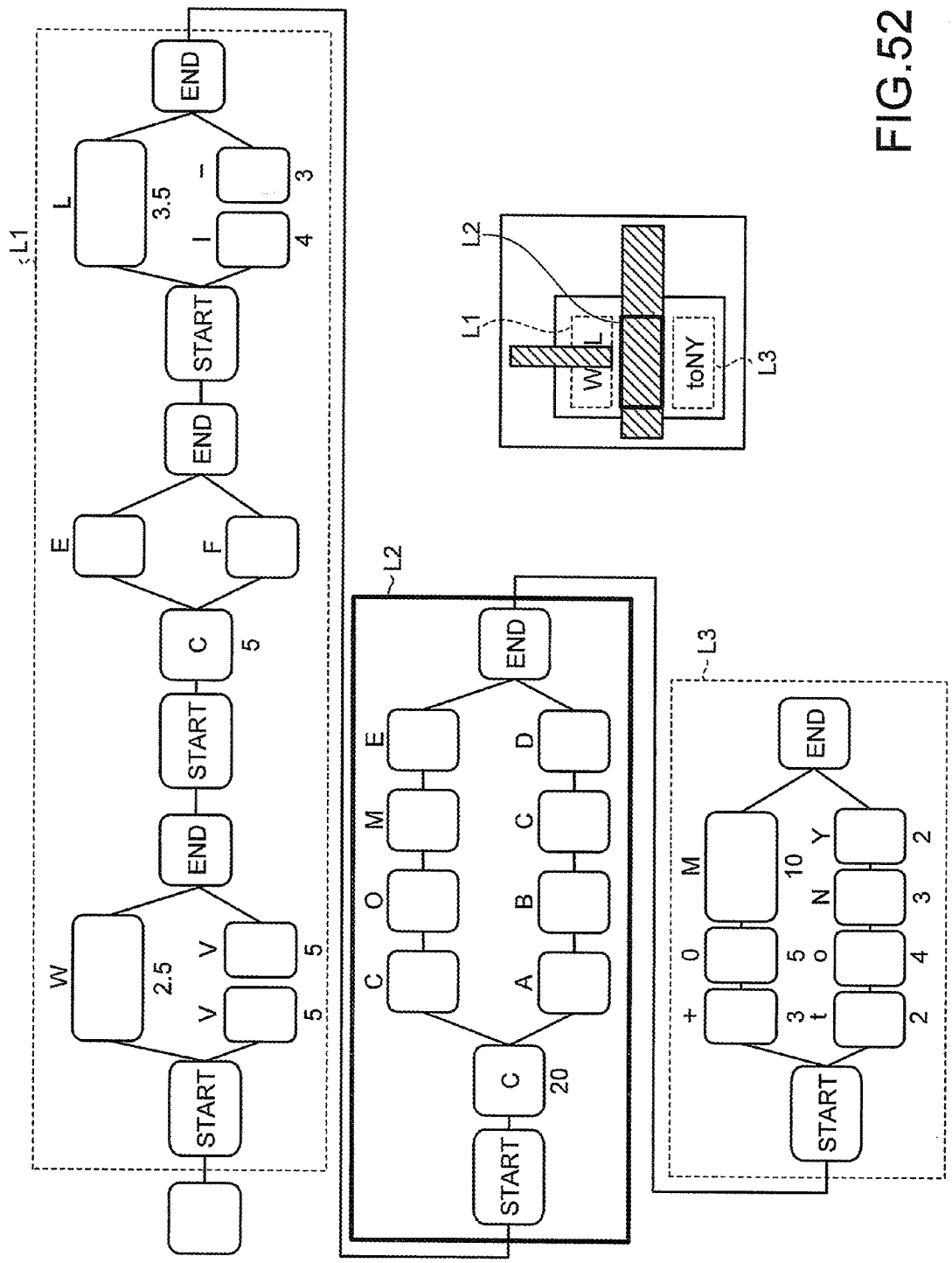
FIG. 52 is a diagram illustrating an exemplary lattice of a multiline text area.

FIG. 52 is a diagram illustrating an exemplary lattice of a multiline text area. The example illustrated in FIG. 52 corresponds to a case in which a partially-hidden text area "W?L" and a visible text area "toNY" are detected as a result of the operations performed by the character recognition device 100, and in which hidden text line areas are detected in between the visible text line areas as a result of operations performed by the multiline text area estimator 510. As illustrated in FIG. 52, corresponding to the multiline text area that is obtained by integrating the visible text areas and the hidden text areas, the lattice is formed by linking the lattices of lines L1, L2, and L3 in a chain-like manner.

In the multiline text area, the first line L1 represents a partially-hidden text area detected as a result of the operations performed by the character recognition device 100, and the lattice of the first line L1 has an identical structure to the lattice of the partially-hidden text area as illustrated in FIG. 24. Moreover, in the multiline text area, the second line L2 represents a hidden text line area detected as a result of the operations performed by the multiline text area estimator 510. Hence, the lattice of second line L2 has only the space cost assigned thereto. Furthermore, in the multiline text area, the third line L3 represents a visible text area detected as a result of the operations performed by the character recognition device 100, and the lattice of the third line L3 has the character pattern recognition costs assigned therein.

Linguistic-Evaluation-Based Character Recognizer

The linguistic-evaluation-based character recognizer 530 performs linguistic evaluation with respect to the lattice generated by the multiline text area lattice generator 520; and performs a character recognition operation in which the character pattern recognition costs, the space costs, and the linguistic costs are taken into account. The sequence of operations performed by the linguistic-evaluation-based character recognizer 530 is identical to the sequence of operations performed by the linguistic-evaluation-based character recognizer 160 of the character recognition device 100. Hence, the detailed explanation is not repeated.

Multiline Text Area Structure Selector

The multiline text area group, which is obtained as a result of performing the operations described above, is a selection candidate of the character recognition result Y2. The multiline text area structure selector 540 determines the multiline text area group that is ought to be eventually selected. Then, the multiline text area structure selector 540 outputs, as the character recognition results Y2 with respect to the multiline text areas, the texts selected or ranked based on the integrated cost.

The multiline text area structure selector 540 selects such an integration method, from among all integration methods for generating the multiline text area group using the visible text line areas once at a maximum, in which the multiline text area group that is generated and the visible text area group not incorporated into the multiline text area group have the lowest total cost. The sequence of operations performed by the multiline text area structure selector 540 is identical to the sequence of operations performed by the text area structure selector 170 of the character recognition result 100. Hence, the detailed explanation is not repeated.

As explained above, in the line-supplementing-type character recognition device 500, a multiline text area is estimated in which hidden text line areas are integrated with visible text line areas, and the text candidates corresponding to the estimated multiline text area are output as the character recognition result Y2. Hence, even if characters are hidden across an entire line, the text representing the character recognition result Y2 can be obtained by supplementing the hidden characters.

Supplementary Explanation

Figure 53:
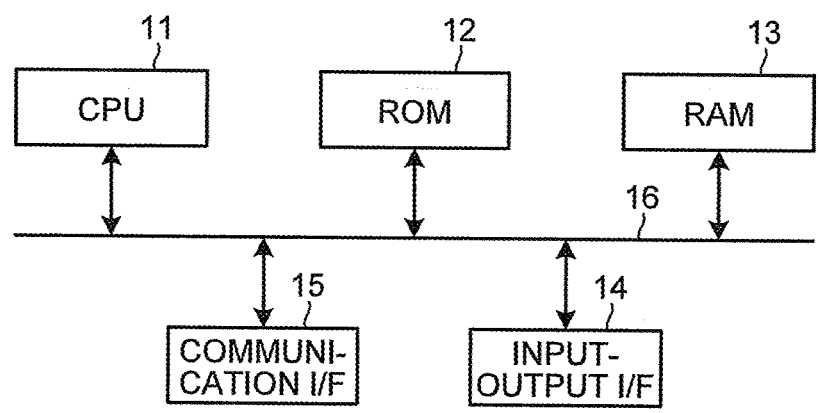
FIG. 53 is a block diagram that schematically illustrates an exemplary hardware configuration of the character recognition device.

The processing units of the character recognition device 100 according to the embodiments (i.e., the visible text area detector 110, the character pattern recognizer 120, the partially-lost character area detector 130, the partially-hidden text area estimator 140, the partially-hidden text area lattice generator 150, the linguistic-evaluation-based character recognizer 160, and the text area structure selector 170) can be implemented either using hardware or using software (computer programs) running in coordination with hardware. In the case of implementing the processing units using software, for example, as illustrated in FIG. 53, the character recognition device 100 can have the hardware configuration of a commonly-used computer that includes a control device such as a central processing unit (CPU) 11, memory devices such as a read only memory (ROM) 12 and a random access memory (RAM) 13, an input-output interface (I/F) 14 to which a display panel or various operating devices are connected, a communication I/F 15 that performs communication by establishing connection with a network, and a bus 16 that interconnects the constituent elements.

The computer programs executed in the character recognition device 100 according to the embodiments are recorded as installable or executable files in a computer-readable recording medium such as a compact disk read only memory (CD-ROM), a flexible disk (FD), a compact disk recordable (CD-R), or a digital versatile disc (DVD); and are provided as a computer program product.

Alternatively, the computer programs executed in the character recognition device 100 according to the embodiments can be saved as downloadable files on a computer connected to a network such as the Internet or can be made available for distribution through a network such as the Internet. Still alternatively, the computer programs executed in the character recognition device 100 according to the embodiments can be stored in advance in the ROM 12.

The computer programs executed in the character recognition device 100 according to the embodiments contain a modules for the processing units of the character recognition device 100 according to the embodiments (i.e., the visible text area detector 110, the character pattern recognizer 120, the partially-lost character area detector 130, the partially-hidden text area estimator 140, the partially-hidden text area lattice generator 150, the linguistic-evaluation-based character recognizer 160, and the text area structure selector 170). As far as the actual hardware is concerned, for example, the CPU 11 (a processor) reads the computer programs from a recording medium and executes them. As a result, the processing units are loaded and generated in the RAM 13 (a main memory). Meanwhile, some or all of the processing units of the character recognition device 100 according to the embodiments can be alternatively implemented using dedicated hardware such as an application specific integrated circuit (ASIC) or a (field-programmable gate array (FPGA).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A character recognition device comprising:
processing circuitry configured to function as:
a detector configured to detect a visible text area that represents an area in which a character is visible, from an input image;
a first recognizer configured to perform character pattern recognition with respect to the visible text area, and calculate a character pattern recognition cost according to a likelihood of a character pattern;
a first estimator configured to estimate a partially-hidden text area into which a hidden text area and one or more visible text areas are integrated, the hidden text area representing an area estimated to have a hidden character;
a second recognizer configured to calculate an integrated cost into which the character pattern recognition cost calculated with respect to the visible text area included in the partially-hidden text area and a linguistic cost corresponding to a linguistic likelihood of a text that fits in the entire of the partially-hidden text area are integrated; and
an output unit configured to output a text that is selected or ranked based on the integrated cost, as a result of character recognition performed with respect to the partially-hidden text area; wherein the processing circuitry further functions as:
a second estimator configured to estimate a multiline text area into which a hidden text line area and the one or more visible text areas or the partially-hidden text area are integrated, the hidden text line area having a text direction consistent with a text direction of the one or more visible text areas or the partially-hidden text area and being in a direction perpendicular to the text direction, wherein
when the multiline text area is estimated, the second recognizer calculates, as the integrated cost with respect to the multiline text area, an integrated cost into which either the character pattern recognition cost calculated with respect to the visible text area included in the multiline text area or the integrated cost calculated with respect to the partially-hidden text area included in the multiline text area and the linguistic cost corresponding to a linguistic likelihood of text fitting in entire of the multiline text area are integrated.

2. The device according to claim 1, wherein the first estimator
    detects a pair of visible text areas linearly arranged in line and having a text direction consistent with a direction of arrangement of the visible text areas,
    estimates, as the hidden text area, an area sandwiched between two visible text areas included in the pair, and
    estimates, as the partially-hidden text area, an area into which the hidden text area and the pair are integrated.

3. The device according to claim 1, wherein the first estimator
    estimates, as the hidden text area, an additional area by which the visible text area adjacent to a rim of the input image is extended toward outside of the input image from the rim in a direction consistent with a text direction of the visible text area, and
    estimates, as the partially-hidden text area, an area into which the hidden text area and the visible text area are integrated.

4. The device according to claim 1, wherein the first estimator
    estimates, as the hidden text area, an additional area by which the visible text area is extended in a direction consistent with a text direction of the visible text area and without causing overlapping with another visible text area, and
    estimates, as the partially-hidden text area, an area into which the hidden text area and the visible text area are integrated.

5. The device according to claim 1, wherein the second recognizer determines a text candidate that fits in the hidden text area based on a size of the hidden text area.

6. The device according to claim 1, wherein the second recognizer calculates the integrated cost into which a space cost corresponding to a size of the hidden text area is further integrated.

7. The device according to claim 1, wherein the second recognizer calculates the integrated cost into which a space cost corresponding to a reason behind an occurrence of the hidden text area is further integrated.

8. The device according to claim 1, wherein the output unit outputs a result of character recognition with respect to the partially-hidden text area selected using the integrated cost when there is a plurality of estimated candidates for the partially-hidden text area.

9. The device according to claim 1, wherein the second estimator
    detects a pair of visible text areas distantly arranged in the direction perpendicular to the text direction, or a pair of partially-hidden text areas distantly arranged in the direction perpendicular to the text direction, or a pair of the visible text area and the partially-hidden text area distantly arranged in the direction perpendicular to the text direction,
    estimates, as the hidden text line area, an area sandwiched between two visible text areas in the pair, or between two partially-hidden text areas in the pair, or between the visible text area and the partially-hidden text area in the pair, and
    estimates, as the multiline text area, an area into which the hidden text line area and the pair are integrated.

10. The device according to claim 1, wherein the second estimator
    estimates, as the hidden text line area, an additional area by which the visible text area or the partially-hidden text area adjacent to a rim of the input image is extended toward outside of the input image from the rim in the direction perpendicular to the text direction of the visible text area or the partially-hidden text area, and
    estimates, as the multiline text area, an area into which the hidden text area and the visible text area or the partially-hidden text area are integrated.

11. The device according to claim 1, wherein the second estimator
    estimates, as the hidden text line area, an additional area by which the visible text area or the partially-hidden text area is extended in the direction perpendicular to the text direction of the visible text area or the partially-hidden text area without causing overlapping with another visible text area, and
    estimates, as the multiline text area, an area into which the hidden text area and the visible text area or the partially-hidden text area are integrated.

12. An image display device comprising:
    the character recognition device according to claim 1; and
    a display controller comprising processing circuitry configured to:
        generate a display screen in which the result of character recognition that is output from the character recognition device is superimposed on the input image so that text corresponding to the visible text area and text corresponding to the hidden text area are distinguishable from each other, and
        display the display screen on a display.

13. The device according to claim 12, wherein
    the display controller generates the display screen in which text corresponding to a candidate of the hidden text area that is not incorporated in the partially-hidden text area is further superimposed on the input image so that the text corresponding to the candidate of the hidden text area which is not incorporated in the partially-hidden text area and text corresponding to a candidate of the hidden text area which is incorporated in the partially-hidden text area are distinguishable from each other, and displays the display screen on the display, and
    when an operation is performed on the display screen to specify text corresponding to a candidate of the hidden text area which is not incorporated in the partially-hidden text area, the display controller updates the display screen according to the operation.

14. An image retrieval device comprising:
    the character recognition device according to claim 1; and
    processing circuitry configured to function as:
    an index generator configured to input an image stored in an image storage to the character recognition device, and generate an index for the input image based on the result of character recognition that is output from the character recognition device; and
    a searcher configured to retrieve an image matching a search query using the index from the image storage, and output the retrieved image.

15. The device according to claim 14, wherein
    the index generator generates the index having a different weight assigned thereto depending on the result of character recognition that is output from the character recognition device, and the searcher ranks the image matching with the search query according to the weight assigned to the index of the image, and outputs the ranked image.

16. A character recognition method implemented in a character recognition device, the method comprising:
   detecting a visible text area that represents an area in which a character is visible, from an input image;
   performing character pattern recognition with respect to the visible text area;
   calculating a character pattern recognition cost according to a likelihood of a character pattern;
   estimating a partially-hidden text area into which a hidden text area and one or more visible text areas are integrated, the hidden text area representing an area estimated to have a hidden character;
   calculating an integrated cost into which the character pattern recognition cost calculated with respect to the visible text area included in the partially-hidden text area and a linguistic cost corresponding to a linguistic likelihood of a text that fits in the entire of the partially-hidden text area are integrated; and
   outputting a text that is selected or ranked based on the integrated cost, as a result of character recognition performed with respect to the partially-hidden text area; wherein the method further comprises:
   estimating a multiline text area into which a hidden text line area and the one or more visible text areas or the partially-hidden text area are integrated, the hidden text line area having a text direction consistent with a text direction of the one or more visible text areas or the partially-hidden text area and being in a direction perpendicular to the text direction, wherein
   when the multiline text area is estimated, as the integrated cost with respect to the multiline text area, an integrated cost is calculated into which either the character pattern recognition cost calculated with respect to the visible text area included in the multiline text area or the integrated cost calculated with respect to the partially-hidden text area included in the multiline text area, and the linguistic cost corresponding to a linguistic likelihood of text fitting in entire of the multiline text area are integrated.

17. A computer program product comprising a non-transitory computer-readable medium containing a program for recognizing a character, the program causing a computer to execute:
   detecting a visible text area that represents an area in which a character is visible, from an input image;
   performing character pattern recognition with respect to the visible text area;
   calculating a character pattern recognition cost according to a likelihood of a character pattern;
   estimating a partially-hidden text area into which a hidden text area and one or more visible text areas are integrated, the hidden text area representing an area estimated to have a hidden character;
   calculating an integrated cost into which the character pattern recognition cost calculated with respect to the visible text area included in the partially-hidden text area and a linguistic cost corresponding to a linguistic likelihood of a text that fits in the entire of the partially-hidden text area are integrated; and
   outputting a text that is selected or ranked based on the integrated cost, as a result of character recognition performed with respect to the partially-hidden text area; wherein the program further causes the computer to execute:
   estimating a multiline text area into which a hidden text line area and the one or more visible text areas or the partially-hidden text area are integrated, the hidden text line area having a text direction consistent with a text direction of the one or more visible text areas or the partially-hidden text area and being in a direction perpendicular to the text direction, wherein
   when the multiline text area is estimated, as the integrated cost with respect to the multiline text area, an integrated cost is calculated into which either the character pattern recognition cost calculated with respect to the visible text area included in the multiline text area or the integrated cost calculated with respect to the partially-hidden text area included in the multiline text area, and the linguistic cost corresponding to a linguistic likelihood of text fitting in entire of the multiline text area are integrated.

* * * * *